US 11,117,828 B2

(12) United States Patent
Boek et al.

(10) Patent No.: US 11,117,828 B2
(45) Date of Patent: Sep. 14, 2021

(54) LOW DIELECTRIC LOSS GLASSES FOR ELECTRONIC DEVICES

(71) Applicant: CORNING INCORPORATED, Corning, NY (US)

(72) Inventors: Heather Debra Boek, Corning, NY (US); Ling Cai, Painted Post, NY (US); Jennifer Anella Heine, Hammondsport, NY (US); Lisa Ann Lamberson, Painted Post, NY (US); Adama Tandia, Nelson (PA); Kochuparambil Deenamma Vargheese, Horseheads, NY (US); Mark Owen Weller, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/809,102

(22) Filed: Mar. 4, 2020

(65) Prior Publication Data
US 2020/0231490 A1 Jul. 23, 2020

Related U.S. Application Data

(63) Continuation of application No. PCT/US2020/013795, filed on Jan. 16, 2020.
(Continued)

(51) Int. Cl.
*B32B 15/04* (2006.01)
*C03C 3/091* (2006.01)

(52) U.S. Cl.
CPC .......... *C03C 3/091* (2013.01); *C03C 2201/02* (2013.01)

(58) Field of Classification Search
CPC ................. C03C 3/091; C03C 4/16
(Continued)

(56) References Cited

U.S. PATENT DOCUMENTS

| 9,643,884 B2 | 5/2017 | Ellison et al. |
| 2014/0049708 A1 | 2/2014 | Murata et al. |

(Continued)

FOREIGN PATENT DOCUMENTS

| EP | 3770128 A1 | 1/2021 |
| WO | 2017217496 A1 | 12/2017 |

(Continued)

OTHER PUBLICATIONS

Chen et al; "Microwave Dielectric Properties of Glass-Ceramic Composites for Low Temperature Co-Firable Ceramics"; Mater. Chem. Phys., 2003, 79, pp. 129-134.
(Continued)

*Primary Examiner* — Lauren R Colgan
(74) *Attorney, Agent, or Firm* — Russell S. Magaziner

(57) ABSTRACT

An article including a glass having that includes $SiO_2$, $Al_2O_3$, and $B_2O_3$ and least one of $Li_2O$, $Na_2O$, $K_2O$, MgO, CaO, SrO, BaO, $SnO_2$, ZnO, $La_2O_3$, F, and $Fe_2O_3$, wherein the glass includes a dielectric constant of about 10 or less and/or a loss tangent of about 0.01 or less, both as measured with signals at 10 GHz.

20 Claims, 14 Drawing Sheets

Related U.S. Application Data

(60) Provisional application No. 62/794,226, filed on Jan. 18, 2019, provisional application No. 62/794,869, filed on Jan. 21, 2019.

(58) Field of Classification Search
USPC .................................................. 428/426, 432
See application file for complete search history.

(56) References Cited

U.S. PATENT DOCUMENTS

| | | |
|---|---|---|
| 2014/0099501 A1 | 4/2014 | Yamamoto et al. |
| 2015/0051060 A1* | 2/2015 | Ellison .................. C03C 3/118 501/37 |
| 2015/0376055 A1 | 12/2015 | Fu et al. |
| 2017/0190607 A1* | 7/2017 | Mauro .................. C03B 17/02 |

FOREIGN PATENT DOCUMENTS

| | | | |
|---|---|---|---|
| WO | 2019191300 | A1 | 10/2019 |
| WO | 2019191302 | A1 | 10/2019 |
| WO | 2019191350 | A1 | 10/2019 |
| WO | 2020023205 | A1 | 1/2020 |

OTHER PUBLICATIONS

Darwish et al; "Effect of Compositional Changes On the Structure and Properties of Alkali-Alumino Borosilicate Glasses"; Journal of Materials Science: Materials in Electronics; vol. 17, (2006) pp. 35-42.

International Search Report and Written Opinion of the International Searching Authority; PCT/US2020/013795; dated Apr. 7, 2020; 13 Pages; ISA US Commissioner for Patents.

Sebastian et al; "Low Loss Dielectric Materials for LTCC Applications: A Review", International Materials Reviews, vol. 53, No. 2. (2008); pp. 57-90.

Zhang et al; "Effects of Cation Field Strength on Structure and Properties of Boroaluminosilicate Glasses"; Materials Research Innovations; vol. 17, No. 3; (2013) pp. 212-217.

Zhu et al; "Preparation and Properties of Low-Temperature Co-Fired Ceramic of CaO—SiO2—B2O3 System"; J. Mater. Sci., 2006, 17, pp. 637-641.

Corning® Glass Material Properties Glass Type: Borosilicate; Corning Code 7070; 1 Page; Corning Incorporated; Date Unknown.

* cited by examiner

LOW DIELECTRIC LOSS GLASSES FOR ELECTRONIC DEVICES

CROSS-REFERENCE TO RELATED APPLICATIONS

This application is a continuation of International Application No. PCT/US20/13795 filed on Jan. 16, 2020, which claims the benefit of priority under 35 U.S.C. § 119 to U.S. Application Nos. 62/794,226, filed on Jan. 18, 2019, and 62/794,869, filed on Jan. 21, 2019, both incorporated by reference herein in their entirety.

FIELD

The disclosure generally relates to glasses having a low dielectric constant and a low loss tangent, as measured with signals at 10 GHz, and, more particularly, to such glasses suitable for electronic device applications.

BACKGROUND

Digital technologies continue to expand, particularly in terms of data connectivity and processing rates. For example, processing rates on the order of 1 Gbits/s are expanding to rates on the order of tens of Gbits/s. The corresponding electronic device technology to achieve these data rates likely will result in an expansion of signal transmission and receiving frequencies on the order of 1 GHz to the order of 10 GHz, even up to about 100 GHz, in some cases.

As these signal frequencies increase to accommodate an increase in data processing rates, the technical specifications and requirements relating to absorption loss associated with the insulating materials employed in these devices take on greater importance. While there are materials available having low loss tangents at frequencies greater than 10 GHz, the processing characteristics of these materials can limit their ability to be manufactured using certain forming processes. For example, materials such as Radome pyroceramic, high purity fused silica, sapphire, alumina and silica, may have low loss tangents at frequencies greater than 10 GHz. However, these materials may have such high viscosities at forming temperatures that their ability to be processed using forming processes, such as slot-draw and overflow down draw, may be limited. There are also alkali-free glass and glass-ceramic materials which have low loss tangents at frequencies greater than 10 GHz, examples of which include $B_2O_3$—$P_2O_5$—$SiO_2$ ternary (BPS) and MgO—$Al_2O_3$—$SiO_2$ (MAS) systems. However, these systems typically have a liquidus viscosity that is too low for common forming methods. A need exists for a glass that overcomes some or all of the above issues.

SUMMARY

According to one aspect of the present disclosure, an article includes a glass including (in terms of constituent content) $SiO_2$ from about 60% to about 80% (i.e. mol %), $Al_2O_3$ from 0% to about 13%, $B_2O_3$ from about 15% to about 28%, and from 0% to about 1% of at least one fining agent. The glass also includes one or more alkaline earth oxides (RO) totaling from 0% to about 8% (by mole of oxide), wherein RO is selected from CaO, MgO, BaO, and SrO. The glass can be characterized by a ratio of $B_2O_3$:($Al_2O_3$+$SiO_2$) of from about 0.13 to about 0.35 and can includes a dielectric constant of about 10 or less and a loss tangent of about 0.01 or less, both as measured with signals at 10 GHz.

According to one aspect of the present disclosure, an article includes a glass including (in terms of constituent content) $SiO_2$ from about 60% to about 80%, $Al_2O_3$ from 0% to about 13%, $B_2O_3$ from about 15% to about 28%, and from 0% to about 1% of at least one fining agent. The glass can also include one or more alkaline earth oxides (RO) totaling from 0% to about 8% (by mole of oxide), wherein RO is selected from CaO, MgO, BaO, and SrO. The glass can be characterized by a ratio of RO:($Al_2O_3$+(0.5*$B_2O_3$)) of from 0 to about 0.9 and can further include a liquidus viscosity from about 40 kPoise to 5,000 kPoise.

According to one aspect of the present disclosure, an article includes a glass including (in terms of constituent content) $SiO_2$ from about 60% to about 80%, $Al_2O_3$ from 0% to about 13%, $B_2O_3$ from about 15% to about 28%, and from 0% to about 1% of at least one fining agent. The glass also includes one or more alkaline earth oxides (RO) totaling from 0% to about 8% (by mole of oxide), wherein RO is selected from CaO, MgO, BaO, and SrO. The glass can be characterized by a ratio of $B_2O_3$:($Al_2O_3$+$SiO_2$) of from about 0.13 to about 0.35 and can include a dielectric constant of about 10 or less and a loss tangent of about 0.01 or less, both as measured with signals at 10 GHz. The glass can further be characterized by a liquidus viscosity of about 40 kPoise to about 5,000 kPoise.

According to one aspect of the present disclosure, an article includes a glass including (in terms of constituent content) $SiO_2$ from about 60% to about 80%, $Al_2O_3$ from 0% to about 13%, $B_2O_3$ from about 15% to about 28%, from 0% to about 1% of at least one fining agent, and MgO and at least one additional alkaline earth oxide (RO), wherein the at least one additional RO is selected from CaO, BaO, and SrO, and wherein a total amount of MgO plus the at least one additional RO ($RO_{Total}$) is from about 3% to about 15% (by mole of oxide). The glass includes a dielectric constant of about 10 or less and/or a loss tangent of about 0.01 or less, both as measured with signals at 10 GHz.

According to one aspect of the present disclosure, an article for a substrate in an electronic device includes a glass consisting essentially of (in terms of constituent content) $SiO_2$ from about 60% to about 80%, $Al_2O_3$ from 0% to about 13%, $B_2O_3$ from about 15% to about 28%, from 0% to about 1% of at least one fining agent, and MgO and at least one additional alkaline earth oxide (RO), wherein the at least one additional RO is selected from CaO, BaO, and SrO, and wherein a total amount of MgO plus the at least one additional RO ($RO_{Total}$) is from about 3% to about 15% (by mole of oxide). The glass includes a dielectric constant of about 10 or less and/or a loss tangent of about 0.01 or less, both as measured with signals at 10 GHz.

According to one aspect of the present disclosure, an article includes a glass including (in terms of constituent content) $SiO_2$, $Al_2O_3$, and $B_2O_3$ and at least one of $Li_2O$, $Na_2O$, $K_2O$, MgO, CaO, SrO, BaO, $SnO_2$, ZnO, $La_2O_3$, F, and $Fe_2O_3$, wherein a first sum ($X_{sum}$) of $SiO_2$, $Al_2O_3$, and $B_2O_3$, a second sum ($Y_{sum}$) of $Li_2O$, $Na_2O$, $K_2O$, MgO, CaO, SrO, and BaO, and a third sum ($Z_{sum}$) of $SnO_2$, ZnO, $La_2O_3$, F, and $Fe_2O_3$, ($X_{sum}$, $Y_{sum}$, and $Z_{sum}$ in percent by mole of oxide), lies within a convex hull of $X_{sum}$, $Y_{sum}$, and $Z_{sum}$, as further defined by the following boundary points:

| $X_{sum}$ | $Y_{sum}$ | $Z_{sum}$ |
|---|---|---|
| 88.53 | 11.39 | 0.08 |
| 78.42 | 21.13 | 0.45 |
| 73.72 | 20.66 | 5.62 |
| 88.63 | 3.78 | 7.58 |
| 100.00 | 0 | 0 | wherein the glass is further defined by at least one of Equation 1 and Equation 2 (in percent by mole of oxide):

$$-42.8440902+0.463763055*[SO_2]+0.520077325*[Al_2O_3]+0.468168738*[B_2O_3]+0.47253232*[Li_2O]+2.11958583*[K_2O]+0.499421381*[MgO]+0.558094225*[CaO]+0.805792958*[SrO]+0.637349469*[BaO]-0.17232118*[SnO_2]+0.525853343*[ZnO]+0.261394654*[La_2O_3]+0.469279089*[F] \leq 10 \quad \text{Equation 1}$$

and $$0.756212572817506+[K_2O]+0.209148876828416*[La_2O_3]+0.0884393206156657*[BaO]+0.0384462744417211*[CaO]+(5.95212630529679-[F])/[B_2O_3]+(254.196472343803-2.1615185467817*[B_2O_3])/[SiO_2] \leq 10 \quad \text{Equation 2}$$

and
wherein the glass comprises a dielectric constant of about 10 or less, as measured with signals at 10 GHz.

According to another aspect of the present disclosure, an article includes a glass including (in terms of constituent content) $SiO_2$, $Al_2O_3$, and $B_2O_3$ and at least one of $Li_2O$, $Na_2O$, $K_2O$, MgO, CaO, SrO, BaO, $SnO_2$, ZnO, $La_2O_3$, F, and $Fe_2O_3$, wherein a first sum ($X_{sum}$) of $SiO_2$, $Al_2O_3$, and $B_2O_3$, a second sum ($Y_{sum}$) of $Li_2O$, $Na_2O$, $K_2O$, MgO, CaO, SrO, and BaO, and a third sum ($Z_{sum}$) of $SnO_2$, ZnO, $La_2O_3$, F, and $Fe_2O_3$, ($X_{sum}$, $Y_{sum}$, and $Z_{sum}$ in percent by mole of oxide), lies within a convex hull of $X_{sum}$, $Y_{sum}$, and $Z_{sum}$, as further defined by the following boundary points:

| $X_{sum}$ | $Y_{sum}$ | $Z_{sum}$ |
|---|---|---|
| 64.57 | 16.83 | 18.61 |
| 68.90 | 11.92 | 19.18 |
| 79.42 | 3.47 | 17.11 |
| 84.82 | 2.43 | 12.75 |
| 99.92 | 0.01 | 0.07 |
| 95.83 | 4.17 | 0 |
| 78.68 | 21.21 | 0.11 |
| 73.02 | 26.22 | 0.76 |
| 64.74 | 31.59 | 3.67 |
| 63.81 | 30.85 | 5.34 |
| 61.93 | 29.14 | 8.93 |
| 60.92 | 23.85 | 15.23 | wherein the glass is further defined by at least one of Equation 1 and Equation 2 (in percent by mole of oxide):

$$-42.8440902+0.463763055*[SO_2]+0.520077325*[Al_2O_3]+0.468168738*[B_2O_3]+0.47253232*[Li_2O]+2.11958583*[K_2O]+0.499421381*[MgO]+0.558094225*[CaO]+0.805792958*[SrO]+0.637349469*[BaO]-0.17232118*[SnO_2]+0.525853343*[ZnO]+0.261394654*[La_2O_3]+0.469279089*[F] \leq 10 \quad \text{Equation 1}$$

and $$0.756212572817506+[K_2O]+0.209148876828416*[La_2O_3]+0.0884393206156657*[BaO]+0.0384462744417211*[CaO]+(5.95212630529679-[F])/[B_2O_3]+(254.196472343803-2.1615185467817*[B_2O_3])/[SiO_2] \leq 10 \quad \text{Equation 2}$$

and
wherein the glass comprises a dielectric constant of about 10 or less, as measured with signals at 10 GHz.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
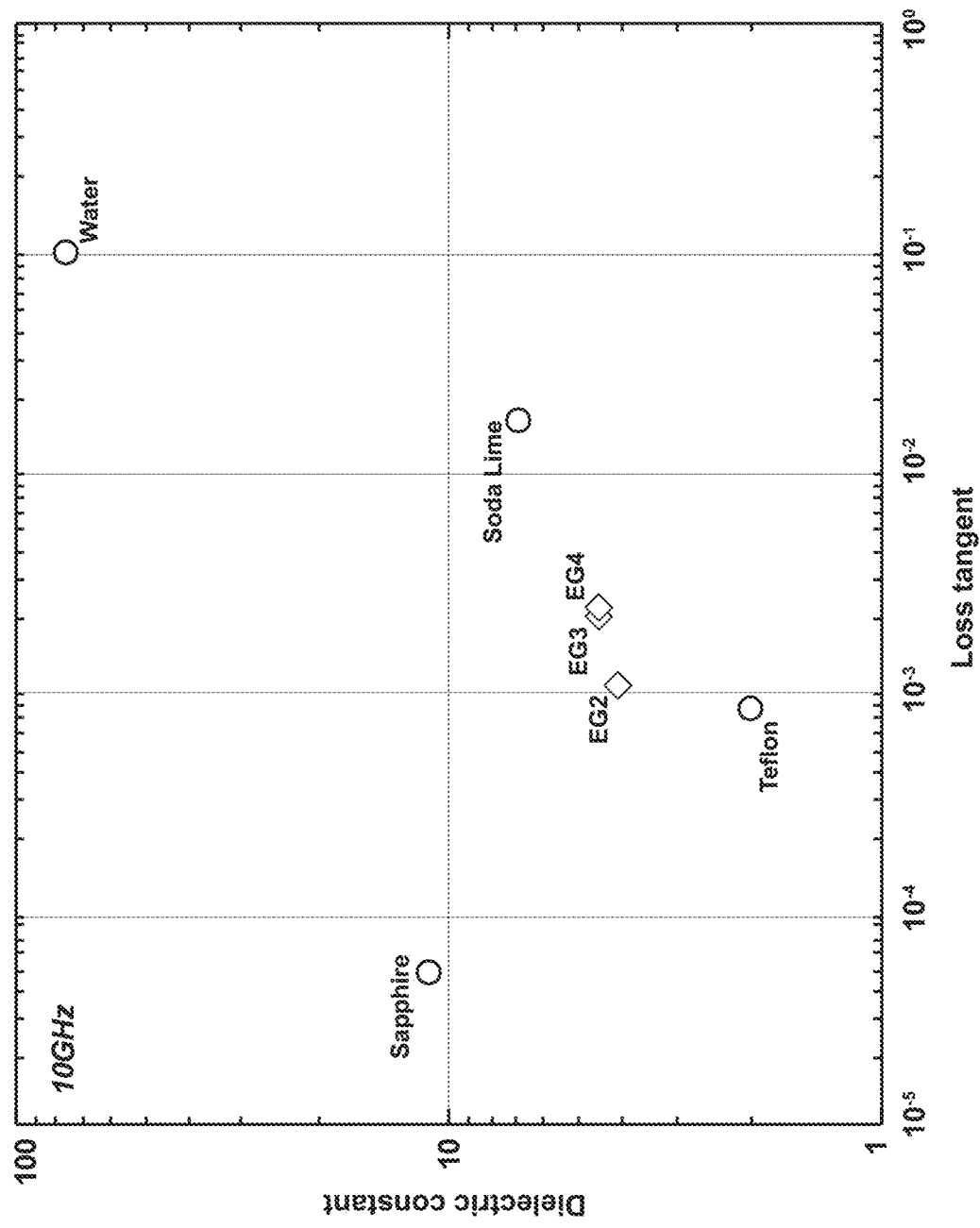
FIG. 1 is a chart illustrating the dielectric constant and loss tangent of exemplary glasses, as measured at signal frequencies of 10 GHz, according to the present disclosure and comparative materials.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise specified, all compositions are expressed in terms of as-batched (i.e., constituent content) mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 1 mol % when measuring final articles as compared to the as-batched compositions provided herein. With the forgoing in mind, substantial compositional equivalence between final articles and as-batched compositions is expected.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "convex hull" refers to the smallest convex set that contains a set of N points in a Euclidean space. In the present disclosure, the N points defining the convex hull are based on sums of concentrations of a predetermined set of oxides that may be present in a glass precursor composition (i.e., the as-batched glass composition). The N points defining the convex hull are represented as coordinates in a three-dimensional Cartesian coordinate system with origin 0 and X, Y, and Z coordinate axes. Each of the coordinates corresponds to a sum of a concentration of a predetermined sub-set of the predetermined set of oxides that may be present in the glass precursor composition. Each of the X, Y, and Z coordinates can be represented as a sum $X_{sum}$, $Y_{sum}$, and $Z_{sum}$ of the predetermined sub-set of oxides. As used herein, "boundary points" refers to the N points defining the convex hull that are represented as coordinates in a three-dimensional Cartesian coordinate system with origin 0 and X, Y, and Z coordinate axes.

As used herein, the singular forms "a," "an" and "the" include plural referents unless the context clearly dictates otherwise. Thus, for example, reference to a "component" includes aspects having two or more such components, unless the context clearly indicates otherwise.

The term "CTE," as used herein, refers to the coefficient of thermal expansion of a glass material, element or the like in the disclosure as averaged over a temperature range from about 20° C. to about 300° C., unless otherwise specified.

The terms "thin glass" or "relatively thin glass" are used interchangeably in relation to laminated glass structures in the disclosure and intended to mean a laminated structure having a total thickness not exceeding about 3 mm.

The term "thickness weighted average dielectric constant ($D_k$)" refers to the dielectric constant of a glass structure, design, or article of the disclosure. In particular, the thickness weighted average dielectric constant ($D_k$) of a structure is calculated by multiplying the thickness of a layer or each layer of a multi-layer laminated structure with its estimated or measured dielectric constant, summing the products for each of the layer(s), and then dividing the sum by the total thickness of the glass structure. As used herein, the term "dielectric constant" is used interchangeably with the thickness weighted average dielectric constant $D_k$, unless otherwise specified.

The terms "loss tangent", "dielectric loss tangent" and "dielectric loss" are used interchangeably in this disclosure to refer to the inherent dissipation of electromagnetic energy (e.g., heat) afforded by a particular glass, layer, or laminated structure associated with aspects of this disclosure. The lower the dielectric loss (e.g., portion of energy lost as heat), the more effective the dielectric material is. The loss tangent can be parameterized in terms of either the loss angle δ or the corresponding loss tangent tan δ. Permittivity is the ability of a substance, such as the glasses of the disclosure, to store electrical energy in the presence of an external electric field. Further, terms "permittivity" and the "average dielectric constant ($D_k$)" are used interchangeably within this disclosure. The dielectric constant is a quantity measuring the ability of a substance to store electrical energy in an electric field. Permittivity is a complex quantity because it describes the phase and magnitude of polarization in relation to an oscillating field. The terms "average dielectric constant ($D_k$)" and "relative permittivity ($\varepsilon_r$)" are used interchangeably in the disclosure and are defined as the ratio between the real part of the complex permittivity (absolute permittivity) and permittivity of free space (vacuum permittivity). Materials with an $\varepsilon_r>1$ are considered to be dielectric materials and poor conductors of electricity; materials with lower dielectric constants can withstand more intense electrostatic fields without having a dielectric breakdown which results in the material conducting a current which, in most solid materials, results in damage to the material. The "loss tangent" is expressed as the ratio between the imaginary and real part of the complex permittivity. In general, the average dielectric constant and loss tangent of a material is dependent on the frequency of the external field. Therefore, the dielectric property measured in the kHz range may not represent the dielectric property at microwave frequencies. Further, unless otherwise noted, the "loss tangent" and "average dielectric constant ($D_k$)" attributes of the glasses of the disclosure can be measured at frequencies of 1 GHz or greater according to a split post dielectric resonator (SPDR) or an open-cavity resonator configuration according to techniques as understood by those with ordinary skill in the field of the disclosure. The particular method chosen can be selected based on the sample thickness and its lateral dimensions.

Aspects of the present disclosure relate to article including a glass which has a dielectric constant of about 10 or less and/or a loss tangent of about 0.01 or less, and in some aspects a loss tangent of about 0.008 or less, as measured at signal frequencies of about 10 GHz or greater. The glasses of the present disclosure can be utilized in various electronic devices, including as substrates in antennas, semiconductor circuits, signal transmission structures, and printed circuit boards (PCB). In one aspect, the glass compositions of the present disclosure can be utilized to form various laminated glass structures, designs, and articles.

In some aspects, the glasses of the present disclosure include $SiO_2$, $Al_2O_3$, and $B_2O_3$ and at least one of $Li_2O$, $Na_2O$, $K_2O$, MgO, CaO, SrO, BaO, $SnO_2$, ZnO, $La_2O_3$, F, and $Fe_2O_3$. According to one aspect of the present disclosure, the amount of each oxide present in the glass lies within a composition space corresponding to a convex hull defined by boundary points $X_{sum}$, $Y_{sum}$, and $Z_{sum}$, in which $X_{sum}$ is based on a first sum of $SiO_2$, $Al_2O_3$, and $B_2O_3$, $Y_{sum}$ is based on a second sum of $Li_2O$, $Na_2O$, $K_2O$, MgO, CaO, SrO, and BaO, and $Z_{sum}$ is based on a third sum of $SnO_2$, ZnO, $La_2O_3$, F, and $Fe_2O_3$. In one aspect, the glass composition lies within a convex hull defined by boundary points $X_{sum}$, $Y_{sum}$, and $Z_{sum}$, and which has a dielectric constant of about 10 or less and/or a loss tangent of about 0.008, as measured at frequencies of about 10 GHz.

In some aspects, the glasses of the present disclosure can includes $SiO_2$, $B_2O_3$, and optionally $Al_2O_3$. In some aspects, the amounts of $SiO_2$, $B_2O_3$, and $Al_2O_3$, can be present in the glass according to a specified ratio of $B_2O_3$:($Al_2O_3$+$SiO_2$). For example, the glasses of the present disclosure can include a ratio of $B_2O_3$:($Al_2O_3$+$SiO_2$) of about 0.13 to about 0.35. In some implementations, the glass further includes one or more alkaline earth oxides (RO), where RO is CaO, MgO, BaO, and/or SrO. Optionally, the glass can include additional components, such as a fining agent. In some implementations, the glass includes no more than trace amounts of alkali metal oxides and is thus substantially free of alkali metals. In some implementations, alkali metal oxides are not intentionally added to the glasses. As used herein, trace amounts or substantially free refers to amounts of less than 0.2 mol %.

In some aspects, the glasses of the present disclosure can include $SiO_2$, $B_2O_3$, and optionally $Al_2O_3$, and which also include MgO and at least one additional alkaline earth oxide (RO) in a total amount ($RO_{Total}$) of MgO plus the at least one additional RO of from about 3 mol % to about 15 mol %. The at least one additional RO can be selected from CaO, BaO, and SrO. The combination of MgO and at least one additional RO according to aspects of the present disclosure can facilitate forming a glass having a lower dielectric constant and/or loss tangent compared to some glasses which include only a single RO species.

Implementations of the glasses of the present disclosure can be suitable for electronic devices, electronic device substrates, and other comparable applications that enable higher frequency communication in devices without a significant reduction in performance as it relates to other non-electrical device requirements. For instance, as higher frequency communication signals are used in these devices, the signals must pass through various physical barriers that otherwise attenuate or block these signals. As such, the glasses of the present disclosure can be well-suited for use as these barriers. Examples of these physical barriers are: electrically-insulating substrates that are used in the fabrication of electronic circuits and signal transmission structures, and device covers and other related structures that can be employed to house circuits and other electronic device components employed in electronic device operating at high signal frequencies.

In some implementations, the glasses of the present disclosure are suitable for use as substrates in PCBs. A PCB typically includes an insulating layer laminated with a copper film. In some implementations, the glasses of the present disclosure are characterized by a low loss tangent and mechanical properties suitable for use as the insulating layer in a PCB, optionally in combination with one or more polymeric substrate layers. Optionally, the glasses of the present disclosure can be substantially free of alkali metals to decrease the likelihood of ion migration during processing.

Some aspects of the present disclosure also relate to glasses having properties suitable for manufacturing, and in particular suitable for forming processes such as slot-draw, overflow fusion drawing, and laminate fusion forming, for example. The fusion draw process is an industrial technique that has been used for the large-scale manufacture of thin glass sheets. Compared to other flat glass manufacturing techniques, such as the float or slot draw processes, the fusion draw process yields thin glass sheets with high flatness and surface quality. As a result, the fusion draw process is often a dominant manufacturing technique in the fabrication of thin glass substrates (e.g., for liquid crystal displays, as well as for cover glass for various personal electronic devices).

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and may not require subsequent finishing.

In order to facilitate fusion draw processes, a glass desirably has a sufficiently high liquidus viscosity (i.e., the viscosity of a molten glass at the liquidus temperature). A higher liquidus viscosity can facilitate forming of the glass by down-draw process, such as fusion forming. In addition, the fusion drawing process operates over a range of viscosities. Glass is typically delivered to the trough of the isopipe at a viscosity corresponding to about 20,000-35,000 Poise and leaves the root of the isopipe in the form of a viscous ribbon at a viscosity corresponding to about 100,000 Poise or more. The temperature corresponding to 35,000 Poise viscosity is often used as a guide for the temperature at which glass is to be delivered to the trough of the isopipe for fusion drawing. The glasses of the present disclosure can have a temperature corresponding to a 35,000 Poise Temperature (referred to herein as the "35,000 Poise Temperature") that facilitates forming through down-draw processes. Typically, a low 35,000 Poise Temperature is desired to minimize undesirable creep of the isopipe refractory over time.

The temperature corresponding to 200 Poise is often used as a guideline for a suitable melting temperature for a glass. In some implementations, the glasses of the present disclosure are characterized by a relatively high 200 Poise Temperature, also referred to as a Poise Melting Point (referred to herein as the "200 Poise Melting Point"), to facilitate forming.

As noted above, a traditional fusion draw process is accomplished using a single isopipe, resulting in a homogeneous glass product. A more complicated fusion draw process can be used to form laminate articles including the glasses of the disclosure. In a laminate fusion draw process, two isopipes are employed to form a laminated sheet comprising a core composition surrounded on either or both sides by outer clad layers.

The glasses of the present disclosure can also form articles and structures having an average coefficient of thermal expansion (CTE) suitable for use in forming various electronic devices. According to one aspect, the glasses of the present disclosure are characterized by CTE values suitable for use as the core and/or clad layers in laminates (e.g., mechanically strengthened laminates) or for use as a substrate in PCBs.

The glasses of the present disclosure can include $SiO_2$ in an amount of from about 50% by mole of oxide (mol %) to about 80 mol %. In some aspects, the amount of $SiO_2$ can be in the range of about 50 mol % to about 80 mol %, about 50 mol % to about 78 mol %, about 50 mol % to about 75 mol %, about 50 mol % to about 70 mol %, about 50 mol % to about 65 mol %, about 52 mol % to about 80 mol %, about 52 mol % to about 78 mol %, about 52 mol % to about 75 mol %, about 52 mol % to about 70 mol %, about 52 mol % to about 65 mol %, about 54 mol % to about 80 mol %, about 54 mol % to about 78 mol %, about 54 mol % to about 75 mol %, about 54 mol % to about 70 mol %, about 54 mol % to about 65 mol %, about 64 mol % to about 75 mol %, about 60 mol % to about 80 mol %, about 60 mol % to about 75 mol %, about 60 mol % to about 70 mol %, about 60 mol % to about 65 mol %, about 65 mol % to about 70 mol %, about 65 mol % to about 75 mol %, about 65 mol % to about 80 mol %, about 64 mol % to about 70 mol %, about 64 mol % to about 75 mol %, about 64 mol % to about 80 mol %, about 70 mol % to about 75 mol %, about 70 mol % to about 80 mol %, or about 75 mol % to about 80 mol %. In some aspects, the amount of $SiO_2$ can be about 50 mol %, about 52 mol %, about 54 mol %, about 60 mol %, about 64 mol %, about 65 mol %, about 68 mol %, about 69 mol %, about 70 mol %, about 71 mol %, about 72 mol %, about 73 mol %, about 74 mol %, about 75 mol %, about 80 mol %, or any amount of $SiO_2$ between these values.

The glasses of the present disclosure can include $B_2O_3$ in an amount of from about 7 mol % to about 28 mol %. In some aspects, the amount of $B_2O_3$ can be in the range of about 7 mol % to about 28 mol %, about 7 mol % to about 26 mol %, about 7 mol % to about 25 mol %, about 7 mol % to about 20 mol %, about 9 mol % to about 28 mol %, about 9 mol % to about 26 mol %, about 9 mol % to about 25 mol %, about 9 mol % to about 20 mol %, about 15 mol % to about 28 mol %, about 16 mol % to about 26 mol %, about 15 mol % to about 28 mol %, about 15 mol % to about 25 mol %, about 15 mol % to about 20 mol %, about 15 mol % to about 18 mol %, about 20 mol % to about 28 mol %, about 20 mol % to about 26 mol %, about 20 mol % to about 24 mol %, or about 20 mol % to about 22 mol %. In some aspects, the amount of $B_2O_3$ can be about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, about 26 mol %, about 27 mol %, about 28 mol %, or any amount of $B_2O_3$ between these values.

The glasses of the present disclosure can include $Al_2O_3$ in an amount of from 0 mol % to about 15 mol %. In some aspects, the amount of $Al_2O_3$ is in the range of about 0 mol % to about 15 mol %, about 0 mol % to about 14 mol %, about 0 mol % to about 13 mol %, about 0 mol % to about 12 mol %, about 0.05 mol % to about 15 mol %, about 0.05 mol % to about 14 mol %, about 0.05 mol % to about 13 mol %, about 0.05 mol % to about 12 mol %, about 0.09 mol % to about 15 mol %, about 0.09 mol % to about 14 mol %, about 0.09 mol % to about 13 mol %, about 0.09 mol % to about 12 mol %, about 0.1 mol % to about 15 mol %, about 0.1 mol % to about 14 mol %, about 0.1 mol % to about 13 mol %, about 0.1 mol % to about 12 mol %, about 1 mol % to about 15 mol %, about 1 mol % to about 12 mol %, about 0.1 mol % to about 13 mol %, about 1 mol % to about 13 mol %, about 1 mol % to about 10 mol %, about 1 mol % to about 7 mol %, about 1 mol % to about 5 mol %, about 1 mol % to about 3 mol %, about 3 mol % to about 15 mol %, about 3 mol % to about 13 mol %, about 3 mol % to about 10 mol %, about 3 mol % to about 7 mol %, about 3 mol % to about 5 mol %, about 5 mol % to about 15 mol %, about 5 mol % to about 13 mol %, about 5 mol % to about 10 mol %, about 5 mol % to about 7 mol %, about 7 mol % to about 15 mol %, about 7 mol % to about 13 mol %, about 7 mol % to about 10 mol %, or about 10 mol % to about 13 mol %. In some aspects, the amount of $Al_2O_3$ is about 0 mol %, about 0.05 mol %, about 0.09 mol %, about 0.1 mol %, about 1 mol %, about 2 mol %, about 3 mol %, about 4 mol %, about 5 mol %, about 6 mol %, about 7 mol %, about 8 mol %, about 10 mol %, about 11 mol %, about 12 mol %, about 13 mol %, about 14 mol %, about 15 mol %, or any amount of $Al_2O_3$ between these values.

Increasing amounts of $SiO_2$ can decrease the dielectric constant and loss tangent of the glass at frequencies of 10 GHz or greater; however, increasing amounts of $SiO_2$ may decrease formability of the glass, and in particular formability by down-draw processes. For example, as the amount of $SiO_2$ increases, the liquidus temperature of the glass may increase. Pure $SiO_2$ has a low CTE, and, due to its high melting temperature, is incompatible with down-draw processes. $B_2O_3$ can be added to lower the viscosity of the glass and to reduce the liquidus temperature to facilitate forming of the glass, particularly by down-draw processes. $B_2O_3$ can have the effect of decreasing the liquidus temperature more rapidly than the viscosity, and thus may improve the liquidus viscosity for forming by down-draw processes. $Al_2O_3$ can reduce the liquidus temperature and thus increase the liquidus viscosity. Thus, the amounts of $SiO_2$, $B_2O_3$, and optionally $Al_2O_3$ can be selected according to the present disclosure to balance the desired dielectrical properties and formability of the glass. In some aspects of the present disclosure, the amounts of $SiO_2$, $B_2O_3$, and $Al_2O_3$ in the glass may be selected such that a ratio of $B_2O_3:(Al_2O_3+SiO_2)$ is from about 0.13 to about 0.35. In some aspects, the ratio of $B_2O_3:(Al_2O_3+SiO_2)$ is from about 0.13 to about 0.35, about 0.13 to about 0.34, about 0.13 to about 0.3, about 0.13 to about 0.28, about 0.13 to about 0.26, about 0.13 to about 0.24, about 0.13 to about 0.22, about 0.13 to about 0.2, about 0.22 to about 0.35, about 0.22 to about 0.24, about 0.29 to about 0.34, about 0.28 to about 0.35, about 0.22 to about 0.3, about 0.22 to about 0.28, about 0.22 to about 0.26, about 0.24 to about 0.35, about 0.24 to about 0.3, about 0.24 to about 0.28, about 0.26 to about 0.35, or about 0.26 to about 0.3. In some aspects, the ratio of $B_2O_3:(Al_2O_3+SiO_2)$ is about 0.13, about 0.14, about 0.15, about 0.16, about 0.17, about 0.18, about 0.19, about 0.2, about 0.21, about 0.22, about 0.23, about 0.24, about 0.29, about 0.30, about 0.31, about 0.32, about 0.33, or about 0.34.

In some implementations, the amounts of $SiO_2$ and $B_2O_3$ are selected such that a sum of $SiO_2$ plus $B_2O_3$ is from about 86 mol % to about 97 mol %. In some aspects, the sum of $SiO_2$ plus $B_2O_3$ can be from about 86 mol % to about 97 mol %, about 86 mol % to about 94 mol %, about 86 mol % to about 90 mol %, about 86 mol % to about 88 mol %, about 90 mol % to about 97 mol %, about 90 mol % to about 94 mol %, about 93 mol % to about 97 mol %, or about 94 mol % to about 97 mol %. In some aspects, the sum of $SiO_2$ plus $B_2O_3$ can be about 86 mol %, about 87 mol %, or about 88 mol %.

In some implementations, the amounts of $SiO_2$, $B_2O_3$, and $Al_2O_3$ in the glass are selected such that a sum of $SiO_2$ plus $B_2O_3$ plus $Al_2O_3$ is from about 60 mol % to about 99.9 mol %. In some aspects, the sum of $SiO_2$ plus $B_2O_3$ plus $Al_2O_3$ is from about 60 mol % to about 99.9 mol %, about 60 mol % to about 95 mol %, about 60 mol % to about 90 mol %, about 60 mol % to about 85 mol %, about 60 mol % to about 80 mol %, about 60 mol % to about 75 mol %, about 60 mol % to about 70 mol %, about 65 mol % to about 99.9 mol %, about 65 mol % to about 95 mol %, about 65 mol % to about 90 mol %, about 65 mol % to about 85 mol %, about 65 mol % to about 80 mol %, about 65 mol % to about 75 mol %, about 65 mol % to about 70 mol %, about 70 mol % to about 99.9 mol %, about 70 mol % to about 95 mol %, about 70 mol % to about 90 mol %, about 70 mol % to about 85 mol %, about 70 mol % to about 80 mol %, about 70 mol % to about 75 mol %, about 75 mol % to about 99.9 mol %, about 75 mol % to about 95 mol %, about 75 mol % to about 90 mol %, about 75 mol % to about 85 mol %, about 75 mol % to about 80 mol %, about 80 mol % to about 99.9 mol %, about 80 mol % to about 95 mol %, about 80 mol % to about 90 mol %, or about 80 mol % to about 85 mol %. In some aspects, the sum of $SiO_2$ plus $B_2O_3$ plus $Al_2O_3$ is about 60 mol %, about 61 mol % about 62 mol %, about 63 mol %, about 64 mol %, about 65 mol %, about 70 mol %, about 71 mol %, about 72 mol %, about 73 mol %, about 74 mol %, about 75 mol %, about 76 mol %, about 77 mol %, about 78 mol %, about 79 mol %, about 80 mol %, about 84 mol %, about 85 mol %, about 86 mol %, about 87 mol %, about 88 mol %, about 89 mol %, about 90 mol %, about 94 mol %, about 95 mol %, about 96 mol %, about 98 mol %, about 99 mol %, about 99.9 mol %, or any sum between these values.

According to some aspects, when present, the glass can include one or more alkaline earth oxides (RO), where RO is CaO, MgO, BaO, and/or SrO. In some aspects, the one or more alkaline earth oxides are present individually or in a combined amount of from 0 mol % to about 15 mol %, 0 mol % to about 12 mol %, 0 mol % to about 10 mol %, 0 mol % to about 8 mol %, 0 mol % to about 5 mol %, about 0.001 mol % to about 15 mol %, about 0.001 mol % to about 12 mol %, about 0.001 mol % to about 10 mol %, about 0.001 mol % to about 8 mol %, about 0.001 mol % to about 8.5 mol %, about 0.001 mol % to about 5 mol %, about 1 mol % to about 15 mol %, about 1 mol % to about 12 mol %, about 1 mol % to about 10 mol %, about 1 mol % to about 8 mol %, about 1 mol % to about 8.5 mol %, about 1 mol % to about 5 mol %, about 2 mol % to about 15 mol %, about 2 mol % to about 12 mol %, about 2 mol % to about 10 mol %, about 2 mol % to about 8 mol %, about 2 mol % to about 8.5 mol %, about 2 mol % to about 5 mol %, about 5 mol % to about 15 mol %, about 5 mol % to about 12 mol %, about 5 mol % to about 10 mol %, or about 5 mol % to about 8 mol %. In some aspects, the one or more alkaline earth oxides are present individually or in a combined amount of 0 mol %, about 0.001 mol %, about 0.002 mol %, about 0.01 mol %, about 0.3 mol %, about 0.5 mol %, about 1 mol %, about 1.4 mol %, about 1.5 mol %, about 2 mol %, about 2.5 mol %, about 3 mol %, about 4 mol %, about 5 mol %, about 6 mol %, about 7 mol %, about 8 mol %, about 8.1 mol %, about 8.5 mol %, about 8.7 mol %, about 8.8 mol %, about 9 mol %, about 9.5 mol %, about 10 mol %, about 10.5 mol %, about 11 mol %, about 12 mol %, about 13 mol %, about 14 mol %, about 15 mol %, or any amount between these values.

In some implementations, the glass can include CaO and/or MgO. In some aspects, CaO is present in an amount of from 0 mol % to about 10 mol % and MgO is present in an amount of from 0 mol % to about 13 mol %. In some aspects, CaO is present in an amount of from 0 mol % to about 10 mol %, 0 mol % to about 9 mol %, 0 mol % to about 8 mol %, 0 mol % to about 6 mol %, 0 mol % to about 4 mol %, about 0.01 mol % to about 10 mol %, about 0.01 mol % to about 9 mol %, about 0.01 mol % to about 8 mol %, about 0.01 mol % to about 6 mol %, about 0.01 mol % to about 4 mol %, about 0.1 mol % to about 10 mol %, about 0.1 mol % to about 9 mol %, about 0.1 mol % to about 8 mol %, about 0.1 mol % to about 6 mol %, about 0.1 mol % to about 4 mol %, about 1 mol % to about 10 mol %, about 1 mol % to about 9 mol %, about 1 mol % to about 8 mol %, about 1 mol % to about 6 mol %, or about 1 mol % to about 4 mol %. For example, CaO can be present in an amount of 0 mol %, about 0.01 mol %, about 0.1 mol %, about 1 mol %, about 2 mol %, about 3 mol %, about 4 mol %, about 5 mol %, about 6 mol %, about 7 mol %, about 8 mol %, about 9 mol %, about 10 mol %, or any amount between these values. In some aspects, MgO is present in an amount of from 0 mol % to about 13 mol %, 0 mol % to about 12 mol %, 0 mol % to about 10 mol %, 0 mol % to about 9 mol %, 0 mol % to about 8 mol %, 0 mol % to about 6 mol %, 0 mol % to about 4 mol %, about 0.01 mol % to about 13 mol %, about 0.01 mol % to about 12 mol %, about 0.01 mol % to about 10 mol %, about 0.01 mol % to about 9 mol %, about 0.01 mol % to about 8 mol %, about 0.01 mol % to about 6 mol %, about 0.01 mol % to about 4 mol %, about 0.1 mol % to about 13 mol %, about 0.1 mol % to about 12 mol %, about 0.1 mol % to about 10 mol %, about 0.1 mol % to about 9 mol %, about 0.1 mol % to about 8 mol %, about 0.1 mol % to about 6 mol %, about 0.1 mol % to about 4 mol %, about 1 mol % to about 13 mol %, about 1 mol % to about 12 mol %, about 1 mol % to about 10 mol %, about 1 mol % to about 9 mol %, about 1 mol % to about 8 mol %, about 1 mol % to about 6 mol %, or about 1 mol % to about 4 mol %. For example, MgO can be present in an amount of 0 mol %, about 0.01 mol %, about 0.1 mol %, about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, or any amount between these values.

According to some aspects of the present disclosure, the glass can include MgO and at least one additional alkaline earth oxide (RO), selected from CaO, BaO, and SrO. In some examples, the combination of MgO and at least one additional RO can result in a glass having a lower dielectric constant and/or loss tangent compared to a glass that includes MgO or another RO alone. In one aspect, a total amount ($RO_{Total}$) of MgO and the at least one additional RO can be from about 3 mol % to about 15 mol %. For example, $RO_{Total}$ can be from about 3 mol % to about 15 mol %, about 3 mol % to about 12 mol %, about 3 mol % to about 10 mol %, about 3 mol % to about 8 mol %, about 3 mol % to about 6 mol %, about 4 mol % to about 15 mol %, about 4 mol % to about 12 mol %, about 4 mol % to about 10 mol %, about 4 mol % to about 8 mol %, about 4 mol % to about 6 mol %, about 5 mol % to about 15 mol %, about 3 mol % to about 12 mol %, about 5 mol % to about 10 mol %, about 5 mol % to about 8 mol %, about 6 mol % to about 15 mol %, about 6 mol % to about 12 mol %, about 6 mol % to about 10 mol %, about 6 mol % to about 8 mol %, about 8 mol % to about 15 mol %, about 8 mol % to about 12 mol %, or about 8 mol % to about 10 mol %. For example, $RO_{Total}$ can be about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, or any amount between these values.

In some aspects, a ratio of the amount of MgO to $RO_{Total}$ (MgO:$RO_{Total}$) is at least 0.3, at least 0.4, at least 0.5, at least 0.6, at least 0.7 or at least 0.8. For example, MgO:$RO_{Total}$ can be from about 0.3 to about 0.9, about 0.3 to about 0.8, about 0.3 to about 0.7, about 0.3 to about 0.6, about 0.3 to about 0.5, about 0.3 to about 0.4, about 0.4 to about 0.9, about 0.4 to about 0.8, about 0.4 to about 0.7, about 0.4 to about 0.6, about 0.4 to about 0.5, about 0.5 to about 0.9, about 0.5 to about 0.8, about 0.5 to about 0.7, about 0.5 to about 0.6, about 0.6 to about 0.9, about 0.6 to about 0.8, or about 0.6 to about 0.7. In some examples, MgO:$RO_{Total}$ is about 0.3, about 0.31, about 0.36, about 0.38, about 0.4, about 0.42, about 0.44, about 0.45, about 0.48, about 0.49, about 0.5, about 0.59, about 0.6, about 0.63, about 0.69, about 0.7, about 0.8, about 0.86, about 0.9, or any ratio between these values.

According to one implementation, the at least one additional RO is CaO and the MgO is present in an amount of from about 1 mol % to about 10 mol % and CaO is present from about 1 mol % to about 10 mol %. For example, MgO can be present in an amount of from about 1 mol % to about 10 mol %, about 2 mol % to about 10 mol %, about 3 mol % to about 10 mol %, about 4 mol % to about 10 mol %, about 5 mol % to about 10 mol %, about 1 mol % to about 8 mol %, about 2 mol % to about 8 mol %, about 3 mol % to about 8 mol %, about 4 mol % to about 8 mol %, about 5 mol % to about 8 mol %, about 1 mol % to about 7 mol %, about 2 mol % to about 7 mol %, about 3 mol % to about 7 mol %, about 4 mol % to about 7 mol %, about 5 mol % to about 7 mol %, about 1 mol % to about 5 mol %, about 2 mol % to about 5 mol %, about 3 mol % to about 5 mol %, or about 4 mol % to about 5 mol %, in any combination with CaO present in an amount of about 1 mol % to about 10 mol %, about 2 mol % to about 10 mol %, about 3 mol % to about 10 mol %, about 4 mol % to about 10 mol %, about 5 mol % to about 10 mol %, about 1 mol % to about 8 mol %, about 2 mol % to about 8 mol %, about 3 mol % to about 8 mol %, about 4 mol % to about 8 mol %, about 5 mol % to about 8 mol %, about 1 mol % to about 7 mol %, about 2 mol % to about 7 mol %, about 3 mol % to about 7 mol %, about 4 mol % to about 7 mol %, about 5 mol % to about 7 mol %, about 1 mol % to about 5 mol %, about 2 mol % to about 5 mol %, about 3 mol % to about 5 mol %, or about 4 mol % to about 5 mol %.

According to one implementation, the at least one additional RO is SrO and the MgO is present in an amount of from about 1 mol % to about 10 mol % and SrO is present from about 1 mol % to about 5 mol %. For example, MgO can be present in an amount of from about 1 mol % to about 10 mol %, about 2 mol % to about 10 mol %, about 3 mol % to about 10 mol %, about 4 mol % to about 10 mol %, about 5 mol % to about 10 mol %, about 1 mol % to about 8 mol %, about 2 mol % to about 8 mol %, about 3 mol % to about 8 mol %, about 4 mol % to about 8 mol %, about 5 mol % to about 8 mol %, about 1 mol % to about 5 mol %, about 2 mol % to about 5 mol %, about 3 mol % to about 5 mol %, or about 4 mol % to about 5 mol %, in any combination with SrO present in an amount of about 1 mol % to about 5 mol %, about 2 mol % to about 5 mol %, about 3 mol % to about 5 mol %, about 4 mol % to about 5 mol %, about 2 mol % to about 4 mol %, or about 3 mol % to about 4 mol %.

In some aspects, the amount of MgO and the amount of additional RO are selected as described above and in concert with an amount of $Al_2O_3$ present in the glass such that a ratio of $RO_{Total}$ to $Al_2O_3$ ($RO_{Total}$:$Al_2O_3$) is greater than 1. Providing a glass with a ratio $RO_{Total}$:$Al_2O_3$>1, can facilitate forming a manufacturable glass that can be drawn using conventional glass forming processes.

Without wishing to be bound by any theory, it is believed that for a glass derived from a precursor composition having a single RO species, as the concentration of the single RO species decreases, the dielectric constant and the loss tangent of the derived glass, as measured with signals of 10 GHz, also decreases. Thus, for a given glass, a lower dielectric constant and/or loss tangent may be achieved in the glass sample by decreasing the concentration of the single RO species present in the glass. Further, it is believed that for a given $RO_{Total}$ concentration, a reduced dielectric constant and/or loss tangent may be achieved in the glass sample by combining MgO with at least one additional RO species, such as CaO, SrO, and/or BaO, compared to a glass derived from a precursor composition having a similar $RO_{Total}$ concentration, but which includes only a single RO species. For example, for a given $RO_{Total}$ concentration, a glass including a combination of MgO plus CaO, SrO, and/or BaO according to the present disclosure may have a lower dielectric constant than a glass that includes only a single RO species selected from MgO, CaO, SrO, or BaO. In another example, for a given $RO_{Total}$ concentration, a glass including a combination of MgO plus CaO, SrO, and/or BaO according to the present disclosure may have a lower loss tangent than a glass that includes only a single RO species selected from CaO, SrO, or BaO.

In some aspects, the amount of alkaline earth oxides in the glass can be selected in concert with other materials, such as $B_2O_3$ and optionally $Al_2O_3$, to provide glasses having the desired characteristics. For example, increasing the amount of alkaline earth oxides relative to $SiO_2$ and $Al_2O_3$ can have the effect of decreasing the viscosity of a glass melt and may increase melting and forming temperatures. Alkaline earth oxides may also increase the CTE and density of the glass, and may affect other properties as well, such as the elastic modulus. Alkaline earth oxides can also decrease the liquidus temperature. Thus, in some aspects, the amounts of the alkaline earth oxides, $B_2O_3$, and $Al_2O_3$ can be selected according to the present disclosure to balance the desired physical properties and formability of the glass. In some implementations, the amounts of alkaline earth oxides, $B_2O_3$, and $Al_2O_3$ are selected such that a ratio of $RO_{Total}$:$(Al_2O_3+(0.5*B_2O_3))$ in the glass is from about 0 to about 0.9. In some aspects, the ratio of $RO_{Total}$:$(Al_2O_3+(0.5*B_2O_3))$ is from about 0 to about 0.9, about 0 to about 0.8, about 0 to about 0.7, about 0 to about 0.6, about 0 to about 0.5, about 0 to about 0.3, about 0.1 to about 0.9, about 0.1 to about 0.8, about 0.1 to about 0.7, about 0.1 to about 0.6, about 0.1 to about 0.5, about 0.2 to about 0.9, about 0.2 to about 0.8, about 0.2 to about 0.7, about 0.2 to about 0.6, about 0.2 to about 0.5, about 0.3 to about 0.9, about 0.3 to about 0.8, about 0.3 to about 0.7, about 0.3 to about 0.6, about 0.3 to about 0.5, about 0.4 to about 0.9, about 0.4 to about 0.8, about 0.4 to about 0.7, about 0.4 to about 0.6, about 0.1 to about 0.5, about 0.1 to about 0.4, about 0.1 to about 0.3, about 0.1 to about 0.2, about 0.2 to about 0.5, about 0.2 to about 0.4, about 0.2 to about 0.3, about 0.3 to about 0.5, about 0.3 to about 0.4, about 0.4 to about 0.5. In some aspects, the ratio of $RO_{Total}$:$(Al_2O_3+(0.5*B_2O_3))$ is about 0.1, about 0.2, about 0.3, about 0.4, about 0.5, about 0.6, about 0.7, about 0.8, about 0.9, or any ratio between these values.

In some implementations, the amounts of alkaline earth oxides, $B_2O_3$, and $Al_2O_3$ are selected such that a ratio of $RO_{Total}$:$(Al_2O_3+B_2O_3)$ in the glass is from about 0.2 to about 0.6. In some aspects, the ratio of $RO_{Total}$:$(Al_2O_3+B_2O_3)$ is from about 0.2 to about 0.6, about 0.2 to about 0.5, about 0.2 to about 0.4, about 0.3 to about 0.6, about 0.3 to about 0.5, about 0.3 to about 0.4, about 0.4 to about 0.6, about 0.4 to about 0.5, or about 0.5 to about 0.6. In some aspects, the ratio of $RO_{Total}$:$(Al_2O_3+B_2O_3)$ is about 0.2, about 0.24, about 0.25, about 0.28, about 0.29, about 0.3, about 0.32, about 0.35, about 0.36, about 0.4, about 0.5, about 0.55, about 0.58, about 0.6, or any ratio between these values.

In some aspects, the glasses of the present disclosure have a density of from about 2.2 g/cm$^3$ to about 2.5 g/cm$^3$, as measured at about 25° C. (about room temperature). For example, the glasses may have a density of from about 2.2 g/cm$^3$ to about 2.5 g/cm$^3$, about 2.3 g/cm$^3$ to about 2.5 g/cm$^3$, about 2.4 g/cm$^3$ to about 2.5 g/cm$^3$, about 2.2 g/cm$^3$ to about 2.4 g/cm$^3$, about 2.3 g/cm$^3$ to about 2.4 g/cm$^3$, or about 2.2 g/cm$^3$ to about 2.3 g/cm$^3$, as measured at about 25° C. (about room temperature).

The glasses of the present disclosure may optionally include one or more fining agents, such as, by way of non-limiting example, $SnO_2$, $Sb_2O_3$, $As_2O_3$, and/or one or more halogen salts, including fluorine, chlorine, or bromine salts. When a fining agent is present in the glass, the fining agent may be present in a total amount less than about 1 mol %. In some aspects, the fining agent is present in an amount of about 0.01 mol % to about 1 mol %, about 0.01 mol % to about 0.5 mol %, about 0.01 mol % to about 0.25 mol %, about 0.01 mol % to about 0.1 mol %, about 0.05 mol % to about 0.1 mol %, about 0.05 mol % to about 0.25 mol %, about 0.05 mol % to about 0.5 mol %, or about 0.05 mol % to about 1 mol %. In some aspects, the fining agent is present in an amount of about 0.08 mol %, about 0.09 mol %, or about 0.1 mol %. When the content of the fining agent is too large, the fining agent may enter the glass structure and affect various glass properties. However, when the content of the fining agent is too low, the glass may be difficult to form. According to one aspect of the disclosure, $SnO_2$ is included as a fining agent in an amount of 0 mol % to about 0.3 mol %. For example, $SnO_2$ may be present in an amount of 0 mol % to about 0.3 mol %, 0 mol % to about 0.2 mol %, 0 mol % to about 0.1 mol %, about 0.05 mol % to about 0.3 mol %, about 0.05 mol % to about 0.2 mol %, or about 0.05 mol % to about 0.1 mol %.

The glass may optionally include contaminants or unintended additives, such as $TiO_2$. These additional materials, when present, are typically present in very low or trace amounts of less than 0.2 mol %.

In some implementations, the glasses are substantially free of alkali metal. As used herein, the phrase substantially free is defined as meaning that no more than trace amounts of the material, in this case, alkali metal oxides, are present. Trace amounts of alkali metal oxides may be present due to contamination or limitations in manufacturing. As discussed above, in some implementations, the glasses of the present disclosure can be prepared without the addition of alkali metals such that the glasses are substantially free of alkali metals to decrease the likelihood of ion migration during. Decreasing or minimizing the likelihood of ion migration may be advantageous in some applications, such when the glasses are used as a substrate in an electronic device where ion migration may be undesirable.

In some implementations, the glasses of the present disclosure can include at least one alkali metal oxide ($R_2O$), where $R_2O$ is $Li_2O$, $Na_2O$, and/or $K_2O$. In some aspects, the one or more alkali metal oxides are present individually or in a combined amount of from 0 mol % to about 6 mol %. In some aspects, the one or more alkali metal oxides are present individually or in a combined amount of from 0 mol % to about 6 mol %, 0 mol % to about 5 mol %, 0 mol % to about 4 mol %, 0 mol % to about 3 mol %, 0 mol % to about 2 mol %, about 0.0005 mol % to about 6 mol %, about 0.0005 mol % to about 5 mol %, about 0.0005 mol % to about 4 mol %, about 0.0005 mol % to about 3 mol %, about 0.0005 mol % to about 2 mol %, about 0.001 mol % to about 6 mol %, about 0.001 mol % to about 5 mol %, about 0.001 mol % to about 4 mol %, about 0.001 mol % to about 3 mol %, about 0.001 mol % to about 2 mol %, about 0.01 mol % to about 6 mol %, about 0.01 mol % to about 5 mol %, about 0.01 mol % to about 4 mol %, about 0.01 mol % to about 3 mol %, about 0.01 mol % to about 2 mol %, about 0.1 mol % to about 6 mol %, about 0.1 mol % to about 5 mol %, about 0.1 mol % to about 4 mol %, about 0.1 mol % to about 3 mol %, about 0.1 mol % to about 2 mol %, about 1 mol % to about 6 mol %, about 1 mol % to about 5 mol %, about 1 mol % to about 4 mol %, about 1 mol % to about 3 mol %, or about 1 mol % to about 2 mol %. For example, $Li_2O$ can be present in an amount of from 0 mol % to about 6 mol %, 0 mol % to about 5 mol %, 0 mol % to about 4 mol %, 0 mol % to about 3 mol %, about 0.1 mol % to about 6 mol %, about 0.1 mol % to about 5 mol %, about 0.1 mol % to about 4 mol %, about 0.1 mol % to about 3 mol %, about 1 mol % to about 6 mol %, about 1 mol % to about 5 mol %, about 1 mol % to about 4 mol %, or about 1 mol % to about 3 mol %. In another example, $Na_2O$ can be present in an amount of from 0 mol % to about 0.05 mol %, 0 mol % to about 0.01 mol %, 0 mol % to about 0.005 mol %, 0 mol % to about 0.001 mol %, about 0.001 mol % to about 0.05 mol %, about 0.001 mol % to about 0.01 mol %, or about 0.001 mol % to about 0.005 mol %. In another example, $K_2O$ can be present in an amount of from 0 mol % to about 2 mol %, 0 mol % to about 1 mol %, 0 mol % to about 0.5 mol %, about 0.1 mol % to about 2 mol %, about 0.1 mol % to about 1 mol %, about 0.1 mol % to about 0.5 mol %, about 0.5 mol % to about 2 mol %, or about 0.5 mol % to about 1 mol %.

In some aspects, the glasses of the present disclosure can be characterized by a dielectric constant $D_k$ of about 10 or less, as measured with signals at 10 GHz. In some implementations, the glass has a dielectric constant $D_k$ of about 10 or less, about 8 or less, about 7.5 or less, about 6 or less, about 5 or less, about 4 or less, or about 3 or less, as measured with signals at 10 GHz. In some implementations, the glass has a dielectric constant $D_k$ of about 2 to about 10, about 3 to about 10, about 4 to about 10, about 5 to about 10, about 6 to about 10, about 7 to about 10, about 8 to about 10, about 9 to about 10, about 2 to about 8, about 2 to about 6, about 2 to about 4, about 3 to about 10, about 3 to about 8, about 3 to about 6, about 3 to about 5, about 3 to about 4, about 4 to about 6, about 4 to about 8, or about 4 to about 10, as measured with signals at 10 GHz. In some aspects, the glass has a dielectric constant $D_k$ of about 10, about 9, about 8, about 7, about 6, about 5, about 4.5, about 4, about 3.5, about 3, or any dielectric constant between these values, as measured with signals at 10 GHz.

In some aspects, the glasses of the present disclosure can be characterized by a loss tangent of about 0.01 or less, as measured with signals at 10 GHz. In some implementations, the glasses of the present disclosure are characterized by a loss tangent of about 0.01 or less, about 0.008 or less, about 0.005 or less, about 0.0025 or less, or about 0.001 or less, as measured with signals at 10 GHz. In some aspects, the glasses of the present disclosure are characterized by a loss tangent of about 0.0004 to about 0.01, about 0.001 to about 0.01, about 0.0025 to about 0.01, about 0.005 to about 0.01, about 0.0004 to about 0.001, about 0.0004 to about 0.0025, about 0.0004 to about 0.005, about 0.001 to about 0.0025, about 0.001 to about 0.005, about 0.0025 to about 0.005, about 0.0004 to about 0.008, about 0.001 to about 0.008, about 0.0025 to about 0.008, or about 0.005 to about 0.008, as measured with signals at 10 GHz. In some aspects, the glasses of the present disclosure have a loss tangent of about 0.0004, about 0.001, about 0.002, about 0.0025, about 0.003, about 0.004, about 0.005, about 0.006, about 0.007, about 0.008, or any loss tangent between these values, as measured with signals at 10 GHz.

In some implementations, the glass has a dielectric constant $D_k$ of about 10 or less, about 8 or less, about 7.5 or less, about 6 or less, about 5 or less, about 4 or less, or about 3 or less and a loss tangent of about 0.01 or less, about 0.008 or less, about 0.005 or less, about 0.0025 or less, or about 0.001 or less, both as measured with signals at 10 GHz. For example, the glass of the present disclosure can have a dielectric constant $D_k$ of about 2 to about 10, about 3 to about 10, about 4 to about 10, about 5 to about 10, about 6 to about 10, about 7 to about 10, about 8 to about 10, about 9 to about 10, about 2 to about 8, about 2 to about 6, about 2 to about 4, about 3 to about 10, about 3 to about 8, about 3 to about 6, about 3 to about 5, about 3 to about 4, about 4 to about 6, about 4 to about 8, or about 4 to about 10 and a loss tangent of about 0.0004 to about 0.01, about 0.001 to about 0.01, about 0.0025 to about 0.01, about 0.005 to about 0.01, about 0.0004 to about 0.001, about 0.0004 to about 0.0025, about 0.0004 to about 0.005, about 0.001 to about 0.0025, about 0.001 to about 0.005, about 0.0025 to about 0.005, about 0.0004 to about 0.008, about 0.001 to about 0.008, about 0.0025 to about 0.008, or about 0.005 to about 0.008, both as measured with signals at 10 GHz. In some examples, the glasses of the present disclosure have a dielectric constant of about 10 or less and a loss tangent of about 0.01 or less, both as measured with signals at 10 GHz. In other examples, the glass of the present disclosure have a dielectric constant of about 7.5 or less and a loss tangent of about 0.005 or less, both as measured with signals at 10 GHz, or a dielectric constant of about 5 or less and a loss tangent of about 0.005 or less, both as measured with signals at 10 GHz. In some examples, the glasses of the present disclosure have a dielectric constant of about 10 or less and a loss tangent of about 0.008 or less, both as measured with signals at 10 GHz.

According to one aspect of the present disclosure, the glasses of the present disclosure can have a CTE that facilitates forming glass laminates using a down-draw process, such as fusion drawing. As discussed above, in a laminate fusion draw process, two isopipes are employed to form a laminated sheet having a core glass composition surrounded on either or both sides by outer clad layers. For example, the glasses of the present disclosure can be used as clad surrounding a core glass layer having a CTE of about $31 \times 10^{-7}/°$ C. In another example, the glasses of the present disclosure can be used as clad with a core glass layer having a higher CTE such that a CTE mismatch exists between the core glass layer and the clad layer in which the CTE of the clad is less than or equal to the CTE of the core. Such a CTE mismatch can result in formation of compressive stress in the exterior region of the glass sheet and tensile stress in the interior region of the glass sheet upon cooling which can strengthen the glass. One example of a higher CTE glass is a glass having a CTE of $84 \times 10^{-7}/°$ C.

In some aspects, the glasses of the present disclosure are characterized by a relatively low CTE, which may be useful in clad layers for glass laminates in which the clad layer has a lower CTE than the core layer, and other implementations. In some aspects, the glasses of the present disclosure may also be characterized by an average CTE of about $25 \times 10^{-7}/°$ C. to about $65 \times 10^{-7}/°$ C., as measured from 0° C. to 300° C. In some aspects, the glasses of the present disclosure are characterized by a CTE of about $25 \times 10^{-7}/°$ C. to about $60 \times 10^{-7}/°$ C., about $25 \times 10^{-7}/°$ C. to about $55 \times 10^{-7}/°$ C., about $25 \times 10^{-7}/°$ C. to about $50 \times 10^{-7}/°$ C., about $25 \times 10^{-7}/°$ C. to about $45 \times 10^{-7}/°$ C., about $25 \times 10^{-7}/°$ C. to about $40 \times 10^{-7}/°$ C., about $25 \times 10^{-7}/°$ C. to about $35 \times 10^{-7}/°$ C., about $25 \times 10^{-7}/°$ C. to about $30 \times 10^{-7}/°$ C., about $30 \times 10^{-7}/°$ C. to about $65 \times 10^{-7}/°$ C., about $30 \times 10^{-7}/°$ C. to about $60 \times 10^{-7}/°$ C., about $30 \times 10^{-7}/°$ C. to about $55 \times 10^{-7}/°$ C., about $30 \times 10^{-7}/°$ C. to about $50 \times 10^{-7}/°$ C., about $30 \times 10^{-7}/°$ C. to about $30 \times 10^{-7}/°$ C., about $30 \times 10^{-7}/°$ C. to about $40 \times 10^{-7}/°$ C., about $30 \times 10^{-7}/°$ C. to about $35 \times 10^{-7}/°$ C., about $35 \times 10^{-7}/°$ C. to about $65 \times 10^{-7}/°$ C., about $35 \times 10^{-7}/°$ C. to about $60 \times 10^{-7}/°$ C., about $35 \times 10^{-7}/°$ C. to about $55 \times 10^{-7}/°$ C., about $35 \times 10^{-7}/°$ C. to about $50 \times 10^{-7}/°$ C., about $35 \times 10^{-7}/°$ C. to about $45 \times 10^{-7}/°$ C., about $35 \times 10^{-7}/°$ C. to about $40 \times 10^{-7}/°$ C., about $40 \times 10^{-7}/°$ C. to about $65 \times 10^{-7}/°$ C., about $40 \times 10^{-7}/°$ C. to about $60 \times 10^{-7}/°$ C., about $40 \times 10^{-7}/°$ C. to about $55 \times 10^{-7}/°$ C., about $40 \times 10^{-7}/°$ C. to about $50 \times 10^{-7}/°$ C., about $40 \times 10^{-7}/°$ C. to about $45 \times 10^{-7}/°$ C., about $50 \times 10^{-7}/°$ C. to about $60 \times 10^{-7}/°$ C., about $50 \times 10^{-7}/°$ C. to about $55 \times 10^{-7}/°$ C., about $50 \times 10^{-7}/°$ C. to about $65 \times 10^{-7}/°$ C., about $55 \times 10^{-7}/°$ C. to about $60 \times 10^{-7}/°$ C., or about $55 \times 10^{-7}/°$ C. to about $65 \times 10^{-7}/°$ C., as measured from 25° C. to 300° C. In some aspects, the glasses of the present disclosure have a CTE of about $28 \times 10^{-7}/°$ C., $29 \times 10^{-7}/°$ C., $30 \times 10^{-7}/°$ C., $31 \times 10^{-7}/°$ C., $32 \times 10^{-7}/°$ C., $33 \times 10^{-7}/°$ C., $34 \times 10^{-7}/°$ C., or $35 \times 10^{-7}/°$ C., as measured from 25° C. to 300° C.

In some implementations, the glasses of the present disclosure can also be characterized by a liquidus viscosity of from about 40 kPoise to about 5,000 kPoise. In some aspects the present glasses have a liquidus viscosity of about 40 kPoise to about 3000 kPoise, about 40 kPoise to about 2000 kPoise, about 40 kPoise to about 1000 kPoise, about 40 kPoise to about 800 kPoise, about 40 kPoise to about 600 kPoise, about 40 kPoise to about 400 kPoise, about 40 kPoise to about 300 kPoise, about 40 kPoise to about 250 kPoise, about 40 kPoise to about 200 kPoise, about 40 kPoise to about 100 kPoise, about 100 kPoise to about 500 kPoise, about 100 kPoise to about 400 kPoise, about 100 kPoise to about 300 kPoise, about 100 kPoise to about 200 kPoise, about 200 kPoise to about 300 kPoise, about 200 kPoise to about 400 kPoise, about 200 kPoise to about 500 kPoise, about 200 kPoise to about 5,000 kPoise, about 200 kPoise to about 3000 kPoise, about 200 kPoise to about 2000 kPoise, or about 200 kPoise to about 1000 kPoise.

In some implementations, the glasses of the present disclosure can also be characterized by a 35,000 Poise Temperature from about 1,110° C. to about 1,325° C. In some aspects, the 35,000 Poise Temperature is about 1,110° C. to about 1300° C., about 1,110° C. to about 1250° C., about 1,110° C. to about 1200° C., about 1200° C. to about 1,325° C., about 1250° C. to about 1,325° C., about 1300° C. to about 1,325° C., about 1200° C. to about 1300° C., about 1200° C. to about 1250° C., or about 1250° C. to about 1300° C. In some aspects, the 35,000 Poise Temperature of the glasses of the present disclosure are about 1120° C., about 1180° C., about 1190° C., about 1200° C., or about 1250° C.

In some implementations, the glasses of the present disclosure can also be characterized by a 200 Poise Melting Point of from about 1600° C. to about 1825° C. In some aspects, the 200 Poise Melting Point of the present glasses is about 1600° C. to about 1800° C., about 1600° C. to about 1750° C., about 1600° C. to about 1700° C., about 1600° C. to about 1650° C., 1640° C. to about 1825° C., 1640° C. to about 1800° C., about 1640° C. to about 1750° C., about 1640° C. to about 1700° C., about 1640° C. to about 1675° C., about 1675° C. to about 1825° C., about 1675° C. to about 1800° C., about 1675° C. to about 1750° C., about 1675° C. to about 1700° C., about 1700° C. to about 1825° C., about 1700° C. to about 1800° C., about 1700° C. to about 1750° C., about 1750° C. to about 1825° C., or about 1750° C. to about 1800° C. In some aspects, the 200 Poise Melting Point is about 1660° C., about 1670° C., about 1680° C., about 1690° C., about 1700° C., or about 1800° C.

In some implementations, the glasses of the present disclosure are suitable for use in printed circuit board (PCB) applications. A PCB laminate typically includes an insulating layer laminated to copper films with the insulating layer disposed between the copper clad films. The insulating layer preferably has a low dielectric loss, for example less than 0.005 at 10 GHz, and sufficient mechanical strength and fracture toughness to allow for handing and post processing in a production environment. The insulating layer should also be able withstand via/hole drilling without damage or fracture and, depending on the application, can be in the range of about 100 to 700 micrometers thick.

In addition, the insulating layer can preferably withstand temperatures of up to 260° C. for 30 seconds, while maintaining dimensional stability. This temperature is usually based on the temperature required for the solder reflow in post processing of the PCB boards. Solder paste is generally used to attach the electrical components to their contact pads. The assembly is then exposed to high temperatures (usually 260° C. for 30 seconds) to cause the solder to reflow and create a permanent solder joint. Thus, the insulating layer of the PCB would preferably be a low dielectric loss material that could also withstand the soldering reflow temperatures typically used in PCB processing with little to no softening or dimensional change.

There are some commercially available materials used as insulating layers in PCBs. For example, one common glass/epoxy laminate used as an insulating layer in PCB applications has a loss tangent of 0.0058 at signal frequencies of 10 GHz. However, this insulating laminate has a limiting loss tangent as the industry moves to higher and higher signal frequencies. Other laminates, such as fused silica/polymer laminates, have been found that exhibit low loss characteristics at frequencies of 10 GHz or more, however, the mechanical properties of the fused silica and polymer layer limits the use of these laminates in some processes, as the fused silica layer may crack during post processing.

According to one aspect, the glasses of the present disclosure may be suitable for use as an insulating layer in PCB applications. The glasses of the present disclosure are characterized by dielectric properties, such as a low dielectric constant and a low loss tangent at signal frequencies of 10 GHz, which are desirable as the industry moves to higher signal frequencies. Forming an insulating laminate utilizing the present glasses in combination with a polymer film that also has a low loss tangent may result in an even further decrease in the overall loss tangent of the PCB laminate.

In some implementations, the glasses of the present disclosure can be characterized by a dimensional stability suitable for use in PCB applications. As used herein, dimensional stability is defined as dimensional stability for 30 seconds when heated at 260° C. As discussed above, typical PCB processing includes soldering reflow temperatures around 260° C. The glasses of the present disclosure can be characterized by a softening point well above 260° C., indicative of the dimensional stability of the glass at temperatures typically experienced in PCB soldering reflow processes. One example for determining dimensional stability of the glass includes determining the length, width, thickness, weight, volume, and/or density of pre-cut samples prior to heating the samples in an oven that has been pre-heated to 260° C. The samples can be heated for 30 seconds and then removed. Upon cooling back to room temperature, the length, width, thickness, weight, volume, and/or density of the samples can be determined and compared with the values obtained for each sample prior to heating to determine the relative change for each parameter.

Unless otherwise specified, the glasses according to the present disclosure are prepared by blending powder batches of the constituents (also referred to as a glass precursor composition) by turbula for 60 minutes and melting in a covered platinum crucible at 1650° C. for 16 hours. The melted glass is then poured out as blocks and annealed at 550-600° C. As understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents, which may result in differences in the constituent content between the as-batched composition (i.e., the glass precursor composition from which the glass is derived) and the final glass article. As such, the term "about," in relation to such constituents, is intended to encompass values within about 1 mol % when measuring final articles as compared to the as-batched compositions provided herein. It is understood that it is within the scope of the present disclosure to form glasses using the as-batched compositions described herein using different processes and/or process parameters and that such differences in processing of the as-batched compositions may result in different levels of volatilization during melting of the constituents.

Exemplary Glass Compositions A for the glasses of the present disclosure according to an aspect of the present disclosure are shown below in Table 1. Table 1 identifies the combination of materials and their respective amounts, in ranges, according to the present disclosure. The Exemplary Glass Compositions A in Table 1 may include additional components according to any aspects of the present disclosure as described herein.

TABLE 1

Exemplary Glass Compositions A

| Component | Amount (mol %) |
|---|---|
| $SiO_2$ | about 60 to about 80 |
| $Al_2O_3$ | 0 to about 13 |
| $B_2O_3$ | about 15 to about 28 |
| RO (CaO, MgO, BaO, and/or SrO) | 0 to about 15 |
| Optionally | |
| $B_2O_3$: $(Al_2O_3 + SiO_2)$ | about 0.13 to about 0.35 |
| $RO_{Total}$: $(Al_2O_3 + (0.5 * B_2O_3))$ | about 0 to about 0.9 |

Exemplary Glass Compositions B for the glasses of the present disclosure according to an aspect of the present disclosure are shown below in Table 2. Table 2 identifies the combination of materials and their respective amounts, in ranges, according to the present disclosure. The Exemplary Glass Compositions B in Table 2 may include additional components according to any aspects of the present disclosure as described herein.

TABLE 2

Exemplary Glass Compositions B

| Component | Amount (mol %) |
|---|---|
| $SiO_2$ | about 60 to about 80 |
| $Al_2O_3$ | 0 to about 13 |
| $B_2O_3$ | about 15 to about 28 |
| A total amount $RO_{Total}$ of MgO plus at least one additional RO (CaO, BaO, SrO) | about 3 to about 15 |
| Optionally | |
| MgO:$RO_{Total}$ | ≥0.3 |
| $RO_{Total}$: $(Al_2O_3 + B_2O_3)$ | about 0.2 to about 0.6 |
| $B_2O_3$: $(Al_2O_3 + SiO_2)$ | about 0.19 to about 0.35 |

In some implementations, the glasses made from the Exemplary Glass Compositions A and/or B according to Tables 1 and 2, respectively, have a dielectric constant of about 10 or less, about 7.5 or less, about 5 or less, about 4 or less, about 3 or less, about 2 to about 10, about 3 to about 10, about 4 to about 10, about 5 to about 10, about 6 to about 10, about 7 to about 10, about 8 to about 10, about 9 to about 10, about 2 to about 8, about 2 to about 6, about 2 to about 4, about 3 to about 10, about 3 to about 8, about 3 to about 6, about 3 to about 5, about 3 to about 4, about 4 to about 6, about 4 to about 8, or about 4 to about 10, in combination with a loss tangent of about 0.01 or less, about 0.008 or less, about 0.005 or less, about 0.0025 or less, about 0.001 or less, about 0.0004 to about 0.01, about 0.001 to about 0.01, about 0.0025 to about 0.01, about 0.005 to about 0.01, about 0.0004 to about 0.001, about 0.0004 to about 0.0025, about 0.0004 to about 0.005, about 0.001 to about 0.0025, about 0.001 to about 0.005, about 0.0025 to about 0.005, about 0.0004 to about 0.008, about 0.001 to about 0.008, about 0.0025 to about 0.008, or about 0.005 to about 0.008, as measured with signals at 10 GHz.

The glasses derived from the Exemplary Glass Compositions A and/or B according to Tables 1 and 2, respectively, may also be further characterized by an average CTE of about $25 \times 10^{-7}$/° C. to about $65 \times 10^{-7}$/° C., about $25 \times 10^{-7}$/° C. to about $60 \times 10^{-7}$/° C., about $25 \times 10^{-7}$/° C. to about $55 \times 10^{-7}$/° C., about $25 \times 10^{-7}$/° C. to about $50 \times 10^{-7}$/° C., about $25 \times 10^{-7}$/° C. to about $45 \times 10^{-7}$/° C., about $25 \times 10^{-7}$/° C. to about $40 \times 10^{-7}$/° C., about $25 \times 10^{-7}$/° C. to about $35 \times 10^{-7}$/° C., about $25 \times 10^{-7}$/° C. to about $30 \times 10^{-7}$/° C., about $30 \times 10^{-7}$/° C. to about $65 \times 10^{-7}$/° C., about $30 \times 10^{-7}$/° C. to about $60 \times 10^{-7}$/° C., about $30 \times 10^{-7}$/° C. to about $55 \times 10^{-7}$/° C., about $30 \times 10^{-7}$/° C. to about $50 \times 10^{-7}$/° C., about $30 \times 10^{-7}$/° C. to about $30 \times 10^{-7}$/° C., about $30 \times 10^{-7}$/° C. to about $40 \times 10^{-7}$/° C., about $30 \times 10^{-7}$/° C. to about $35 \times 10^{-7}$/° C., about $35 \times 10^{-7}$/° C. to about $65 \times 10^{-7}$/° C., about $35 \times 10^{-7}$/° C. to about $60 \times 10^{-7}$/° C., about $35 \times 10^{-7}$/° C. to about $55 \times 10^{-7}$/° C., about $35 \times 10^{-7}$/° C. to about $50 \times 10^{-7}$/° C., about $35 \times 10^{-7}$/° C. to about $45 \times 10^{-7}$/° C., about $35 \times 10^{-7}$/° C. to about $40 \times 10^{-7}$/° C., about $40 \times 10^{-7}$/° C. to about $65 \times 10^{-7}$/° C., about $40 \times 10^{-7}$/° C. to about $60 \times 10^{-7}$/° C., about $40 \times 10^{-7}$/° C. to about $55 \times 10^{-7}$/° C., about $40 \times 10^{-7}$/° C. to about $50 \times 10^{-7}$/° C., about $40 \times 10^{-7}$/° C. to about $45 \times 10^{-7}$/° C., about $50 \times 10^{-7}$/° C. to about $60 \times 10^{-7}$/° C., about $50 \times 10^{-7}$/° C. to about $55 \times 10^{-7}$/° C., about $50 \times 10^{-7}$/° C. to about $65 \times 10^{-7}$/° C., about $55 \times 10^{-7}$/° C. to about $60 \times 10^{-7}$/° C., or about $55 \times 10^{-7}$/° C. to about $65 \times 10^{-7}$/° C., as measured from 25° C. to 300° C.

The glasses derived from the Exemplary Glass Compositions A and/or B according to Tables 1 and 2, respectively, may also be further characterized by dimensional stability for 30 seconds at 260° C.

In some implementations, the glasses derived from the Exemplary Glass Compositions A and/or B according to Tables 1 and 2, respectively, may have a liquidus viscosity of from about 40 kPoise to about 5,000 kPoise, about 40 kPoise to about 3000 kPoise, about 40 kPoise to about 2000 kPoise, about 40 kPoise to about 1000 kPoise, about 40 kPoise to about 800 kPoise, about 40 kPoise to about 600 kPoise, about 40 kPoise to about 400 kPoise, about 40 kPoise to about 300 kPoise, about 40 kPoise to about 250 kPoise, about 40 kPoise to about 200 kPoise, about 40 kPoise to about 100 kPoise, about 100 kPoise to about 500 kPoise, about 100 kPoise to about 400 kPoise, about 100 kPoise to about 300 kPoise, about 100 kPoise to about 200 kPoise, about 200 kPoise to about 300 kPoise, about 200 kPoise to about 400 kPoise, about 200 kPoise to about 500 kPoise, about 200 kPoise to about 5,000 kPoise, about 200 kPoise to about 3000 kPoise, about 200 kPoise to about 2000 kPoise, or about 200 kPoise to about 1000 kPoise.

In some implementations, the glasses derived from the Exemplary Glass Compositions A and/or B according to Tables 1 and 2, respectively, may be further characterized by a 35,000 Poise Temperature from about 1,110° C. to about 1,325° C. In some aspects, the 35,000 Poise Temperature is about 1,110° C. to about 1300° C., about 1,110° C. to about 1250° C., about 1,110° C. to about 1200° C., about 1200° C. to about 1,325° C., about 1250° C. to about 1,325° C., about 1300° C. to about 1,325° C., about 1200° C. to about 1300° C., about 1200° C. to about 1250° C., or about 1250° C. to about 1300° C. In some aspects, the 35,000 Poise Temperature of the glasses of the present disclosure are about 1120° C., about 1180° C., about 1190° C., about 1200° C., or about 1250° C.

In some implementations, the glasses derived from the Exemplary Glass Compositions A and/or B according to Tables 1 and 2, respectively, may further be characterized by a 200 Poise Melting Point of from about 1600° C. to about 1825° C. In some aspects, the 200 Poise Melting Point of the present glasses is about 1600° C. to about 1800° C., about 1600° C. to about 1750° C., about 1600° C. to about 1700° C., about 1600° C. to about 1650° C., 1640° C. to about 1825° C., about 1640° C. to about 1800° C., about 1640° C. to about 1750° C., about 1640° C. to about 1700° C., about 1640° C. to about 1675° C., about 1675° C. to about 1825° C., about 1675° C. to about 1800° C., about 1675° C. to about 1750° C., about 1675° C. to about 1700° C., about 1700° C. to about 1825° C., about 1700° C. to about 1800° C., about 1700° C. to about 1750° C., about 1750° C. to about 1825° C., or about 1750° C. to about 1800° C. In some aspects, the 200 Poise Melting Point is about 1660° C., about 1670° C., about 1680° C., about 1690° C., about 1700° C., or about 1800° C.

According to another aspect of the present disclosure, the components of exemplary glasses according to the present disclosure can be defined according to a convex hull where the boundary points of the convex hull are based on sums of concentrations of the oxides present in the glass. The convex hull of a set of N points in a Euclidean space is the smallest convex set that contains the N points. The boundary points of the convex hull can be represented as coordinates in a three-dimensional Cartesian coordinate system with origin 0 and X, Y, and Z coordinate axes. In the present disclosure, the N points defining the convex hull are based on a concentration of 15 oxides present in exemplary glasses according to the present disclosure, and for which experimental dielectric constant and loss tangent data was obtained. The boundary points of the convex hull are based on the composition of exemplary glasses according to the present disclosure which exhibited the desired dielectric properties, in this case a dielectric constant of 10 or less and a loss tangent of 0.008 or less, as measured with signals at 10 GHz. The convex hulls for the present disclosure were based on experimental data for 37 exemplary glasses, shown in Table 3 below. Table 3 includes Exemplary Glasses ("EG") according to the present disclosure, in mol %, as calculated on an oxide basis from the as-batched glasses (i.e., the glass precursor composition) and the measured dielectric constant ($D_k$) and loss tangent of the glass. The 15 oxides used to define the convex hull for the exemplary glasses of the present disclosure include: $SiO_2$, $Al_2O_3$, $B_2O_3$, $Li_2O$, $Na_2O$, $K_2O$, MgO, CaO, SrO, BaO, $SnO_2$, ZnO, $La_2O_3$, F, and $Fe_2O_3$. These 15 oxides were divided into 3 groups, with a sum of the amount of the oxides in each group representing one of the coordinates of the boundary points defining the convex hull. The "X" coordinate of the boundary points of the convex hull can be based on a first sum ($X_{sum}$) of the amount of $SiO_2$, $Al_2O_3$, and $B_2O_3$ present in the glass (in percent by mole of oxide). The "Y" coordinate of the boundary points of the convex hull can be based on a second sum ($Y_{sum}$) of the amount of $Li_2O$, $Na_2O$, $K_2O$, MgO, CaO, SrO, and BaO present in the glass (in percent by mole of oxide). The "Z" coordinate of the boundary points of the convex hull can be based on a third sum ($Z_{sum}$) of the amount of $SnO_2$, ZnO, $La_2O_3$, F, and $Fe_2O_3$ present in the glass (in percent by mole of oxide). An individual amount of any one of the components for each boundary point may be 0 (i.e., the particular component is not added to the composition). The sum of the X, Y, and Z coordinate for each boundary point is equal to 100.

TABLE 3

Compositions and Measured Dielectric Constant and Loss Tangent for Exemplary Glasses

| Ex. Glass | $SiO_2$ | $Al_2O_3$ | $B_2O_3$ | $Li_2O$ | $Na_2O$ | $K_2O$ | MgO | CaO | SrO | BaO |
|---|---|---|---|---|---|---|---|---|---|---|
| EG2 | 70.13 | 2.77 | 22.72 | 0 | 0.001 | 0.01 | 3.05 | 1.23 | 0 | 0 |
| EG3 | 68.60 | 6.89 | 16.87 | 0 | 0.001 | 0.01 | 2.72 | 4.82 | 0 | 0 |
| EG4 | 68.86 | 6.89 | 17.88 | 0 | 0 | 0.01 | 1.95 | 4.32 | 0 | 0 |
| EG5 | 75.00 | 3.00 | 22.00 | 0 | 0.001 | 0 | 0 | 0 | 0 | 0 |
| EG6 | 69.68 | 5.20 | 16.15 | 0 | 0.001 | 0 | 3.28 | 1.10 | 0 | 0 |
| EG7 | 70.27 | 3.82 | 20.67 | 0 | 0.001 | 0 | 3.11 | 2.05 | 0 | 0 |
| EG8 | 69.47 | 4.79 | 19.71 | 0 | 0.002 | 0 | 2.98 | 2.97 | 0 | 0 |
| EG9 | 69.57 | 5.78 | 17.86 | 0 | 0.001 | 0 | 2.83 | 3.86 | 0 | 0 |
| EG10 | 68.42 | 6.72 | 16.31 | 0 | 0.001 | 0 | 5.92 | 2.55 | 0 | 0 |
| EG11 | 69.06 | 6.96 | 13.25 | 0 | 0.001 | 0 | 2.77 | 4.74 | 0 | 0 |
| EG12 | 70.40 | 7.00 | 16.65 | 0 | 0.001 | 0 | 4.47 | 0.00 | 0 | 1.39 |
| EG13 | 69.32 | 7.06 | 16.49 | 0 | 0.001 | 0 | 6.10 | 0.00 | 0 | 0.95 |
| EG14 | 68.67 | 8.68 | 11.69 | 0 | 0.001 | 0 | 3.67 | 0.05 | 0 | 3.02 |
| EG15 | 70.12 | 7.92 | 13.10 | 0 | 0.001 | 0 | 4.25 | 0.05 | 0 | 1.31 |
| EG16 | 68.95 | 6.72 | 13.16 | 0 | 0.001 | 0 | 3.24 | 3.66 | 0 | 1.00 |
| EG17 | 68.18 | 6.75 | 11.27 | 0 | 0.001 | 0 | 3.58 | 3.92 | 0 | 1.10 |
| EG18 | 68.34 | 7.72 | 11.30 | 0 | 0.001 | 0 | 3.59 | 3.91 | 0 | 1.09 |
| EG19 | 67.61 | 11.08 | 9.85 | 0 | 0.001 | 0 | 2.27 | 8.78 | 0 | 0.34 |
| EG20 | 70.89 | 7.06 | 16.08 | 0 | 0 | 0 | 4.43 | 0.04 | 0 | 1.35 |
| EG21 | 71.40 | 7.16 | 16.14 | 0 | 0.001 | 0 | 4.48 | 0.04 | 0 | 0.66 |
| EG22 | 72.04 | 7.25 | 16.07 | 0 | 0.001 | 0 | 4.50 | 0.04 | 0 | 0.00 |
| EG23 | 68.46 | 8.86 | 11.25 | 0 | 0.001 | 0 | 3.77 | 0.05 | 0 | 3.11 |
| EG24 | 68.68 | 8.85 | 11.18 | 0 | 0.001 | 0 | 3.76 | 0.04 | 0 | 1.55 |
| EG25 | 68.59 | 8.77 | 11.27 | 0 | 0.001 | 0 | 3.75 | 0.04 | 0 | 0 |
| EG26 | 69.29 | 11.50 | 12.86 | 0 | 0.001 | 0 | 3.09 | 0.05 | 0 | 3.01 |
| EG27 | 70.21 | 7.05 | 12.65 | 0 | 0.001 | 0 | 4.94 | 0.06 | 0 | 4.83 |
| EG28 | 58.38 | 5.07 | 14.96 | 0 | 0.001 | 0 | 10.07 | 0.12 | 0 | 10.94 |
| EG29 | 66.55 | 10.70 | 11.98 | 0 | 0.001 | 0 | 2.92 | 0.05 | 0 | 2.81 |
| EG30 | 66.75 | 6.73 | 12.01 | 0 | 0.001 | 0 | 4.76 | 0.06 | 0 | 4.66 |
| EG31 | 54.19 | 4.87 | 14.66 | 0 | 0.001 | 0 | 9.57 | 0.13 | 0 | 10.96 |
| EG32 | 70.42 | 7.07 | 13.32 | 0 | 0.001 | 0.01 | 8.50 | 0.06 | 0.52 | 0.01 |
| EG33 | 69.14 | 7.16 | 15.49 | 0 | 0.001 | 0.01 | 5.10 | 3.00 | 0 | 0 |
| EG34 | 70.13 | 2.77 | 22.72 | 0 | 0.001 | 0.01 | 3.05 | 1.23 | 0 | 0 |

TABLE 3-continued

Compositions and Measured Dielectric Constant and Loss Tangent for Exemplary Glasses

| EG35 | 68.60 | 6.89 | 16.87 | 0 | 0.001 | 0.01 | 2.72 | 4.82 | 0 | 0 |
|---|---|---|---|---|---|---|---|---|---|---|
| EG36 | 68.86 | 6.89 | 17.88 | 0 | 0.001 | 0.01 | 1.95 | 4.32 | 0 | 0 |
| EG37 | 73.21 | 0.09 | 23.28 | 3.02 | 0.001 | 0.29 | 0.01 | 0.02 | 0 | 0 |
| EG38 | 71.16 | 5.32 | 19.03 | 0 | 0.001 | 0 | 3.26 | 1.15 | 0 | 0 |

| Ex. Glass | $SnO_2$ | ZnO | $La_2O_3$ | F | $Fe_2O_3$ | $D_k$ | Loss tangent |
|---|---|---|---|---|---|---|---|
| EG2 | 0.09 | 0 | 0 | 0 | 0.001 | 4 | 0.001 |
| EG3 | 0.09 | 0 | 0 | 0 | 0 | 4.4 | 0.002 |
| EG4 | 0.08 | 0 | 0 | 0 | 0.001 | 4.5 | 0.0023 |
| EG5 | 0.08 | 0 | 0 | 0 | 0.001 | 3.82 | 0.00045 |
| EG6 | 0.08 | 0 | 0 | 4.51 | 0.001 | 4.09 | 0.0011 |
| EG7 | 0.08 | 0 | 0 | 0 | 0.001 | 4.04 | 0.0013 |
| EG8 | 0.08 | 0 | 0 | 0 | 0.001 | 4.18 | 0.0015 |
| EG9 | 0.09 | 0 | 0 | 0 | 0.001 | 4.32 | 0.0021 |
| EG10 | 0.08 | 0 | 0 | 0 | 0.001 | 4.38 | 0.0024 |
| EG11 | 0.10 | 3.12 | 0 | 0 | 0.001 | 4.71 | 0.0027 |
| EG12 | 0.09 | 0 | 0 | 0 | 0.001 | 4.34 | 0.0021 |
| EG13 | 0.08 | 0 | 0 | 0 | 0.001 | 4.34 | 0.0022 |
| EG14 | 0.10 | 4.13 | 0 | 0 | 0.001 | 4.89 | 0.0033 |
| EG15 | 0.10 | 3.15 | 0 | 0 | 0.001 | 4.59 | 0.0027 |
| EG16 | 0.10 | 3.16 | 0 | 0 | 0.001 | 4.66 | 0.0025 |
| EG17 | 0.10 | 5.11 | 0 | 0 | 0 | 4.91 | 0.0031 |
| EG18 | 0.10 | 3.94 | 0 | 0 | 0.001 | 4.88 | 0.0032 |
| EG19 | 0.08 | 0 | 0 | 0 | 0.001 | 5.18 | 0.006 |
| EG20 | 0.11 | 0 | 0 | 0 | 0.001 | 4.32 | 0.0021 |
| EG21 | 0.11 | 0 | 0.70 | 0 | 0.002 | 4.4 | 0.002 |
| EG22 | 0.11 | 0 | 1.40 | 0 | 0.001 | 4.47 | 0.0091 |
| EG23 | 0.11 | 4.29 | 0 | 0 | 0.001 | 4.9 | 0.0036 |
| EG24 | 0.11 | 5.79 | 0 | 0 | 0.001 | 4.76 | 0.0033 |
| EG25 | 0.11 | 7.47 | 0 | 0 | 0.001 | 4.64 | 0.0029 |
| EG26 | 0.12 | 0 | 0 | 0 | 0 | 4.78 | 0.0033 |
| EG27 | 0.11 | 0 | 0 | 0 | 0.001 | 4.91 | 0.0035 |
| EG28 | 0.12 | 0 | 0 | 0 | 0.001 | 5.86 | 0.0044 |
| EG29 | 0.11 | 4.80 | 0 | 0 | 0.001 | 4.9 | 0.0034 |
| EG30 | 0.11 | 4.79 | 0 | 0 | 0.001 | 5.07 | 0.0038 |
| EG31 | 0.12 | 5.19 | 0 | 0 | 0.001 | 6.31 | 0.0049 |
| EG32 | 0.10 | 0 | 0 | 0 | 0.001 | 4.42 | 0.0025 |
| EG33 | 0.11 | 0 | 0 | 0 | 0.001 | 4.43 | 0.0023 |
| EG34 | 0.09 | 0 | 0 | 0 | 0.001 | 4 | 0.001 |
| EG35 | 0.09 | 0 | 0 | 0 | 0.001 | 4.45 | 0.0021 |
| EG36 | 0.08 | 0 | 0 | 0 | 0.001 | 4.49 | 0.00231 |
| EG37 | 0.09 | 0 | 0 | 0 | 0.001 | 4.1 | 0.0018 |
| EG38 | 0.09 | 0 | 0 | 0 | 0.001 | 4.09 | 0.0014 |

According to an aspect of the present disclosure, exemplary glasses can be derived from Exemplary Glass Compositions C having components that satisfy a convex hull defined by the boundary points identified in Table 4, and which exhibit a dielectric constant of about 10 or less and/or a loss tangent of about 0.008 or less, as measured with signals at 10 GHz. The glass compositions in Table 4 may include additional components according to any aspects of the present disclosure as described herein.

TABLE 4

Boundary Points for Convex Hull of Exemplary Glass Compositions C

| $SiO_2 + Al_2O_3 +$ $B_2O_3$ (in percent by mole of oxide) | $Li_2O + Na_2O +$ $K_2O + MgO +$ CaO + SrO + BaO (in percent by mole of oxide) | $SnO_2 + ZnO +$ $La_2O_3 + F +$ $Fe_2O_3$ (in percent by mole of oxide) |
|---|---|---|
| 64.57 | 16.83 | 18.61 |
| 68.90 | 11.92 | 19.19 |
| 79.42 | 3.47 | 17.11 |
| 84.82 | 2.43 | 12.75 |
| 99.92 | 0.01 | 0.07 |
| 95.83 | 4.17 | 0 |
| 78.68 | 21.21 | 0.11 |
| 73.02 | 26.22 | 0.76 |
| 64.74 | 31.59 | 3.67 |
| 63.81 | 30.85 | 5.34 |
| 61.93 | 29.14 | 8.93 |
| 60.92 | 23.85 | 15.23 |

The boundary points in Table 4 are based on grouping the oxides as shown in Table 4 to provide each of the X, Y, and Z coordinates. However, the X, Y, and Z coordinates for each of the boundary points of the convex hull of the Exemplary Glass Compositions C can be represented by different groupings of the oxides, resulting in different values for $X_{sum}$, $Y_{sum}$, and $Z_{sum}$, while still defining the Exemplary Glass Compositions C.

Figure 2:
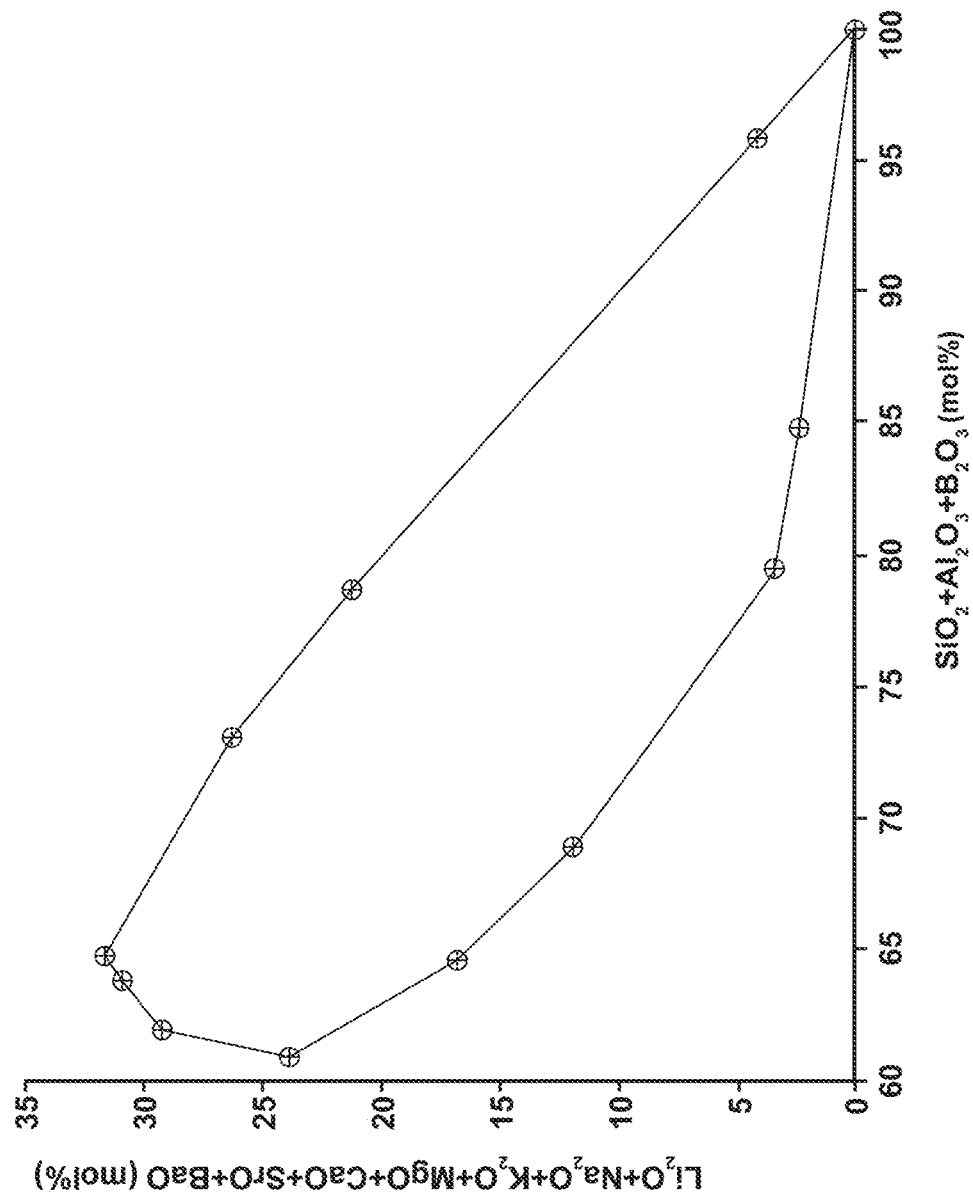
FIG. 2 is a plot of a 2-dimensional convex hull defined by boundary points of a sum ($X_{sum}$) of $SiO_2$, $Al_2O_3$, and $B_2O_3$ and a sum ($Y_{sum}$) of $Li_2O$, $Na_2O$, $K_2O$, MgO, CaO, SrO, and BaO of a glass, according to an aspect of the present disclosure.

FIG. 2 is a 2-dimensional plot of the X and Y coordinates of the convex hull defined by the boundary points of the convex hull of the Exemplary Glass Compositions C of Table 4.

According to another aspect of the present disclosure, exemplary glasses can be derived from Exemplary Glass Compositions D having components that satisfy a convex hull defined by the boundary points identified in Table 5 and which exhibit a dielectric constant of about 10 or less and/or a loss tangent of about 0.008 or less, as measured with signals at 10 GHz. The glass compositions in Table 5 may include additional components according to any aspects of the present disclosure as described herein.

TABLE 5

Boundary Points of Convex Hull of Exemplary Glass Compositions D

| $SiO_2 + Al_2O_3 + B_2O_3$ (in percent by mole of oxide) | $Li_2O + Na_2O + K_2O + MgO + CaO + SrO + BaO$ (in percent by mole of oxide) | $SnO_2 + ZnO + La_2O_3 + F + Fe_2O_3$ (in percent by mole of oxide) |
|---|---|---|
| 88.53 | 11.39 | 0.08 |
| 78.42 | 21.13 | 0.45 |
| 73.72 | 20.66 | 5.62 |
| 88.63 | 3.78 | 7.58 |
| 100.00 | 0 | 0 |

The boundary points in Table 5 are based on grouping the oxides as shown in Table 5 to provide each of the X, Y, and Z coordinates. However, the X, Y, and Z coordinates for each of the boundary points of the convex hull of the Exemplary Glass Compositions D can be represented by different groupings of the oxides, resulting in different values for $X_{sum}$, $Y_{sum}$, and $Z_{sum}$, while still defining the Exemplary Glass Compositions D.

Figure 3:
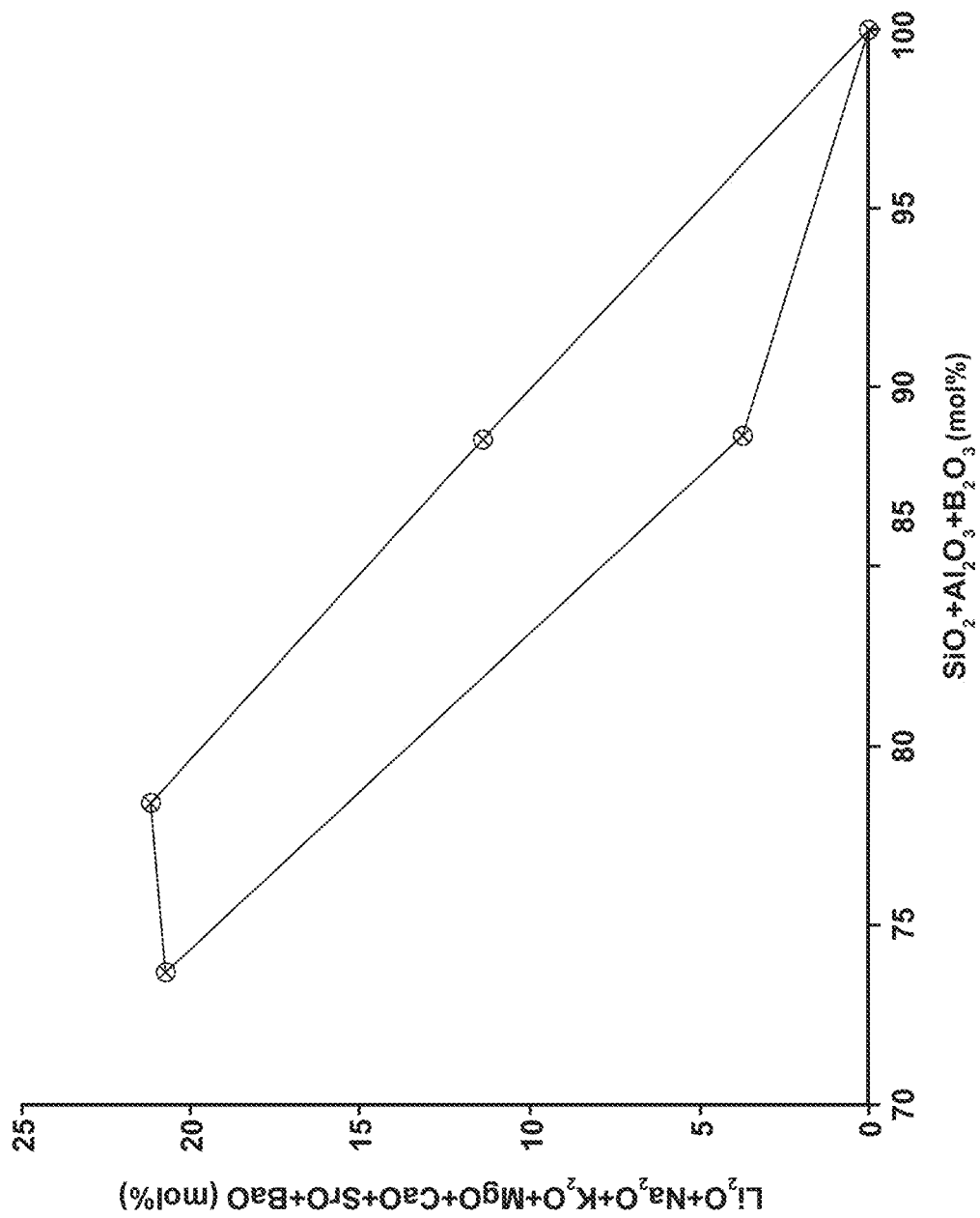
FIG. 3 is a plot of a 2-dimensional convex hull defined by boundary points of a sum ($X_{sum}$) of $SiO_2$, $Al_2O_3$, and $B_2O_3$ and a sum ($Y_{sum}$) of $Li_2O$, $Na_2O$, $K_2O$, MgO, CaO, SrO, and BaO of a glass, according to an aspect of the present disclosure.

FIG. 3 is a 2-dimensional plot of the X and Y coordinates of the convex hull defined by the boundary points of the convex hull of the Exemplary Glass Compositions D of Table 5.

The X, Y, and Z coordinates of the boundary points of the convex hulls of Table 4 and Table 5 correspond to a sum of the amount of multiple oxides. In some examples, one or more of these oxides may not be added to the glass composition (i.e., the composition may be substantially free of that particular oxide), and thus the concentration of that particular oxide would be "0" for the purposes of determining the value of the coordinate. In one example, the glass is substantially free of F, $La_2O_3$, and/or ZnO. In this case, when determining the value of the Z coordinate of the boundary point for the convex hull of Table 4 or Table 5, a value of "0" would be entered for those oxides not added to the composition. According to another aspect of the present disclosure, the exemplary glass include F, $La_2O_3$, and/or ZnO. In some aspects, the exemplary glass includes alkali metal oxides ($R_2O$). In some aspects, the exemplary glass can include at least MgO from the group of $Li_2O$, $Na_2O$, $K_2O$, MgO, CaO, SrO, and BaO, and at least ZnO from the group of $SnO_2$, ZnO, $La_2O_3$, F, and $Fe_2O_3$. In some aspects, the exemplary glass can include at least one of CaO and BaO from the group of $Li_2O$, $Na_2O$, $K_2O$, MgO, CaO, SrO, and BaO, and at least $SnO_2$ from the group of $SnO_2$, ZnO, $La_2O_3$, F, and $Fe_2O_3$.

One method for determining whether a composition falls within the convex hull defined by the boundary points of Table 4 or Table 5 utilizes MATLAB from MathWorks®. To determine whether a test composition falls within the convex hull of either Table 4 or Table 5, the components of the test composition ("P") are projected in the reduced space with coordinates as follows: the "X" coordinate is the sum ($X_{sum}$) of the amount of $SiO_2$, $Al_2O_3$, and $B_2O_3$, the "Y" coordinate is the sum ($Y_{sum}$) of the amount of $Li_2O$, $Na_2O$, $K_2O$, MgO, CaO, SrO, and BaO, and the "Z" coordinate is the sum ($Z_{sum}$) of the amount of $SnO_2$, ZnO, $La_2O_3$, F, and $Fe_2O_3$ (in percent by mole of oxide). Depending on which convex hull is being tested, the boundary points from Table 4 or Table 5 can be entered as the set "K" in the software. The appropriate MATLAB code for testing a convex hull can be run; in MATLAB version R2019a the code "inhul(P,K)" (it is understood that the code for testing a convex hull may be different depending on the version and/or software). If the response is "0," then the points corresponding to the test composition P are not within the convex hull space delimited by K (which is the space defined by the boundary points of either Table 4 or Table 5). If the software response is "1," then the points corresponding to the test composition P fall within the convex hull space delimited by K and thus the test composition P falls within the scope of the exemplary glass precursor compositions of the test convex hull (i.e., the convex hull defined by the boundary points of Table 4 or Table 5). A data point is determined to be delimited by a convex hull if the data point falls within the space defined by the convex hull or on the border of the convex hull.

For example, the ($X_{sum}$, $Y_{sum}$, $Z_{sum}$) coordinates of exemplary glass EG31 from Table 3 are (73.72, 20.66, 5.31), which represents a point that lies within the convex hull defined by the boundary points of Table 4. In another example, the ($X_{sum}$, $Y_{sum}$, $Z_{sum}$) coordinates of exemplary glass EG26 from Table 3 are (93.65, 6.15, 0.12), which represents a point that lies within the convex hull defined by the boundary points of Table 4. For example, the ($X_{sum}$, $Y_{sum}$, $Z_{sum}$) coordinates of exemplary glass EG28 from Table 3 are (78.41, 21.13, 0.121), which represents a point that lies within the convex hull defined by the boundary points of Table 5. In another example, the ($X_{sum}$, $Y_{sum}$, $Z_{sum}$) coordinates of exemplary glass EG35 from Table 3 are (92.36, 7.55, 0.091), which represents a point that lies within the convex hull defined by the boundary points of Table 5.

According to another aspect of the present disclosure, exemplary glasses can be derived from glass compositions which are delimited by the convex hull according to the Exemplary Glass Compositions C of Table 4 and/or the Exemplary Glass Compositions D of Table 5, and which also satisfy at least one of Equation 1 and Equation 2 below (in percent by mole of oxide):

$$-42.8440902+0.463763055*[SO_2]+0.520077325*[Al_2O_3]+0.468168738*[B_2O_3]+0.47253232*[Li_2O]+2.11958583*[K_2O]+0.499421381*[MgO]+0.558094225*[CaO]+0.805792958*[SrO]+0.637349469*[BaO]-0.17232118*[SnO_2]+0.525853343*[ZnO]+0.261394654*[La_2O_3]+0.469279089*[F]\leq 10 \quad \text{Equation 1}$$

and $$0.756212572817506+[K_2O]+0.209148876828416*[La_2O_3]+0.0884393206156657*[BaO]+0.0384462744417211*[CaO]+(5.95212630529679-[F])/[B_2O_3]+(254.196472343803-2.1615185467817*[B_2O_3])/[SiO_2]\leq 10 \quad \text{Equation 2}$$

Equation 1 and Equation 2 were obtained by analyzing the measured dielectric constant $D_k$ at signals of 10 GHz for multiple example glasses according to the present disclosure. Equation 1 and/or Equation 2 can be used to predict which of the glass precursor compositions defined by the convex hull of Table 4 and/or Table 5 can be formed into a glass having a dielectric constant less than or equal to 10, as measured at signals of 10 GHz. The data was analyzed using either a linear regression or a genetic algorithm to determine a model relating the measured dielectric constant of a glass with a concentration of 15 pre-determined oxides (in percent by mole of oxide) in the glass precursor composition from which the glass was derived. The 15 pre-determined oxides were: $SiO_2$, $Al_2O_3$, $B_2O_3$, $Li_2O$, $Na_2O$, $K_2O$, MgO, CaO, SrO, BaO, $SnO_2$, ZnO, $La_2O_3$, F, and $Fe_2O_3$.

To develop the dielectric constant model, experimental data was obtained for 37 glasses having a dielectric constant of 10 or less, as measured with signals at 10 GHz. The oxide concentration in the precursor composition used to form the glass and the measured dielectric constant $D_k$ and loss tangent for the formed glass for each of the 37 examples used to develop the dielectric constant model are shown in Table 3 above. The experimental data was divided into two groups—a training group (EG2-EG4, EG6-EG25, and EG37-EG38) and a test group (EG5 and EG26-EG36). The training group was used to develop the model, using either linear regression or a genetic algorithm, and the test group was used to test the validity of the model. The fit of the model was determined based on the coefficient of determination ("$R^2$") value of a least squares regression analysis of the measured dielectric constant of a particular example glass in the test group and the predicted dielectric constant for the particular example glass.

Figure 4:
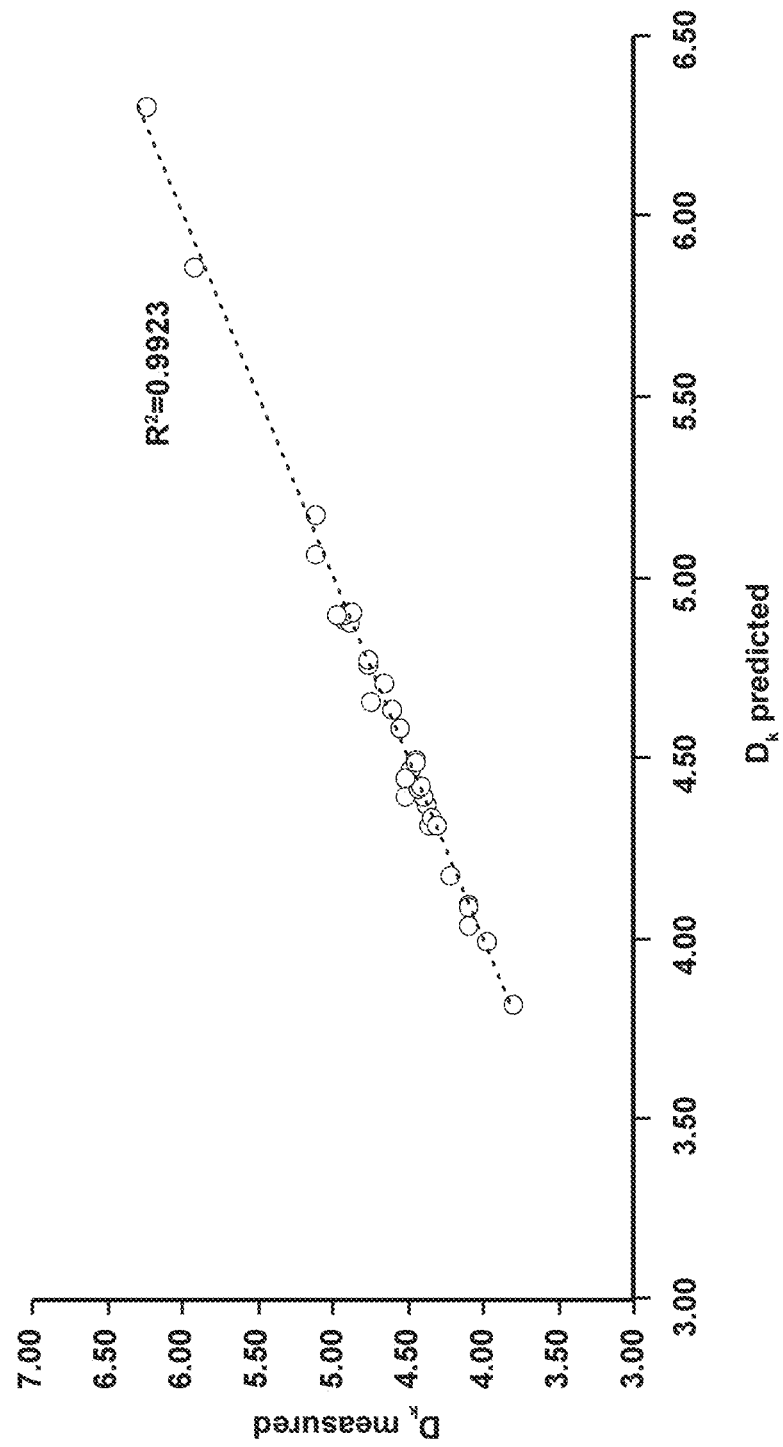
FIG. 4 is a plot of predicted dielectric constant ($D_k$) as a function of measured dielectric constant ($D_k$) for a set of glass compositions, according to an aspect of the present disclosure.

Equation 1 was determined using a linear regression analysis of approximately half of the examples of Table 3 (training group). FIG. 4 is a plot of the predicted dielectric constant for the remaining examples (test group) based on Equation 1 compared to the measured dielectric constant for each example in the test group. The data points in FIG. 4 correspond to individual examples from Table 3 and the dotted line represents the least squares regression fit to the data points. The $R^2$ value for Equation 1 was 0.9923, indicating a good fit between the predicted and measured dielectric constant for the test group examples.

Figure 5:
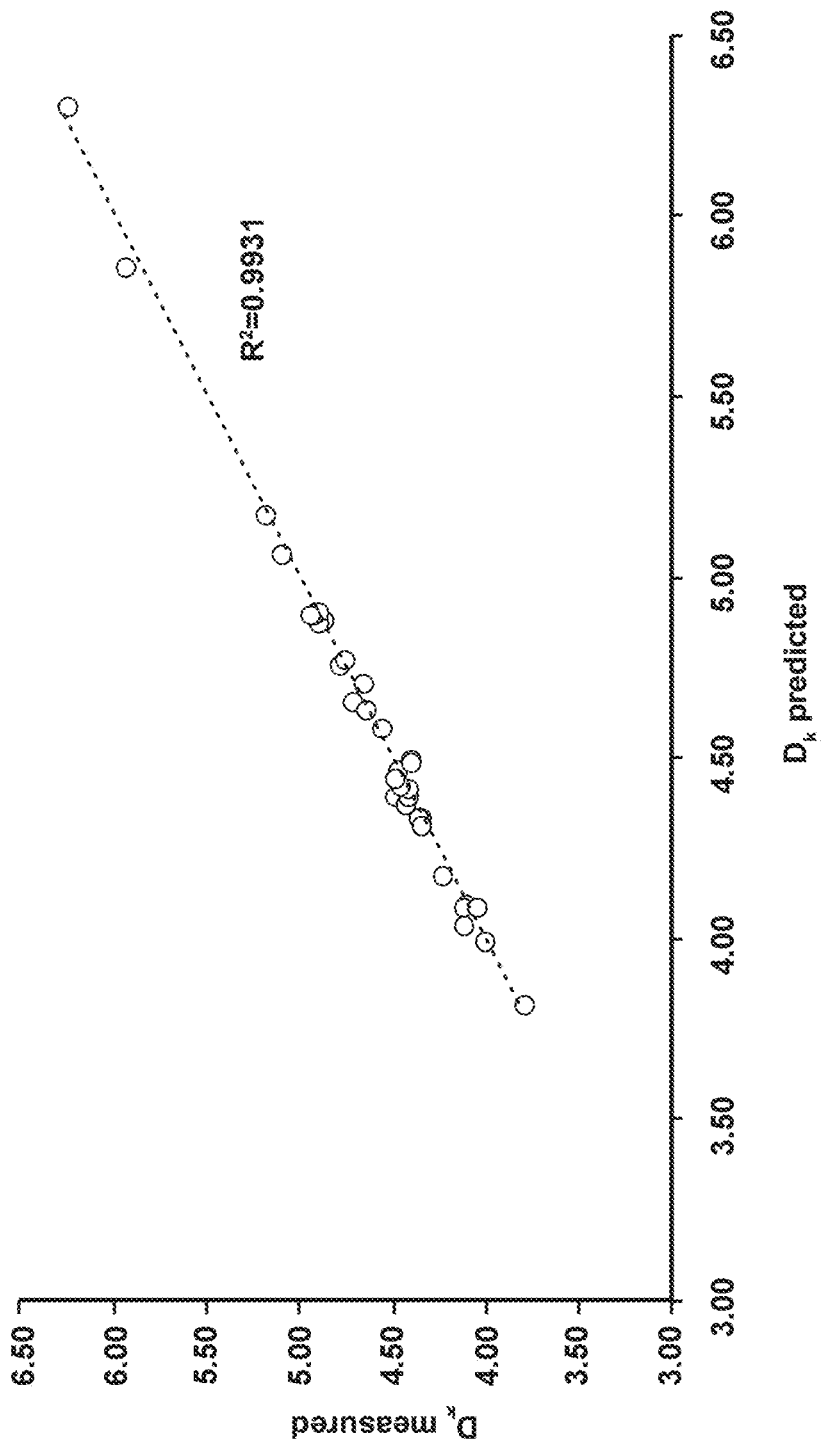
FIG. 5 is a plot of predicted dielectric constant ($D_k$) as a function of measured dielectric constant ($D_k$) for a set of glass compositions, according to an aspect of the present disclosure.

Equation 2 was determined using a genetic algorithm framework to evolve non-linear random functions during many generations, with hundreds of iterations at each generation, until multiple functions having an $R^2$ value of at least 0.9 were found. The genetic algorithm generates a population of points at each iteration, with the points at each iteration being generated using random number generators. Equation 2 was selected from the list of generated functions based on the $R^2$ value and the number of fitting parameters in the generated functions (i.e., the $R^2$ value is an indication of the accuracy of the function and simpler functions have fewer fitting parameters). FIG. 5 is a plot of the predicted dielectric constant for the remaining half of the examples (test group) based on Equation 2 compared to the measured dielectric constant for each example in the test group. The $R^2$ value for Equation 2 was 0.9931, indicating a good fit between the predicted and measured dielectric constant for the glasses.

To determine if a test precursor composition satisfies Equation 1 and/or Equation 2, the equation is solved using the corresponding oxide concentrations in the precursor composition. If the value output by the solved equation is ≤10, then the test precursor composition satisfies the equation. If the value output by the solved equation is >10, then the test precursor composition does not satisfy the equation. The good fit between the predicted and measured dielectric constant for the test group examples for Equations 1 and 2 is indicative of at least a reasonable expectation of predicting whether a composition has a dielectric constant of 10 or less, as measured at 10 GHz, using Equation 1 and/or Equation 2.

If a glass composition is defined by the convex hull of Table 4 and/or Table 5, and does not satisfy either Equation 1 or Equation 2, then it is unlikely that a glass derived from that particular precursor composition will exhibit a dielectric constant of 10 or less, as measured at signals of 10 GHz, and thus the glass would not be encompassed by the glasses of the present disclosure. If a glass composition is defined by the convex hull of Table 4 and/or Table 5, and satisfies both Equation 1 and Equation 2, then such a glass is likely to have a dielectric constant of 10 or less, as measured at signals of 10 GHz, and thus fall within the scope of the exemplary glasses of the present disclosure. If a glass composition is defined by the convex hull of Table 4 and/or Table 5, and satisfies only one of Equation 1 or Equation 2, then such a glass is likely to have a dielectric constant of 10 or less, as measured at signals of 10 GHz, and thus fall within the scope of the exemplary glasses of the present disclosure. Glasses derived from compositions that satisfy Equation 1 and/or Equation 2, may have a measured dielectric constant of about 10 or less, about 8 or less, about 7.5 or less, about 5 or less, about 4 or less, or about 3 or less, as measured with signals at 10 GHz. In some implementations, glasses derived from compositions that satisfy Equation 1 and/or Equation 2, may have a measured dielectric constant of about 2 to about 10, about 3 to about 10, about 4 to about 10, about 5 to about 10, about 6 to about 10, about 7 to about 10, about 8 to about 10, about 9 to about 10, about 2 to about 8, about 2 to about 6, about 2 to about 4, about 3 to about 10, about 3 to about 8, about 3 to about 6, about 3 to about 5, about 3 to about 4, about 4 to about 6, about 4 to about 8, or about 4 to about 10, as measured with signals at 10 GHz.

The linear regression analysis and genetic algorithm framework may not each capture all of the compositions that can be used to form glasses according to the present disclosure. There may be some instances in which the linear regression analysis captures those compositions that are encompassed by the convex hull of Table 4 and/or Table 5 and have the desired dielectric properties, but which are not captured by the genetic algorithm framework and vice versa. By assessing the compositions using both linear regression analysis and the genetic algorithm framework, the likelihood of not identifying a composition that is within the space defined by the convex hull and which has a dielectric constant of 10 or less, as measured with signal at 10 GHz, decreases.

According to another aspect of the present disclosure, exemplary glasses can be derived from glass precursor compositions which are delimited by the convex hull according to the Exemplary Glass Compositions C of Table 4 and/or the Exemplary Glass Compositions D of Table 5, and which also satisfy at least one of Equation 3 and Equation 4 below (in percent by mole of oxide):

$$0.429780863 - 0.00424207*[SiO_2] - 0.004096119*[Al_2O_3] - 0.004396116*[B_2O_3] - 0.002791817*[Li_2O] - 0.012890989*[K_2O] - 0.004226519*[MgO] - 0.004108234*[CaO] - 0.003587217*[SrO] - 0.004083111*[BaO] - 0.028056812*[SnO_2] - 0.004220402*[ZnO] + 0.000195707*[La_2O_3] - 0.004466313*[F] \leq 0.008 \quad \text{Equation 3}$$

and $$0.00454540427936441 + 0.00452303537205577*[K_2O] + 0.00026538565533632*[B_2O_3] + 2.211176044138 \times 10^{-5}*[Al_2O_3]*[BaO] +$$

$6.27439041968789 \times 10^{-6} {}^*2^{[CaO]} -$
$0.000215116681577554 {}^* [F] -$
$6.01991751010702 \times 10^{-6} {}^* [SiO_2] {}^* [B_2O_3] \leq 0.008.$  Equation 4

Equation 3 and Equation 4 were obtained by analyzing the measured loss tangent, measured at signals of 10 GHz, for multiple example glasses according to the present disclosure. Equation 3 and/or Equation 4 can be used to predict which of the glass compositions defined by the convex hull of Table 4 and/or Table 5 can be formed into a glass having a loss tangent of less than or equal to 0.008, as measured at signals of 10 GHz. The data was analyzed using either a linear regression or a genetic algorithm in a manner similar to that described above with respect to Equation 1 and Equation 2, to determine a model relating the measured loss tangent of a glass with a concentration of 15 pre-determined oxides (in percent by mole of oxide) in the glass composition from which the glass was derived. The 15 pre-determined oxides were the same as those used for determining Equations 1 and 2.

The loss tangent model was developed using the oxide concentrations and measured loss tangent values for the examples shown in Table 3. The experimental data of Table 3 was divided into two groups of about equal size (a training group and a test group) in the same manner as described above with respect to Equations 1 and 2. The training group was used to develop the model, using either linear regression or a genetic algorithm, and the test group was used to test the validity of the model. The fit of the model was determined based on the coefficient of determination ("$R^2$") value of a least squares regression analysis of the measured loss tangent of a particular example glass in the test group and the predicted loss tangent for the particular example glass.

Figure 6:
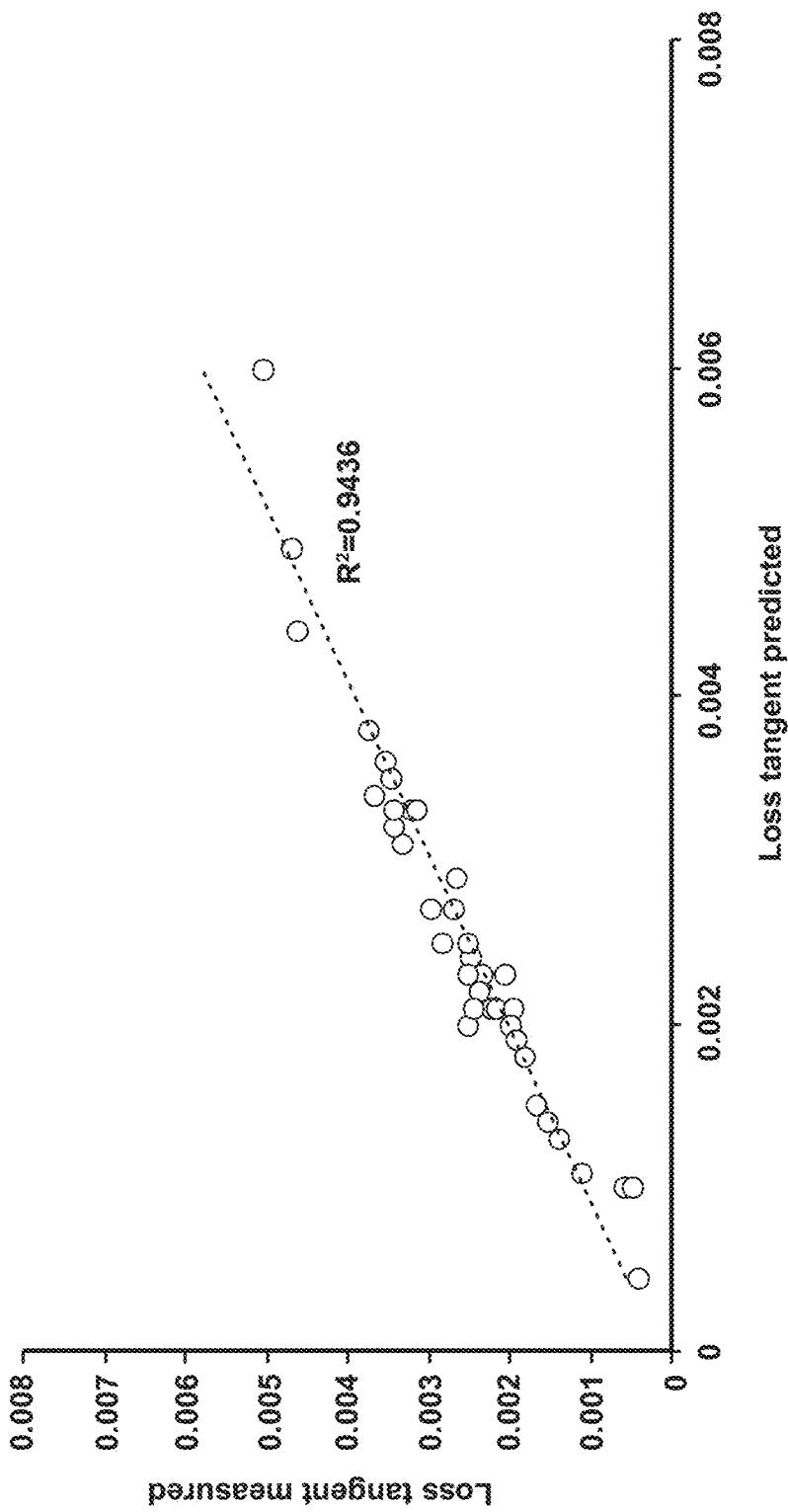
FIG. 6 is a plot of predicted loss tangent as a function of measured loss tangent for a set of glass compositions, according to an aspect of the present disclosure.

Equation 3 was determined using a linear regression analysis of approximately half of the examples of Table 3 (training group). FIG. 6 is a plot of the predicted loss tangent for the remaining examples (test group) based on Equation 3 compared to the measured loss tangent for each example in the test group. The data points in FIG. 6 correspond to individual examples from Table 3, and the dotted line represents the least squares regression fit to the data points. The $R^2$ value for Equation 3 was 0.9436, indicating a good fit between the predicted and measured loss tangent for the test group examples.

Figure 7:
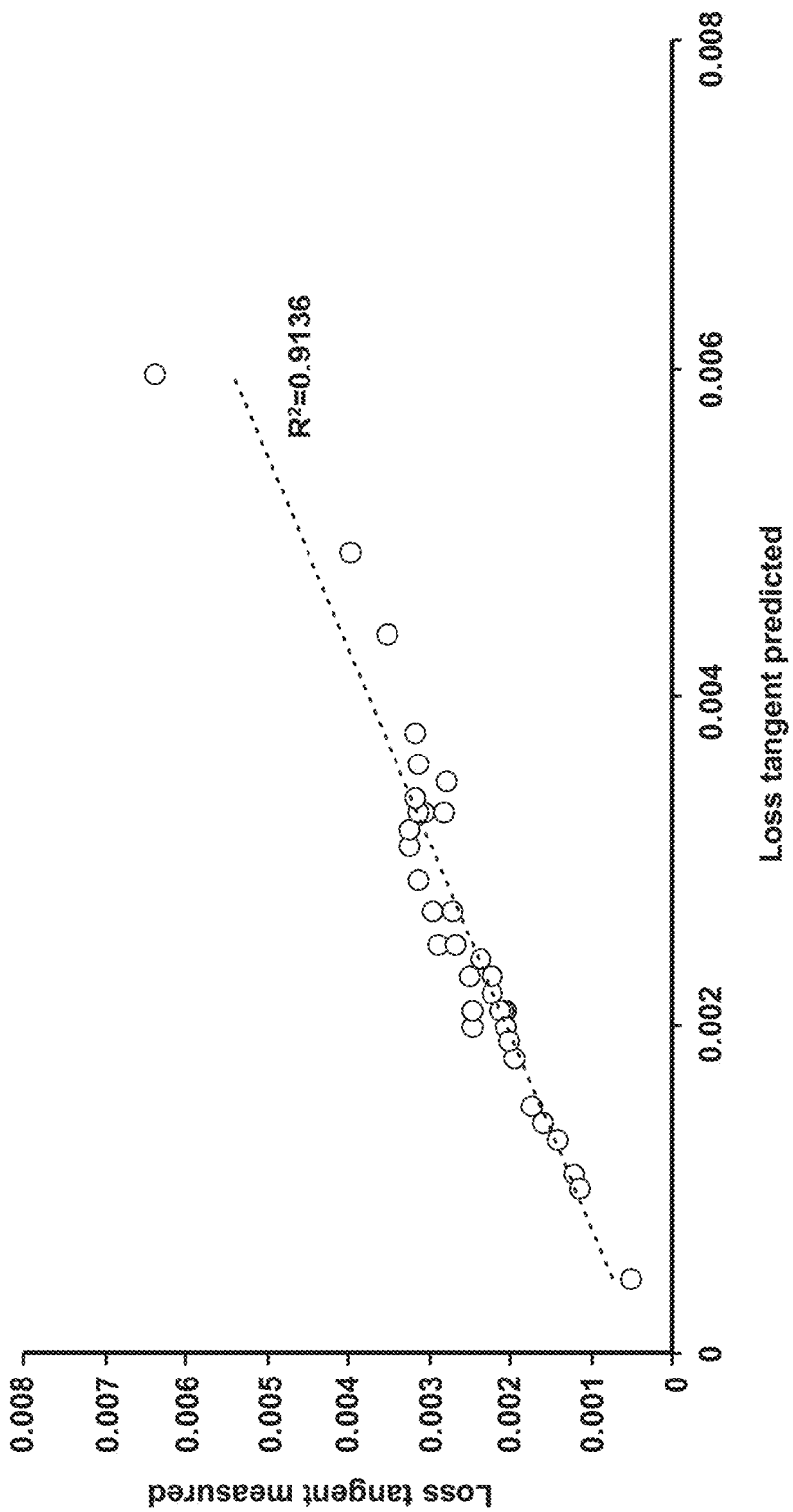
FIG. 7 is a plot of predicted loss tangent as a function of measured loss tangent for a set of glass compositions, according to an aspect of the present disclosure.

Equation 4 was determined using a genetic algorithm framework to evolve non-linear random functions during many generations, with hundreds of iterations at each generation, until multiple functions having an $R^2$ value of at least 0.9 were found. Equation 4 was selected from the list of generated functions based on the $R^2$ value and the number of fitting parameters in the generated functions (i.e., the $R^2$ value is an indication of the accuracy of the function and simpler functions have fewer fitting parameters). FIG. 7 is a plot of the predicted loss tangent for the remaining examples (test group) based on Equation 4 compared to the measured loss tangent for each example in the test group. The data points in FIG. 7 correspond to individual examples from Table 3, and the dotted line represents the least squares regression fit to the data points. The $R^2$ value for Equation 4 was 0.9136, indicating a good fit between the predicted and measured dielectric constant for the glasses.

To determine if a test glass composition satisfies Equation 3 and/or Equation 4, the equation is solved using the corresponding oxide concentrations in the glass composition. If the value output by the solved equation is ≤0.008, then the test glass composition satisfies the equation. If the value output by the solved equation is >0.008, then the test glass composition does not satisfy the equation. The good fit between the predicted and measured dielectric constant for the test group examples for Equations 3 and 4 is indicative of at least a reasonable expectation of predicting whether a composition has a loss tangent of 0.008 or less, as measured at 10 GHz, using Equation 3 and/or Equation 4.

If a glass composition is defined by the convex hull of Table 4 and/or Table 5, and does not satisfy either Equation 3 or Equation 4, then it is unlikely that a glass derived from that particular composition will exhibit a loss tangent of 0.008 or less, as measured at signals of 10 GHz. If a glass composition is defined by the convex hull of Table 4 and/or Table 5, and satisfies both Equation 3 and Equation 4, then such a glass is likely to have a loss tangent of 0.008 or less, as measured at signals of 10 GHz, and thus fall within the scope of the exemplary glasses of the present disclosure. If a glass composition is defined by the convex hull of Table 4 and/or Table 5, and satisfies only one of Equation 3 or Equation 4, then such a glass is likely to have a loss tangent of 0.008 or less, as measured at signals of 10 GHz, and thus fall within the scope of the exemplary glasses of the present disclosure. Glasses derived from precursor compositions that satisfy Equation 3 and/or Equation 4, may have a measured loss tangent of about 0.008 or less, about 0.005 or less, about 0.0025 or less, or about 0.001 or less, as measured with signals at 10 GHz. In some aspects, glasses derived from precursor compositions that satisfy Equation 3 and/or Equation 4, may have a measured loss tangent of about 0.0004 to about 0.01, about 0.001 to about 0.01, about 0.0025 to about 0.01, about 0.005 to about 0.01, about 0.0004 to about 0.001, about 0.0004 to about 0.0025, about 0.0004 to about 0.005, about 0.001 to about 0.0025, about 0.001 to about 0.005, about 0.0025 to about 0.005, about 0.0004 to about 0.008, about 0.001 to about 0.008, about 0.0025 to about 0.008, or about 0.005 to about 0.008.

The linear regression analysis and genetic algorithm framework may not each capture all of the compositions that can be used to form glasses according to the present disclosure. There may be some instances in which the linear regression analysis captures those compositions that are encompassed by the convex hull of Table 4 and/or Table 5 and have the desired dielectric properties, but which are not captured by the genetic algorithm framework and vice versa. By assessing the compositions using both linear regression analysis and the genetic algorithm framework, the likelihood of not identifying a composition that is within the space defined by the convex hull and which has a loss tangent of 0.008 or less, as measured with signal at 10 GHz, decreases.

In some aspects of the present disclosure, glasses according to the present disclosure are those glasses that: (a) are encompassed by the convex hull defined by the boundary points in Table 4 and/or Table 5, (b) satisfy Equation 1 and/or Equation 2, and (c) satisfy Equation 3 and/or 4. The glasses that satisfy all 3 elements (a), (b), and (c), can have a dielectric constant of about 10 or less, about 7.5 or less, about 5 or less, about 4 or less, about 3 or less, about 2 to about 10, about 3 to about 10, about 4 to about 10, about 5 to about 10, about 6 to about 10, about 7 to about 10, about 8 to about 10, about 9 to about 10, about 2 to about 8, about 2 to about 6, about 2 to about 4, about 3 to about 10, about 3 to about 8, about 3 to about 6, about 3 to about 5, about 3 to about 4, about 4 to about 6, about 4 to about 8, or about 4 to about 10, in combination with a loss tangent of about 0.01 or less, about 0.005 or less, about 0.0025 or less, about 0.001 or less, about 0.0004 to about 0.01, about 0.001 to about 0.01, about 0.0025 to about 0.01, about 0.005 to about 0.01, about 0.0004 to about 0.001, about 0.0004 to about 0.0025, about 0.0004 to about 0.005, about 0.001 to about 0.0025, about 0.001 to about 0.005, about 0.0025 to about 0.005, about 0.0004 to about 0.008, about 0.001 to about 0.008, about 0.0025 to about 0.008, or about 0.005 to about 0.008, as measured with signals at 10 GHz

EXAMPLES

The following examples describe various features and advantages provided by the disclosure, and are in no way intended to limit the invention and appended claims.

Example 1

Table 6 below illustrates Exemplary Glasses ("EG") according to the present disclosure, in mol %, as calculated on an oxide basis from the as-batched glasses (the glass precursor composition from which the glass is derived). The glass samples were prepared by blending powder batches by turbula for 60 minutes and melting in a covered platinum crucible at 1650° C. for 16 hours. The melted glass was poured out as blocks and annealed at 550-600° C. Properties of the glasses were measured by standard methods or predicted models.

With respect to the data presented in Table 6, CTE was determined from fiber elongation techniques or predicted over the temperature range of 0° C. to 300° C. (+5° C.) and is expressed in terms of "$\times 10^{-7}$/° C." The softening point ("Soft Pt."), annealing point ("Ann. Pt."), and strain point ("Str. Pt.") are expressed in ° C. The elastic modulus ("E-mod"), also referred to as Young's Modulus, is expressed in gigapascals (GPa), density is expressed in g/cm$^3$, and viscosity is expressed in Poise.

The 200 Poise Melting Temperature (defined as the temperature at which the glass melt demonstrates a viscosity of 200 Poises) is expressed in ° C. The 200 Poise Melting Temperature was calculated employing the Vogel-Fulcher-Tammann equation fit to the high temperature viscosity data (measured via rotating cylinders viscometry according to ASTM C965-81). The liquidus temperature of the glass was measured using the standard liquidus method that involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity (in Poises) was determined from this temperature and the coefficients of the Vogel-Fulcher-Tammann equation (A, B, and $T_0$).

The dielectric properties were measured on polished, as-made glass samples that were 3"×3" and less than 1 mm thick. The test frequencies range from 2.7 GHz to 50 GHz. The dielectric constant $D_k$ and loss tangent were determined for each sample. The samples were tested with a split post dielectric resonator at signal frequencies less than 10 GHz or an open cavity resonator at signal frequencies greater than 10 GHz. In each case, the dielectric constant and loss tangent were measured from the shift and the broadening of the resonance peaks.

TABLE 6

Compositions and Properties for Exemplary Glasses ("EG")

| | EG1 | EG2 | EG3 | EG4 | EG5 | EG6 |
|---|---|---|---|---|---|---|
| Oxide (mol %) | | | | | | |
| SiO$_2$ | 70.97 | 70.13 | 68.6 | 68.86 | 75 | 75 |
| Al$_2$O$_3$ | — | 2.77 | 6.89 | 6.89 | 3 | 1 |
| B$_2$O$_3$ | 24.86 | 22.72 | 16.87 | 17.88 | 22 | 22 |
| Li$_2$O | — | — | — | — | — | — |
| K$_2$O | — | 0.01 | 0.01 | 0.01 | — | — |
| MgO | 3.07 | 3.05 | 2.72 | 1.95 | — | 2 |
| CaO | 1.10 | 1.23 | 4.82 | 4.32 | — | — |
| SrO | — | — | — | — | — | — |
| Sb$_2$O$_3$ | — | — | — | — | — | — |
| TiO$_2$ | — | — | — | — | — | — |
| SnO$_2$ | — | 0.09 | 0.09 | 0.08 | 0.08 | 0.08 |
| RO$_{Total}$ | 4.2 | 4.3 | 7.5 | 6.3 | 0 | 2.0 |
| MgO:RO$_{Total}$ | 0.74 | 0.71 | 0.36 | 0.31 | — | 1 |
| RO$_{Total}$:(Al$_2$O$_3$ + B$_2$O$_3$) | — | 0.17 | 0.32 | 0.25 | 0 | 0.09 |
| B$_2$O$_3$:(Al$_2$O$_3$ + SiO$_2$) | 0.35 | 0.31 | 0.22 | 0.24 | 0.28 | 0.29 |
| Al$_2$O$_3$:(Al$_2$O$_3$ + B$_2$O$_3$) | — | 0.11 | 0.29 | 0.28 | 0.12 | 0.04 |
| RO$_{Total}$:(Al$_2$O$_3$ + (0.5*B$_2$O$_3$)) | 0.3 | 0.3 | 0.5 | 0.4 | 0.2 | 0 |
| SiO$_2$ + B$_2$O$_3$ | 95.8 | 92.8 | 85.5 | 86.7 | 97.0 | 97.0 |
| SiO$_2$ + B$_2$O$_3$ + Al$_2$O$_3$ | 95.8 | 95.6 | 92.4 | 93.6 | 1.00.0 | 98.0 |
| Physical Properties | | | | | | |
| CTE | 33* | 35* | 29.1 | 30* | 32* | 31* |
| E-mod | 49* | 51* | — | — | — | — |
| Str. Pt. | 465* | 532 | 628 | 612 | — | — |
| Ann. Pt. | — | 606 | 700 | 681 | — | — |
| Soft Pt. | 816* | 993 | 978 | 961.5 | — | — |
| Density | 2.14* | 2.16 | 2.26 | 2.24 | 2.14* | 2.15* |
| A | −3.140* | −3.558 | −3.332 | −3.358 | — | — |
| B | 8876.7* | 10616 | 8385.8 | 8625.8 | — | — |
| T$_o$ | 39.947* | −5.2 | 172.1 | 161.9 | — | — |
| 200 | 1671* | 1807 | 1661 | 1686 | — | — |
| 35000 | 1195* | 1305 | 1237 | 1253 | — | — |
| 200P-35 kP | 476* | 502 | 424 | 433 | — | — |
| T35-T$_{liquidus}$ | 171.2* | — | — | — | — | — |
| Liquidus T | 1023.8* | 1145 | 1030 | 1150 | >1375 | — |
| Liquidus Viscosity | 7.63 × 10$^5$* | 4.7 × 10$^5$ | 2.8 × 10$^6$ | 2.4 × 10$^5$ | — | — |

TABLE 6-continued

Compositions and Properties for Exemplary Glasses ("EG")

|  | EG1 | EG2 | EG3 | EG4 | EG5 | EG6 |
|---|---|---|---|---|---|---|
| Dielectric Properties | | | | | | |
| $D_k$ | — | 4 | 4.45 | 4.49 | 3.82 | — |
| Loss tangent | — | 0.001 | 0.0021 | 0.00231 | $4.5 \times 10^{-4}$ | — |

*Indicates predicted value using modeling; all other values are experimentally obtained measured
N/A — Unable to measure due to phase separation.

EG1 exemplifies a glass without alkali metals, which may be desired in some applications, and an increased amount of $B_2O_3$. EG2 demonstrates the effect of replacing some of the $SiO_2$ and the $B_2O_3$ with $Al_2O_3$ on the viscosity of the glass. Samples EG1-EG6 also demonstrate the impact that the RO, $Al_2O_3$, and $B_2O_3$ content can have on the melting and forming characteristics of the glasses. Without being bound by any particular theory, it was found that when the RO, $Al_2O_3$, and $B_2O_3$ content of the glass was adjusted to satisfy a ratio of $RO:(Al_2O_3+(0.5*B_2O_3))$ within a range of about 0 to about 0.5, the melting and forming characteristics of the Exemplary Glasses EG1-EG6 were improved compared to other glasses.

In addition, the data in Table 6 demonstrates that the Exemplary Glasses have a low dielectric constant $D_k$ and loss tangent. Without being bound by any particular theory, it was found that when $SiO_2$, $B_2O_3$, and $Al_2O_3$ are present in amounts that satisfy the ratio $B_2O_3:(Al_2O_3+SiO_2)$ within a range of about 0.22 to about 0.35, the dielectric properties were improved. Thus, the data in Table 6 demonstrates the ability of the glasses of the present disclosure to exhibit improved dielectric properties in combination with improved formability.

Exemplary Glasses EG2-EG5 illustrate that the glasses according to the present disclosure are characterized by a low loss tangent of about 0.001 or less at signal frequencies of 10 GHz. As discussed above, low loss tangents at 10 GHz is important in accommodating the expected increase in data rates at frequencies of 10 GHz and greater. In addition, the Exemplary Glasses of the present disclosure also exhibit a low dielectric constant (less than 5). Materials having a high dielectric constant are generally not suitable for continued scaling of microelectronic devices, as signal reflection may be affected by dielectric constant. Thus, a low dielectric constant, such as exhibited by the Exemplary Glasses herein, may be appropriate for use in smaller, scaled devices as well.

FIG. 1 is a chart comparing the dielectric constant and loss tangent at a signal frequency of 10 GHz for Exemplary Glasses EG2, EG3, and EG4, water, sapphire, Teflon®, silicon, and soda lime. As demonstrated in FIG. 1, the Exemplary Glasses of the present disclosure provide a good balance of a low dielectric constant in combination with a low loss tangent. Thus, the glasses of the present disclosure provide additional alternative materials for use in applications where a low dielectric constant and a low loss tangent are needed.

The data in Table 6 also demonstrates that the Exemplary Glasses EG1-EG6 exhibit relatively low CTE values. Thus, while the Exemplary Glasses exhibit improvements in dielectric properties and formability, the Exemplary Glasses maintain relatively low CTE values. As discussed above, low CTE values can be useful in forming glass laminates that include a core and one or more clad layers.

The Exemplary Glasses EG1-EG4 all have a predicted softening point greater than 700° C., which is well above the soldering reflow temperature typically seen in PCB processing (usually 260° C. for 30 seconds). The data in Table 6 indicates that the glasses of the present disclosure are likely to be characterized by dimensional stability for 30 seconds when heated to 260° C. As discussed above, such dimensional stability characteristics, in combination with the dielectric properties of the exemplary glasses and their formability, indicate that the glasses of the present disclosure may be suitable for use as an insulating layer laminate in PCB applications.

Example 2

Tables 7-9 illustrate the dielectric properties of Exemplary Glasses EG2-EG4 over a range of signal frequencies from about 9.6 GHz to about 21 GHz. The dielectric and loss tangent data was obtained in the same manner as described above with respect to Example 1. The data in Tables 7-9 illustrate that the glasses of the present disclosure are capable of maintaining a low dielectric constant and low loss tangent at signal frequencies greater than 10 GHz.

TABLE 7

Dielectric Properties for EG2
EG2

| Freq. (GHz) | Dk | Loss tangent |
|---|---|---|
| 9.674 | 4.00 | 0.0010 |
| 10.554 | 3.92 | 0.0011 |
| 12.111 | 3.92 | 0.0010 |
| 13.668 | 3.92 | 0.0011 |
| 15.226 | 3.92 | 0.0011 |
| 16.785 | 3.92 | 0.0012 |
| 18.344 | 3.92 | 0.0012 |
| 19.904 | 3.92 | 0.0012 |
| 21.464 | 3.92 | 0.0013 |

TABLE 8

Dielectric Properties for EG3
EG3

| Freq. (GHz) | Dk | Loss tangent |
|---|---|---|
| 9.650 | 4.45 | 0.0021 |
| 10.537 | 4.35 | 0.0022 |
| 12.092 | 4.35 | 0.0022 |
| 13.648 | 4.35 | 0.0023 |
| 15.205 | 4.34 | 0.0024 |
| 16.762 | 4.34 | 0.0025 |
| 18.320 | 4.34 | 0.0026 |
| 19.879 | 4.34 | 0.0026 |
| 21.439 | 4.33 | 0.0027 |

TABLE 9

Dielectric Properties for EG4
EG4

| Freq. (GHz) | Dk | Loss tangent |
|---|---|---|
| 9.654 | 4.49 | 0.0023 |
| 10.538 | 4.44 | 0.0024 |
| 12.093 | 4.44 | 0.0024 |
| 13.648 | 4.44 | 0.0025 |
| 15.205 | 4.44 | 0.0026 |
| 16.762 | 4.44 | 0.0027 |
| 18.320 | 4.44 | 0.0028 |
| 19.879 | 4.43 | 0.0028 |
| 21.439 | 4.43 | 0.0030 |

Example 3

Table 10 illustrates the dielectric properties Exemplary Glass EG5 over a range of signal frequencies from about 2.6 GHz to about 9.9 GHz. The dielectric and loss tangent data was obtained in the same manner as described above with respect to Example 1. Table 10 illustrates that EG5 exhibits a low dielectric constant and ultra-low loss tangent at least up to almost about 10 GHz.

TABLE 10

Dielectric Properties for EG5
EG5

| Freq. (GHz) | Dk | Loss tangent |
|---|---|---|
| 2.672 | 3.83 | $1.66 \times 10^{-3}$ |
| 5.114 | 3.8 | $4.12 \times 10^{-4}$ |
| 9.950 | 3.82 | $4.49 \times 10^{-4}$ |

Example 4

Table 3 lists the measured dielectric constant and loss tangent values for Exemplary Glasses ("EG") according to the present disclosure, in mol %, as calculated on an oxide basis from the glass precursor compositions (as-batched compositions). The glass samples were prepared by blending powder batches by turbula for 60 minutes and melting in a covered platinum crucible at 1650° C. for 16 hours. The melted glass was poured out as blocks and annealed at 550-600° C. The dielectric properties were measured on polished, as-made glass samples that were 3"×3" and less than 1 mm thick. The test frequencies range from 2.7 GHz to 50 GHz. The dielectric constant $D_k$ and loss tangent were determined for each sample. The samples were tested with a split post dielectric resonator at signal frequencies less than 10 GHz or an open cavity resonator at signal frequencies greater than 10 GHz. In each case, the dielectric constant and loss tangent were measured from the shift and the broadening of the resonance peaks.

Example 5

Tables 11 and 12 illustrate Exemplary Glasses EG39-EG57 according to the present disclosure, in mol %, as calculated on an oxide basis from the as-batched glasses (the glass precursor composition from which the glass is derived). The glass samples were prepared and characterized as described above with respect to the Exemplary Glasses of Example 1.

The glass compositions used to form Exemplary Glasses EG39-EG57 all included approximately the same amount of $SiO_2$ and a similar ratio of $B_2O_3$:$Al_2O_3$ in order to illustrate the effect of RO concentration and content on the dielectric properties of the glasses, such as the dielectric constant and loss tangent. Table 11 includes Exemplary Glasses EG39-EG50, which include a single RO species, as indicated in Table 11. Table 12 includes Exemplary Glasses EG51-57, which include a combination of 2 RO species, as indicated in Table 12. The dielectric constant $D_k$ and loss tangent values reported in Tables 11 and 12 were measured at signal frequencies of 10 GHz.

TABLE 11

Compositions and Properties for Exemplary Glasses EG39-EG50 with a Single RO Species

| Oxide (mol %) | EG39 | EG40 | EG41 | EG42 | EG43 | EG44 |
|---|---|---|---|---|---|---|
| $SiO_2$ | 70.10 | 70.02 | 69.98 | 70.29 | 70.47 | 69.82 |
| $Al_2O_3$ | 9.14 | 8.18 | 7.15 | 9.06 | 7.94 | 7.16 |
| $B_2O_3$ | 18.56 | 16.62 | 14.76 | 18.48 | 16.55 | 14.85 |
| MgO | 2.10 | 5.08 | 8.01 | 0 | 0 | 0 |
| CaO | 0 | 0 | 0 | 2.06 | 4.94 | 8.07 |
| SrO | 0 | 0 | 0 | 0 | 0 | 0 |
| BaO | 0 | 0 | 0 | 0 | 0 | 0 |
| $SnO_2$ | 0.10 | 0.10 | 0.10 | 0.10 | 0.10 | 0.10 |
| $RO_{Total}$ | 2.10 | 5.08 | 8.01 | 2.06 | 4.94 | 8.07 |
| $B_2O_3$:$Al_2O_3$ | 2.03 | 2.03 | 2.06 | 2.04 | 2.09 | 2.07 |
| $D_k$ | 4.14 | 4.23 | 4.62 | 4.22 | 4.44 | 4.64 |
| Loss tangent | 0.0012 | 0.0015 | 0.0021 | 0.0014 | 0.0021 | 0.0027 |
| Density (g/cm³) | 2.235 | 2.248 | 2.243 | 2.228 | 2.251 | 2.29 |

| Oxide (mol %) | EG45 | EG46 | EG47 | EG48 | EG49 | EG50 |
|---|---|---|---|---|---|---|
| $SiO_2$ | 70.31 | 70.00 | 69.20 | 69.79 | 70.10 | 68.34 |
| $Al_2O_3$ | 9.13 | 8.14 | 7.28 | 9.30 | 8.11 | 7.52 |
| $B_2O_3$ | 18.37 | 16.68 | 15.10 | 18.61 | 16.51 | 15.32 |
| MgO | 0 | 0 | 0 | 0 | 0 | 0 |
| CaO | 0 | 0 | 0 | 0 | 0 | 0 |
| SrO | 2.09 | 5.07 | 8.22 | 0.08 | 0.15 | 0.26 |
| BaO | 0 | 0 | 0.09 | 2.12 | 5.03 | 8.44 |
| $SnO_2$ | 0.10 | 0.10 | 0.10 | 0.10 | 0.11 | 0.11 |

TABLE 11-continued

Compositions and Properties for Exemplary
Glasses EG39-EG50 with a Single RO Species

| | | | | | | |
|---|---|---|---|---|---|---|
| $RO_{Total}$ | 2.09 | 5.07 | 8.31 | 2.20 | 5.18 | 8.70 |
| $B_2O_3:Al_2O_3$ | 2.01 | 2.05 | 2.07 | 2.00 | 2.04 | 2.04 |
| $D_k$ | 4.22 | 4.48 | 4.67 | 4.19 | 4.79 | 5.13 |
| Loss tangent | 0.0012 | 0.0023 | 0.0027 | 0.0012 | 0.003 | 0.0034 |
| Density (g/cm$^3$) | 2.273 | 2.308 | 2.367 | 2.526 | 2.414 | 2.24 |

TABLE 12

Compositions and Properties for Exemplary
Glasses EG51-EG57 with Mixed RO Species

| Oxide (mol %) | EG51 | EG52 | EG53 | EG54 | EG55 | EG56 | EG57 |
|---|---|---|---|---|---|---|---|
| $SiO_2$ | 70.00 | 70.17 | 70.35 | 69.94 | 69.14 | 69.02 | 68.95 |
| $Al_2O_3$ | 7.16 | 7.12 | 6.96 | 7.11 | 7.16 | 7.16 | 7.10 |
| $B_2O_3$ | 14.81 | 14.60 | 14.86 | 14.71 | 15.49 | 15.69 | 15.83 |
| MgO | 3.94 | 3.85 | 3.89 | 0 | 5.10 | 4.03 | 3.03 |
| CaO | 4.00 | 0 | 0 | 3.91 | 3.00 | 4.01 | 4.98 |
| SrO | 0 | 4.16 | 0 | 4.23 | 0 | 0 | 0 |
| BaO | 0 | 0 | 3.83 | 0 | 0 | 0 | 0 |
| $SnO_2$ | 0.10 | 0.10 | 0.10 | 0.10 | 0.11 | 0.10 | 0.10 |
| $RO_{Total}$ | 7.94 | 8.01 | 7.72 | 8.14 | 8.10 | 8.04 | 8.01 |
| $B_2O_3:Al_2O_3$ | 2.07 | 2.05 | 2.13 | 2.07 | 2.16 | 2.19 | 2.23 |
| Dk | — | — | — | — | 4.43 | 4.48 | 4.49 |
| Loss tangent | — | — | — | — | 0.0023 | 0.0023 | 0.0023 |
| Density (g/cm$^3$) | — | — | — | — | 2.269 | 2.27 | 2.274 |

| Oxide (mol %) | EG58 | EG59 | EG60 | EG61 |
|---|---|---|---|---|
| $SiO_2$ | 70.26 | 69.75 | 70.19 | 70.85 |
| $Al_2O_3$ | 7.13 | 7.10 | 7.13 | 6.91 |
| $B_2O_3$ | 14.74 | 14.85 | 14.71 | 14.40 |
| MgO | 0 | 0 | 6.79 | 6.58 |
| CaO | 3.93 | 0 | 1.08 | 0 |
| SrO | 0 | 4.37 | 0 | 1.18 |
| BaO | 3.83 | 3.82 | 0 | 0 |
| $SnO_2$ | 0.10 | 0.11 | 0.10 | 0.10 |
| $RO_{Total}$ | 7.75 | 8.19 | 7.87 | 7.75 |
| $B_2O_3:Al_2O_3$ | 2.07 | 2.09 | 2.06 | 2.08 |
| $D_k$ | 4.84 | 4.90 | 4.38 | 4.40 |
| Loss tangent | 0.0032 | 0.0033 | 0.0022 | 0.0023 |
| Density (g/cm$^3$) | 2.40 | 2.46 | 2.27 | 2.28 |

Figure 8A:
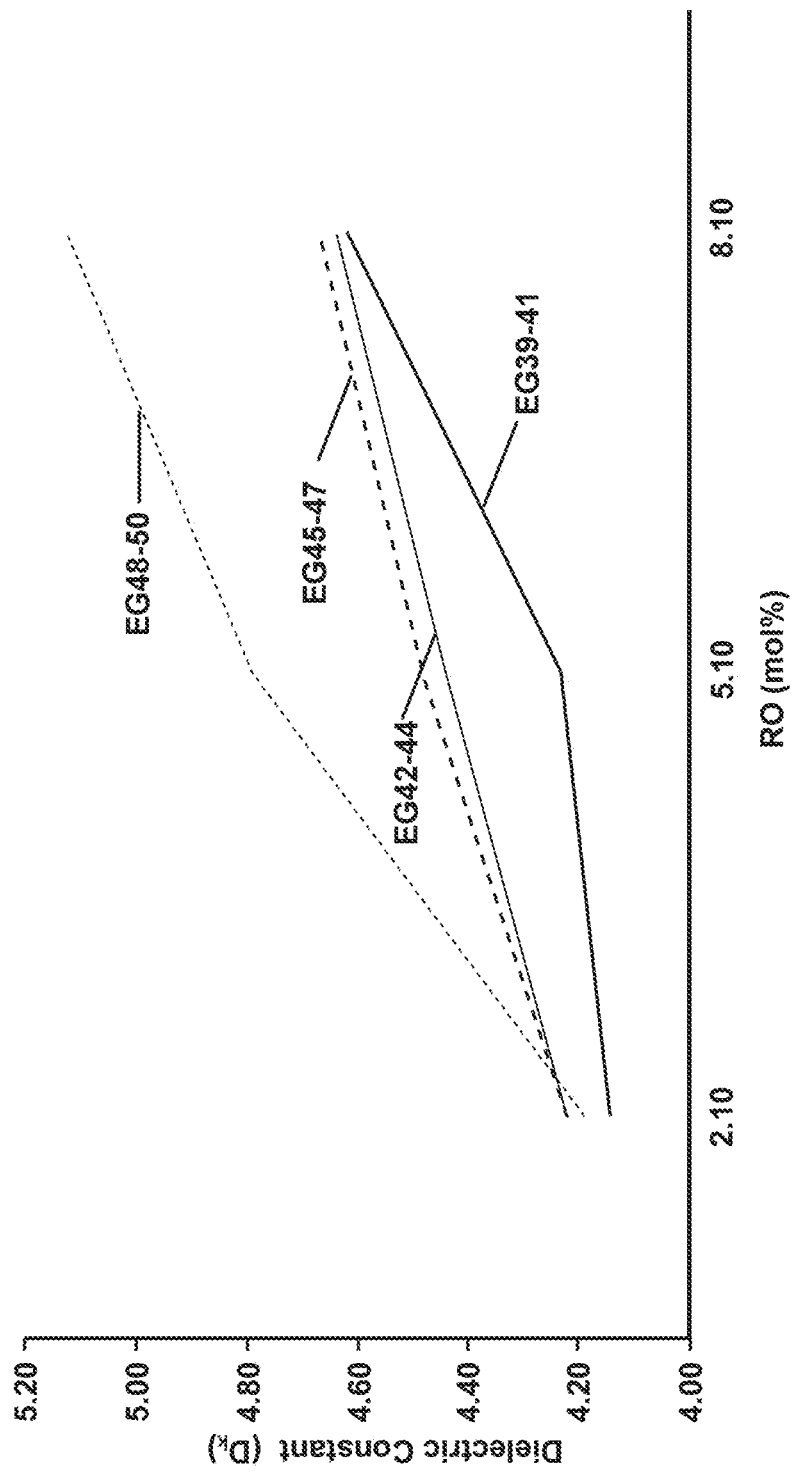
FIG. 8A is a plot of measured dielectric constant ($D_k$) for a set of glass compositions as a function of alkaline earth oxide (RO) concentration, according to an aspect of the present disclosure.
Figure 8B:
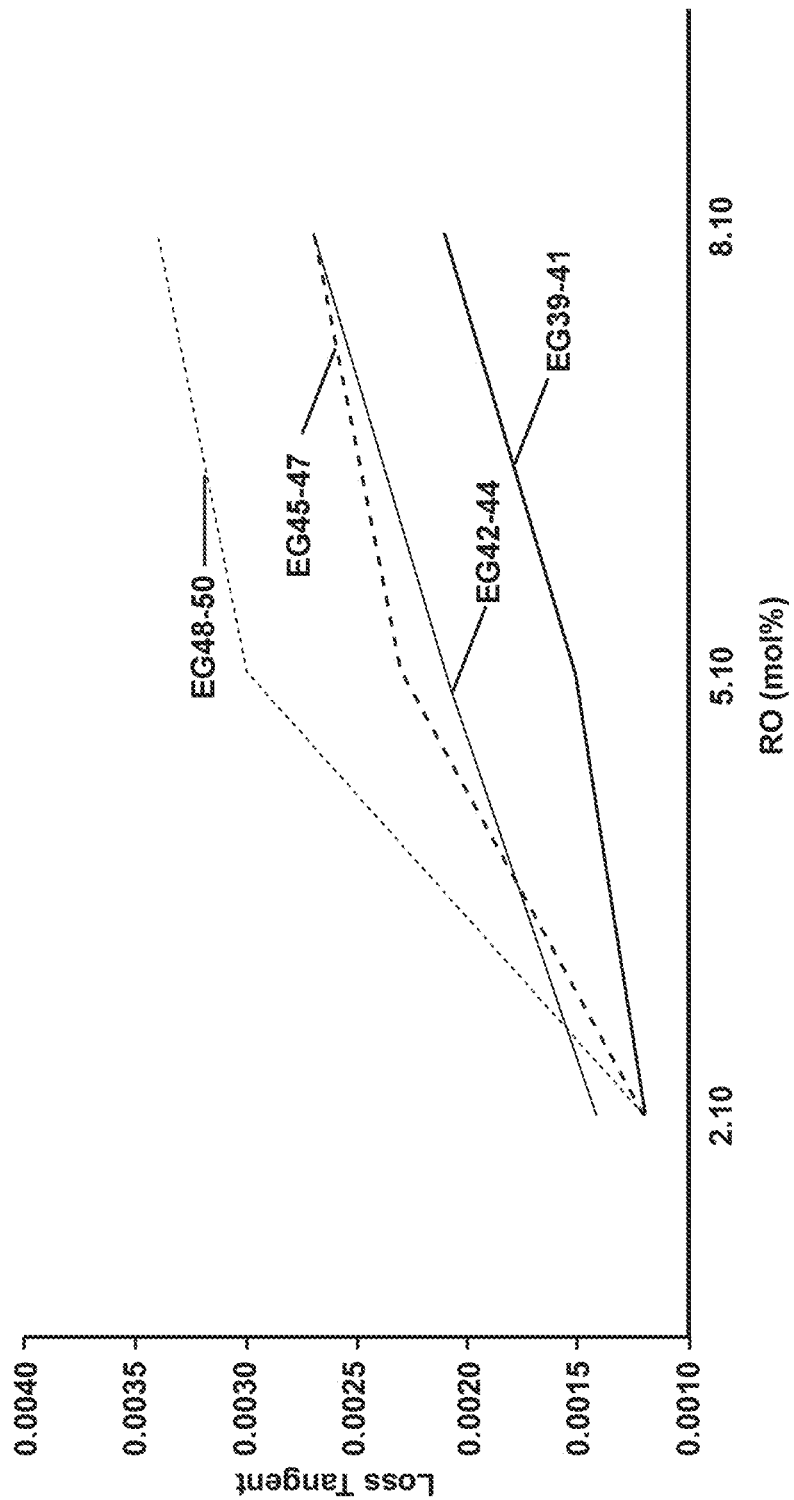
FIG. 8B is a plot of measured loss tangent for a set of glass compositions as a function of alkaline earth oxide (RO) concentration, according to an aspect of the present disclosure.

FIGS. 8A and 8B illustrate the dielectric constant and loss tangent, respectively, as measured at signals of 10 GHz, as a function of RO concentration for a single RO species. FIGS. 8A and 8B plot the dielectric constant and loss tangent, respectively, for examples having a single RO species at concentrations of about 2.1 mol %, 5.1 mol %, and 8.1 mol %: MgO (EG39-EG41), CaO (EG42-EG44), SrO (EG45-EG47) and BaO (EG48-EG50). The plot in FIG. 8A demonstrates that dielectric constant increases with increasing RO content. The data in FIG. 8A also demonstrates that at a given RO species concentration, dielectric constant increases based on the RO species in the order of Mg<Ca<Sr<Ba. This relationship suggests that dielectric constant may increase with decreasing cation size as well as increase with increasing cation field strength. The data in FIG. 8A also shows that the dielectric constant as a function of SrO concentration is similar to the dielectric constant as a function of CaO concentration, suggesting that CaO and SrO are both potential candidates for mixing with MgO to provide a glass having the desired dielectric properties.

The plot in FIG. 8B demonstrates that loss tangent increases with increasing RO content. The data in FIG. 8B also demonstrates that at a given RO species concentration, loss tangent increases based on the RO species in the order of Mg<Ca<Sr<Ba at about 5.1 mol %, however, at about 2.1 mol % and about 8.1 mol %, SrO containing glasses have a loss tangent that is about equal to or less than the loss tangent for the CaO containing glass samples at the corresponding concentration. The data in FIG. 8B demonstrates a similarity in loss tangent as a function of SrO concentration and loss tangent as a function of CaO concentration, which may indicate that CaO and SrO are both potential candidates for mixing with MgO to provide a glass having the desired dielectric properties.

The data shown in FIGS. 8A and 8B indicate that decreasing the concentration of the RO species in the glass compositions of the present disclosure, when only a single type of RO species is present, may provide a decrease in the dielectric constant and loss tangent of the glasses.

Figure 9A:
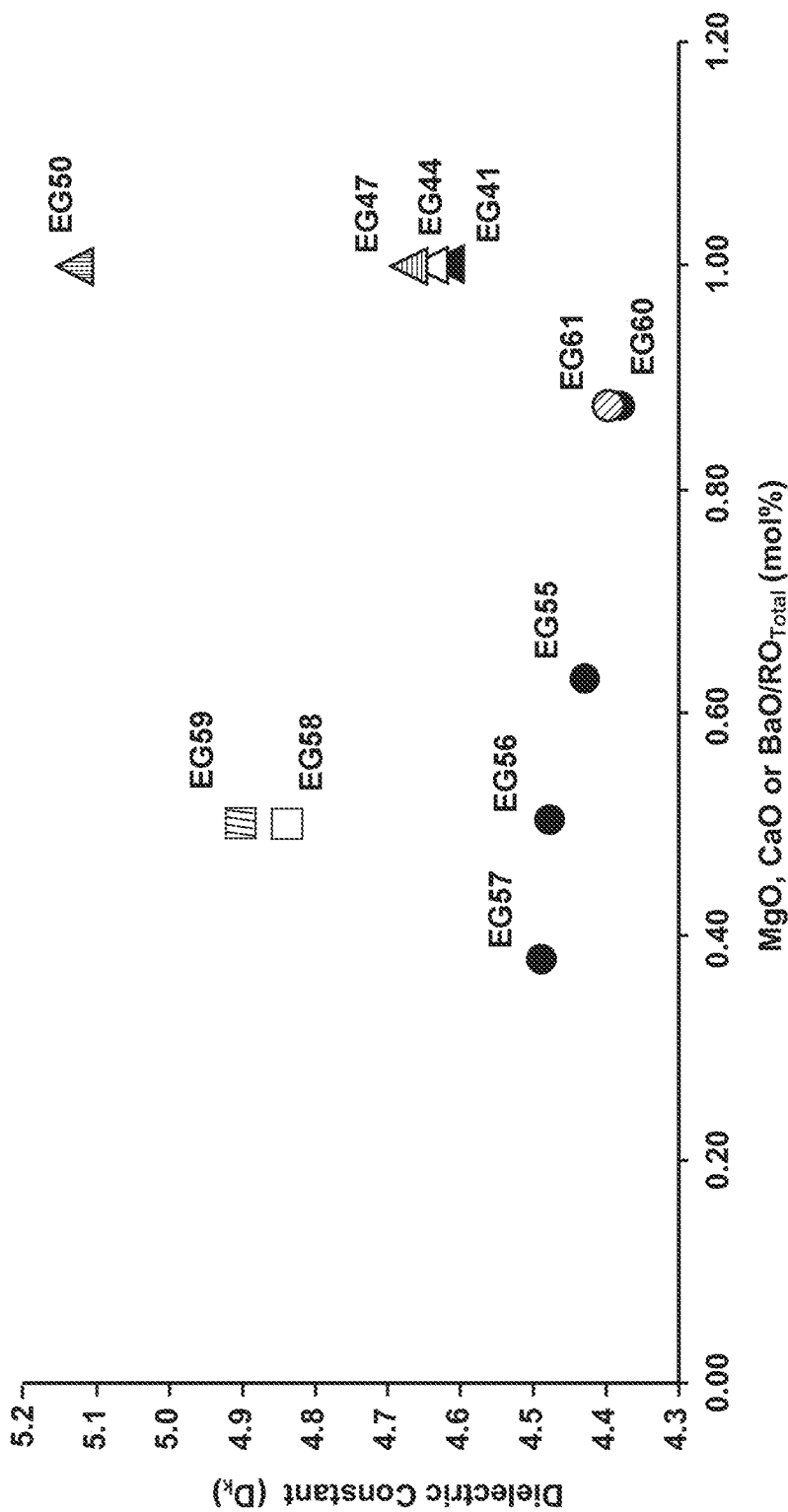
FIG. 9A is a plot of measured dielectric constant ($D_k$) for a set of glass compositions as a function of a ratio of an amount of MgO, CaO, or BaO to a total amount of alkaline earth oxide ($RO_{Total}$), according to an aspect of the present disclosure.
Figure 9B:
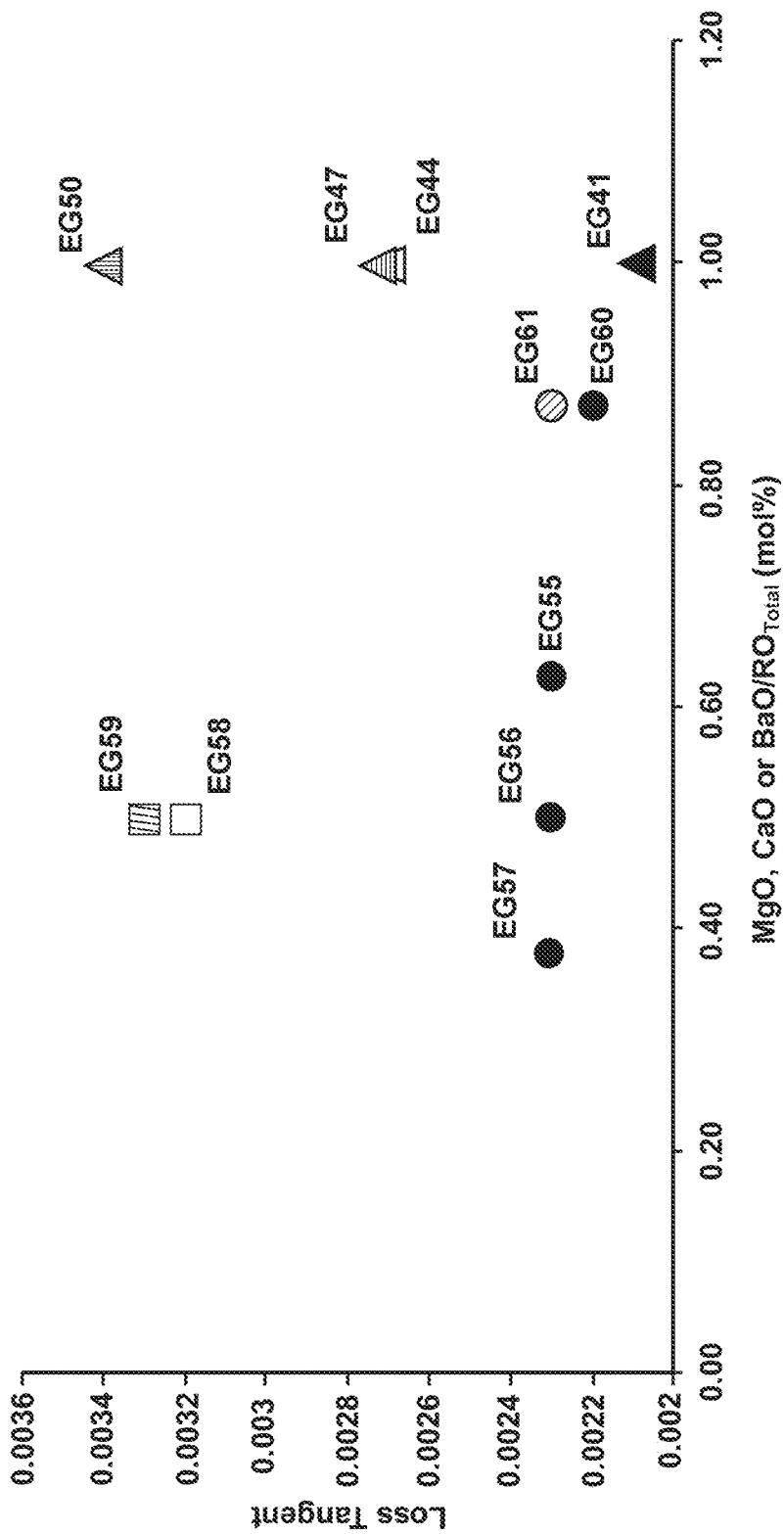
FIG. 9B is a plot of measured loss tangent for a set of glass compositions as a function of a ratio of an amount of MgO, CaO, or BaO to a total amount of alkaline earth oxide ($RO_{Total}$), according to an aspect of the present disclosure.

FIGS. 9A and 9B compare the dielectric constant and loss tangent, respectively, of glasses that include a single RO species or mixed RO species. The X-axis in both plots is a ratio of a single RO species (MgO, CaO, or BaO) to the total amount of RO present in the glass composition ($RO_{Total}$). The data in FIG. 9A shows that examples having mixed RO species, such as MgO+CaO (EG55-57) and examples having MgO+SrO (EG61) exhibit a lower dielectric constant than examples having a single type of RO species, even though the $RO_{Total}$ for the single and mixed RO species examples is about the same. For example, EG55-57, which include both MgO and CaO, exhibit a lower dielectric constant than the corresponding single RO species example glasses, EG41 (MgO) and EG44 (CaO). The combination of CaO or SrO with BaO (EG58 and EG59, respectively), results in a glass having a lower dielectric constant than BaO alone (EG50). EG61 demonstrates that combining MgO with SrO can produce a glass having a lower dielectric constant than SrO alone (EG47). FIG. 8A illustrates that dielectric constant decreased with decreasing RO content for a single RO species. The data shown in FIG. 9A demonstrates that in applications in which higher amounts of total RO are desired, combining two or more RO species can provide the glasses of the present disclosure with a lower dielectric constant compared to glasses having a single RO species for a given $RO_{Total}$. For example, increasing the concentration of RO in a glass composition may facilitate decreasing the liquidus temperature, however, as shown in FIG. 8A, increasing the concentration of RO increases the dielectric constant of the glass when only a single RO species is used. Mixing RO species, such as MgO+CaO or MgO+SrO, may help provide a desired decrease in the liquidus temperature, while also decreasing the dielectric constant of the glass.

The data in FIG. 9B shows that examples having mixed RO species, such as MgO+CaO (EG55-57) and examples having MgO+SrO (EG61) exhibit a lower loss tangent than examples having only CaO, SrO, or BaO as the RO species, even though the $RO_{Total}$ for the single and mixed RO species examples is about the same. For example, EG55-57, which include both MgO and CaO, exhibit a lower loss tangent than single RO species examples containing CaO (EG44), SrO (EG47), and BaO (EG50). The combination of CaO or SrO with BaO (EG58 and EG59, respectively), results in a glass having a lower loss tangent than BaO alone (EG50). EG61 demonstrates that combining MgO with SrO can produce a glass having a lower loss tangent than SrO alone (EG47). FIG. 8B illustrates that loss tangent decreased with decreasing RO content for a single RO species. The data shown in FIG. 9B demonstrates that in applications in which higher amounts of total RO are desired, combining two or more RO species can provide the glasses of the present disclosure with a lower loss tangent compared to glasses having a single RO species, CaO, SrO, or BaO, for a given $RO_{Total}$. The lowest loss tangent value was seen for the example that included only MgO as the single RO species (EG41). However, the data in FIG. 9B indicates that in applications where the presence of an RO species other than MgO is desired, such as CaO, SrO, or BaO, combining these species with MgO will likely result in a glass having a lower loss tangent than a comparable glass including only CaO, SrO, or BaO as the single RO species.

Figure 10A:
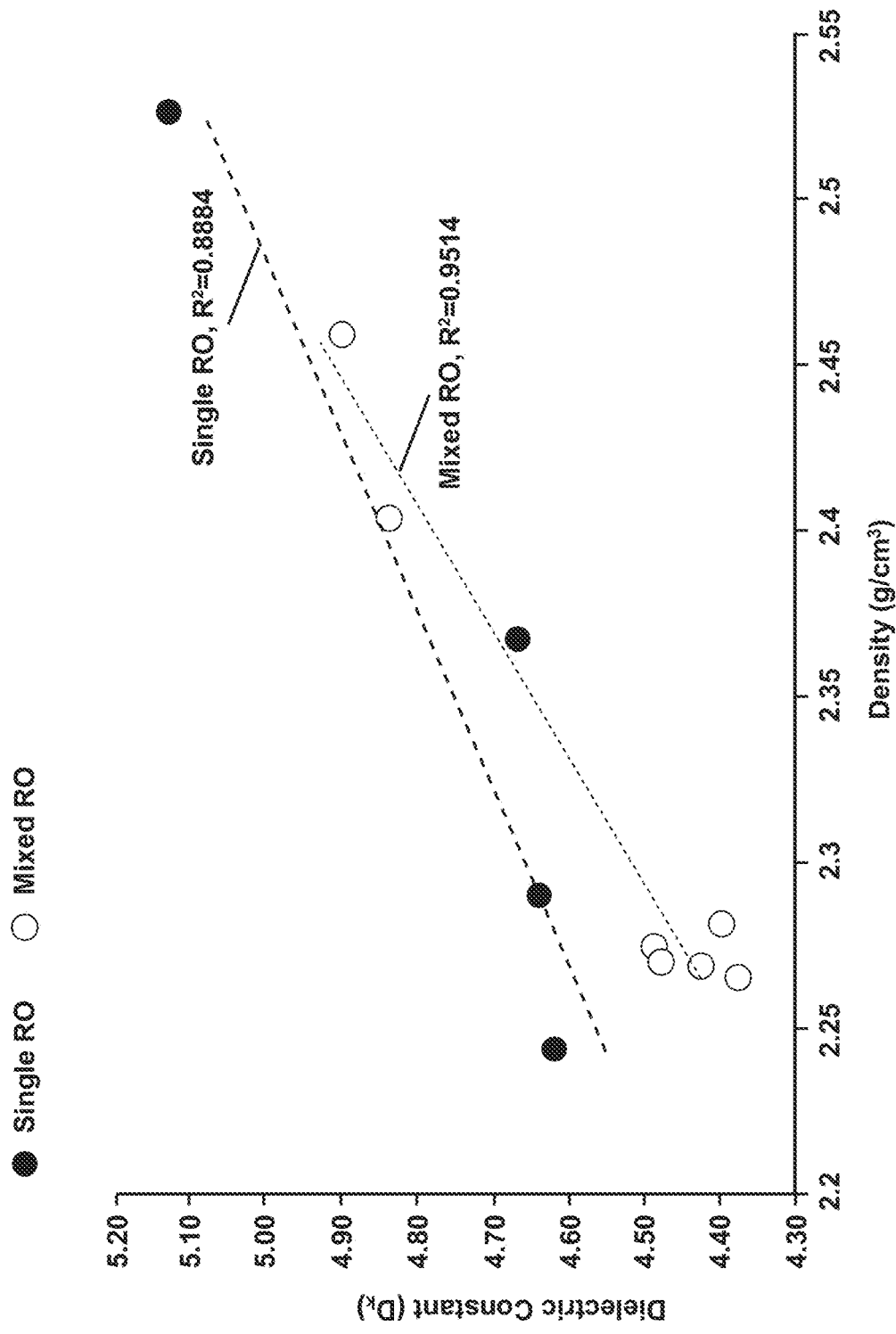
FIG. 10A is a plot of measured dielectric constant ($D_k$) for a set of glass compositions having a single RO species or mixed RO species as a function of density of the glass, according to an aspect of the present disclosure.
Figure 10B:
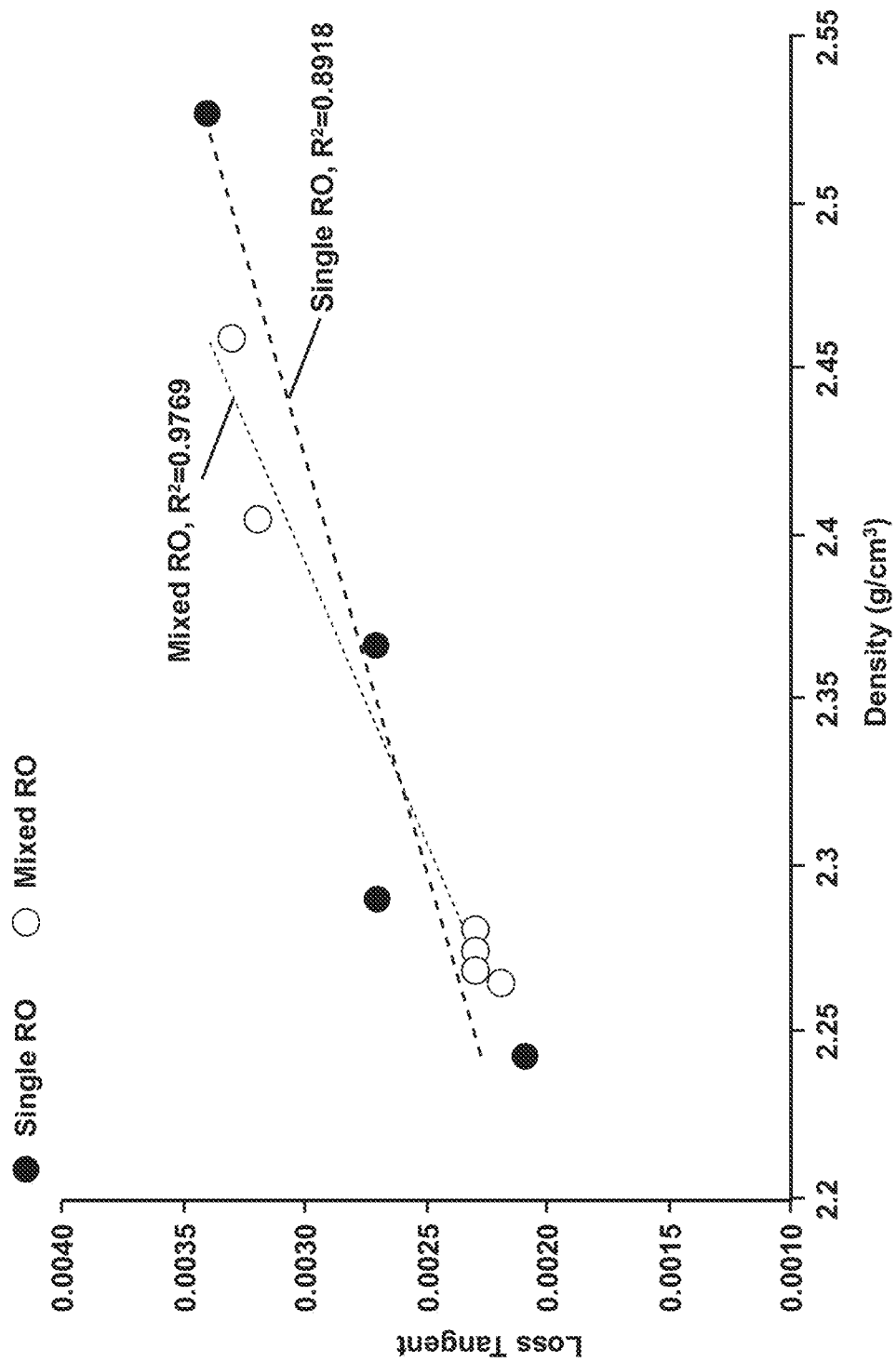
FIG. 10B is a plot of measured loss tangent for a set of glass compositions having a single RO species or mixed RO species as a function of density of the glass, according to an aspect of the present disclosure.

FIGS. 10A and 10B illustrate the dielectric constant and loss tangent, respectively, of examples of single and mixed RO species from Tables 11 and 12 as a function of glass density. The $R^2$ value for a least squares regression for the single and mixed RO species glasses is also shown. The data in FIGS. 10A and 10B suggest a linear relationship between density of the example glasses having mixed RO species, for both dielectric constant and loss tangent, respectively, as indicated by the $R^2$ values of ≥ about 0.95.

Figure 11:
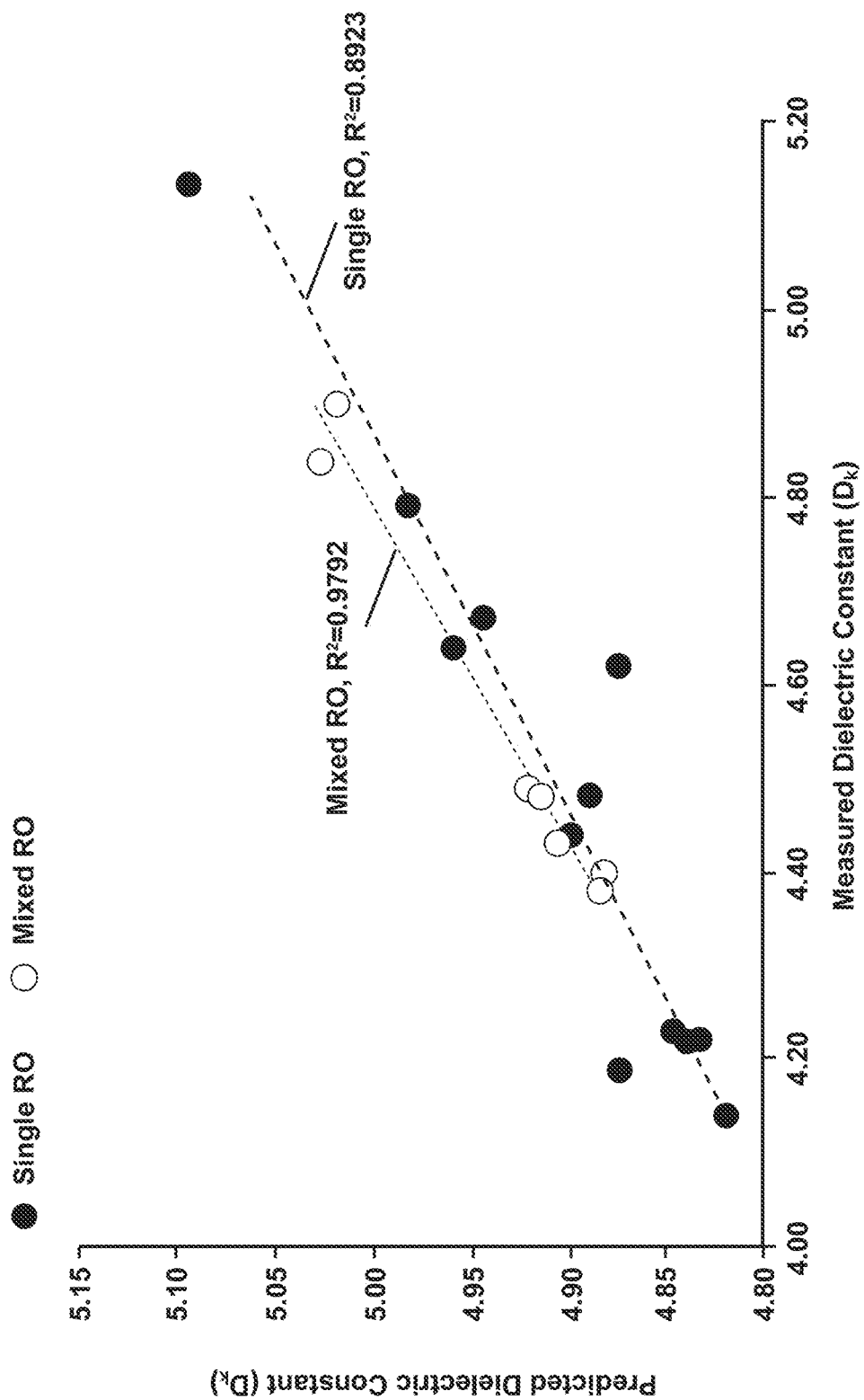
FIG. 11 is a plot of predicted dielectric constant ($D_k$) as a function of measured dielectric constant ($D_k$) for a set of glass compositions having a single RO species or mixed RO species.

While not wishing to be limited by any theory, it is believed that the effect of RO concentration and type in mixed RO species may be related to the molar volume and molecular polarizability of the glass. FIG. 11 compares the measured dielectric constant for several examples of single and mixed RO species exemplary glasses from Tables 11 and 12 with the dielectric constant predicted using the Clausius-Mosotti Equation and the additivity rule. The dielectric constant ($D_k$) can be predicted using the Clausius-Mosotti Equation (Equation 5) shown below:

$$D_k = \frac{3(V_m) + 8\pi(\alpha_D)}{3(V_m) - 4\pi(\alpha_D)} \qquad \text{Equation 5}$$

$V_m$ is the molar volume of the glass and $\alpha_D$ is the molecular polarizability of the glass. The $R^2$ value for a least squares regression for exemplary glasses with a single RO species and mixed RO species is also shown. The $R^2$ value for the mixed RO species examples is greater than 0.97, indicating that the Clausius-Mosotti Equation and the additivity rule can be used to predict the dielectric constant of the exemplary glasses of Table 12 with reasonable certainty. This suggests that the effect of the mixed RO species on the dielectric constant of the glass may be related at least in part to the molar volume and molecular polarizability of the glass.

Example 6

Table 13 illustrates Exemplary Glasses EG62-EG76 according to the present disclosure, in mol %, as calculated on an oxide basis from the as-batched glasses (the glass precursor composition from which the glass is derived). The glass samples were prepared and characterized as described above with respect to the Exemplary Glasses of Example 1.

TABLE 13

| Compositions and Properties for Exemplary Glasses EG62-EG76 | | | | | | |
|---|---|---|---|---|---|---|
| | EG62 | EG63 | EG64 | EG65 | EG66 | EG67 |
| Oxide (mol %) | | | | | | |
| SiO$_2$ | 68.7 | 68.97 | 69.30 | 68.98 | 68.05 | 69.18 |
| Al$_2$O$_3$ | 6.8 | 6.86 | 4.78 | 5.80 | 6.77 | 6.88 |
| B$_2$O$_3$ | 16.9 | 17.87 | 19.95 | 18.42 | 16.73 | 17 |
| Li$_2$O | 0.0 | 0.00 | 0.00 | 0.00 | 0.00 | 0 |
| K$_2$O | 0.0 | 0.00 | 0.00 | 0.00 | 0.00 | 0 |
| MgO | 2.7 | 1.91 | 2.90 | 2.81 | 5.81 | 5.91 |
| CaO | 4.9 | 4.35 | 2.98 | 3.91 | 2.56 | 0 |
| SrO | 0.0 | 0.00 | 0.00 | 0.00 | 0.00 | 0 |
| BaO | 0.0 | 0.00 | 0.00 | 0.00 | 0.00 | 0.95 |
| Sb$_2$O$_3$ | 0.0 | 0.00 | 0.00 | 0.00 | 0.00 | 0 |
| SnO$_2$ | 0.1 | 0.08 | 0.08 | 0.08 | 0.08 | 0.08 |
| RO$_{Total}$ | 7.55 | 6.26 | 5.88 | 6.72 | 8.37 | 6.86 |

TABLE 13-continued

Compositions and Properties for Exemplary Glasses EG62-EG76

| | | | | | | |
|---|---|---|---|---|---|---|
| $Al_2O_3:(Al_2O_3 + B_2O_3)$ | 0.29 | 0.28 | 0.19 | 0.24 | 0.29 | 0.29 |
| $RO_{Total}:Al_2O_3$ | 1.11 | 0.91 | 1.23 | 1.16 | 1.24 | 1.00 |
| $RO_{Total}:(Al_2O_3 + B_2O_3)$ | 0.32 | 0.25 | 0.24 | 0.28 | 0.36 | 0.29 |
| Physical Properties | | | | | | |
| Str. Pt. | 628 | 612 | — | — | — | — |
| Ann. Pt. | 700 | 681 | — | — | — | — |
| Density | 2.260 | 2.240 | 2.206 | 2.229 | 2.257 | 2.267 |
| A | −3.33 | −3.36 | −2.93 | −3.22 | −2.64 | −3.11 |
| B | 8385.80 | 8625.80 | 8132.80 | 8584.80 | 6749.10 | 7982.2 |
| $T_o$ | 172.10 | 161.90 | 170.30 | 145.00 | 297.10 | 214.3 |
| 200 | 1661 | 1686 | 1724 | 1701 | 1664 | 1689 |
| 35000 | 1237 | 1253 | 1258 | 1251 | 1237 | 1257 |
| 200P-35 kP | 424 | 433 | 466 | 450 | 427 | 432 |
| Liquidus Viscosity | $2.77 \times 10^6$ | $2.35 \times 10^5$ | $5.86 \times 10^5$ | $6.60 \times 10^5$ | $5.90 \times 10^5$ | $1.43 \times 10^5$ |
| Liquidus primary phase | boromullite | boromullite | — | — | unknown/boromullite | boromullite |
| Dielectric Properties | | | | | | |
| $D_k$* | 4.40 | 4.49 | 4.18 | 4.32 | 4.38 | 4.34 |
| Loss tangent* | 0.0020 | 0.0023 | 0.0015 | 0.0021 | 0.0024 | 0.0022 |

| | EG68 | EG69 | EG70 | EG71 | EG72 | EG73 |
|---|---|---|---|---|---|---|
| Oxide (mol %) | | | | | | |
| $SiO_2$ | 68.9 | 68.9 | 70.15 | 68.89 | 68.89 | 68.34 |
| $Al_2O_3$ | 7 | 7 | 8.25 | 8.67 | 8.67 | 8.5 |
| $B_2O_3$ | 16 | 16 | 11 | 11 | 11 | 12.12 |
| $Li_2O$ | 0 | 0 | 0 | 0 | 0 | 0 |
| $K_2O$ | 0 | 0 | 0 | 0 | 0 | 0 |
| MgO | 4 | 3 | 6.25 | 5 | 6.67 | 5.02 |
| CaO | 4 | 5 | 4.25 | 6.34 | 4.67 | 5.91 |
| SrO | 0 | 0 | 0 | 0 | 0 | 0 |
| BaO | 0 | 0 | 0 | 0 | 0 | 0 |
| $Sb_2O_3$ | 0 | 0 | 0 | 0 | 0 | 0 |
| $SnO_2$ | 0.1 | 0.1 | 0.1 | 0.1 | 0.1 | 0.11 |
| $RO_{Total}$ | 8.00 | 8.00 | 10.50 | 11.34 | 11.34 | 10.93 |
| $Al_2O_3:(Al_2O_3 + B_2O_3)$ | 0.30 | 0.30 | 0.43 | 0.44 | 0.44 | 0.41 |
| $RO_{Total}:Al_2O_3$ | 1.14 | 1.14 | 1.27 | 1.31 | 1.31 | 1.28 |
| $RO_{Total}:(Al_2O_3 + B_2O_3)$ | 0.35 | 0.35 | 0.55 | 0.58 | 0.58 | 0.53 |
| Physical Properties | | | | | | |
| Str. Pt. | — | 637.5 | 686 | 677.3 | 680.8 | |
| Ann. Pt. | — | 713 | 753.4 | 730.5 | 740.7 | 748.04* |
| Density | 2.27 | 2.27 | 2.33 | 2.36 | 2.35 | 2.39* |
| A | −3.02 | −2.80 | −3.22 | −3.21 | −2.44 | 3.5671* |
| B | 7687.70 | 7344.00 | 7952.70 | 7884.2 | 6456.30 | 7598.5* |
| $T_o$ | 230.30 | 242.70 | 248.20 | 252.70 | 358.90 | 301.3* |
| 200 | 1675 | 1682 | 1689 | 1683 | 1721 | 1596* |
| 35000 | 1247 | 1243 | 1272 | 1269 | 1283 | 1238* |
| 200P-35 kP | 428 | 440 | 416 | 414 | 437 | — |
| Liquidus Viscosity | $8.36 \times 10^5$ | $2.32 \times 10^6$ | $4.47 \times 10^5$ | $3.11 \times 10^5$ | $5.03 \times 10^5$ | $2.94 \times 10^{5*}$ |
| Liquidus primary phase | boromullite | boromullite | cristobalite | cristobalite | cristobalite | cristobalite* |
| Dielectric Properties | | | | | | |
| $D_k$* | 4.48 | 4.49 | 4.77 | 4.82 | 4.82 | 4.76 |
| Loss tangent* | 0.0023 | 0.0023 | 0.0032 | 0.0034 | 0.0034 | 0.0032 |

| | EG74 | EG675 | EG76 |
|---|---|---|---|
| Oxide (mol %) | | | |
| $SiO_2$ | 68.34 | 68.65 | 68.8 |
| $Al_2O_3$ | 8.5 | 7.61 | 7.36 |
| $B_2O_3$ | 13.48 | 14.65 | 15.24 |
| $Li_2O$ | 0 | 0 | 0 |
| $K_2O$ | 0 | 0 | 0 |
| MgO | 4.15 | 3.59 | 3.31 |
| CaO | 5.42 | 5.39 | 5.19 |
| SrO | 0 | 0 | 0 |
| BaO | 0 | 0 | 0 |
| $Sb_2O_3$ | 0 | 0 | 0 |
| $SnO_2$ | 0.11 | 0.1 | 0.1 |
| $RO_{Total}$ | 9.57 | 8.98 | 8.5 |
| $Al_2O_3:(Al_2O_3 + B_2O_3)$ | 0.39 | 0.34 | 0.32 |
| $RO_{Total}:Al_2O_3$ | 1.12 | 1.18 | 1.15 |
| $RO_{Total}:(Al_2O_3 + B_2O_3)$ | 0.44 | 0.40 | 0.38 |

TABLE 13-continued

Compositions and Properties for Exemplary Glasses EG62-EG76

| Physical Properties | | | |
|---|---|---|---|
| Str. Pt. | — | — | — |
| Ann. Pt. | 770.75* | 716.47* | 692.29* |
| Density | 2.36* | 2.37* | 2.31* |
| A | −2.4031* | −3.4263* | −3.1745* |
| B | 5932.5* | 7750.2* | 7587.8* |
| $T_o$ | 396.47* | 257.28* | 234.4* |
| 200 | 1658* | 1610* | 1620* |
| 35000 | 1250* | 1230* | 1217* |
| 200P-35 kP | — | — | — |
| Liquidus Viscosity | $2.76 \times 10^{5}$* | $4.52 \times 10^{5}$* | $3.27 \times 10^{5}$* |
| Liquidus primary phase | cristobalite* | cristobalite* | cristobalite* |
| Dielectric Properties | | | |
| $D_k$* | 4.66 | 4.59 | 4.54 |
| Loss tangent* | 0.0028 | 0.026 | 0.0025 |

*Indicates predicted value using modeling; all other values are experimentally obtained measured values.

The following non-limiting aspects are encompassed by the present disclosure.

According to a first aspect of the present disclosure, an article includes: a glass including: $SiO_2$ from about 60% to about 80%; $Al_2O_3$ from 0% to about 13%; $B_2O_3$ from about 15% to about 28%; from 0% to about 1% of at least one fining agent; and one or more alkaline earth oxides (RO) totaling from 0% to about 15% (by mole of oxide), wherein RO is selected from CaO, MgO, BaO, and SrO, wherein a ratio of $B_2O_3$:($Al_2O_3$+$SiO_2$) is from about 0.13 to about 0.35, and wherein the glass includes a dielectric constant of about 10 or less and a loss tangent of about 0.01 or less, both as measured with signals at 10 GHz.

According to a second aspect of the present disclosure, the article according to aspect 1, wherein the fining agent includes one or more of $SnO_2$, $Sb_2O_3$, $As_2O_3$, and a halogen salt.

According to a third aspect of the present disclosure, the article according to aspect 1, wherein the glass further includes one or more of CaO, MgO, BaO, and SrO totaling from about 2% to about 15% (by mole of oxide).

According to a fourth aspect of the present disclosure, the article according to aspect 3, wherein the glass further includes MgO from about 1% to about 13% and CaO from about 0.1% to about 10% (by mole of oxide).

According to a fifth aspect of the present disclosure, the article according to aspect 1, wherein the glass includes 0 mol %<RO≤8.5 mol %, and further includes a dielectric constant of about 6 or less and/or a loss tangent of about 0.004 or less, both as measured with signals at 10 GHz.

According to a sixth aspect of the present disclosure, the article according to aspect 1, wherein the ratio of $B_2O_3$:($Al_2O_3$+$SiO_2$) is from about 0.22 to about 0.35.

According to a seventh aspect of the present disclosure, the article according to aspect 1, wherein a ratio of RO:($Al_2O_3$+(0.5*$B_2O_3$)) is from 0 to about 0.9.

According to an eighth aspect of the present disclosure, the article according to aspect 1, wherein a ratio of RO:($Al_2O_3$+(0.5*$B_2O_3$)) is from about 0.2 to about 0.9.

According to a ninth aspect of the present disclosure, the article according to aspect 1, wherein the glass further includes: $SiO_2$ from about 64% to about 75%; $Al_2O_3$ from about 1% to about 12%; and $B_2O_3$ from about 16% to about 26% (by mole of oxide).

According to a tenth aspect of the present disclosure, the article according to any one of aspects 1-9, wherein the glass includes a dielectric constant of about 7.5 or less and a loss tangent of about 0.005 or less, as measured with signals at 10 GHz.

According to an eleventh aspect of the present disclosure, the article according to any one of aspects 1-9, wherein the glass includes a dielectric constant of about 5 or less and a loss tangent of about 0.005 or less, as measured with signals at 10 GHz.

According to a twelfth aspect of the present disclosure, the article according to any one of aspects 1-11, wherein the glass includes no more than trace amounts of alkali metal oxides.

According to a thirteenth aspect of the present disclosure, the article according to any one of aspects 1-12, wherein the glass includes an average coefficient of thermal expansion (CTE) of about $25 \times 10^{-7}$/° C. to about $65 \times 10^{-7}$/° C., as measured from 0° C. to 300° C.

According to a fourteenth aspect of the present disclosure, the article according to any one of aspects 1-13, wherein the glass includes dimensional stability for 30 seconds at 260° C.

According to a fifteenth aspect of the present disclosure, an article includes: a glass including: $SiO_2$ from about 60% to about 80%; $Al_2O_3$ from 0% to about 13%; $B_2O_3$ from about 15% to about 28%; from 0% to about 1% of at least one fining agent; and one or more alkaline earth oxides (RO) totaling from 0% to about 15% (by mole of oxide), wherein RO is selected from CaO, MgO, BaO, and SrO, wherein a ratio of RO:($Al_2O_3$+(0.5*$B_2O_3$)) is from about 0 to about 0.9, and wherein the glass includes a liquidus viscosity from about 40 kPoise to about 5,000 kPoise.

According to a sixteenth aspect of the present disclosure, the article according to aspect 15, wherein the fining agent includes one or more of $SnO_2$, $Sb_2O_3$, $As_2O_3$, and a halogen salt.

According to a seventeenth aspect of the present disclosure, the article according to aspect 16, wherein the glass further includes one or more of CaO, MgO, BaO, and SrO totaling from about 2% to about 15% (by mole of oxide).

According to an eighteenth aspect of the present disclosure, the article according to aspect 17, wherein the glass further includes MgO from about 1% to about 13% and CaO from about 0.1% to about 10% (by mole of oxide).

According to a nineteenth aspect of the present disclosure, the article according to aspect 15, wherein the glass includes 0 mol %<RO≤8.5 mol %, and further includes a dielectric constant of about 6 or less and/or a loss tangent of about 0.004 or less, both as measured with signals at 10 GHz.

According to a twentieth aspect of the present disclosure, the article according to aspect 15, wherein the ratio of $RO:(Al_2O_3+(0.5*B_2O_3))$ is from about 0.2 to about 0.9.

According to a twenty-first aspect of the present disclosure, the article according to aspect 15, wherein a ratio of $B_2O_3:(Al_2O_3+SiO_2)$ is from about 0.13 to about 0.35.

According to a twenty-second aspect of the present disclosure, the article according to aspect 21, wherein the ratio of $B_2O_3:(Al_2O_3+SiO_2)$ is from about 0.22 to about 0.35.

According to a twenty-third aspect of the present disclosure, the article according to aspect 15, wherein the glass further includes: $SiO_2$ from about 65% to about 80%; $Al_2O_3$ from about 1% to about 8%; and $B_2O_3$ from about 16% to about 26% (by mole of oxide).

According to a twenty-fourth aspect of the present disclosure, the article according to any one of aspects 15-23, wherein the glass further includes a 35,000 Poise Temperature from about 1,110° C. to about 1,325° C.

According to a twenty-fifth aspect of the present disclosure, the article according to any one of aspects 15-24, wherein the glass further includes a 200 Poise Melting Point from about 1600° C. to about 1825° C.

According to a twenty-sixth aspect of the present disclosure, the article according to any one of aspects 15-25, wherein the glass includes no more than trace amounts of alkali metal oxides.

According to a twenty-seventh aspect of the present disclosure, the article according to any one of aspects 15-26, wherein the glass includes an average coefficient of thermal expansion (CTE) of about $25 \times 10^{-7}/°$ C. to about $65 \times 10^{-7}/°$ C., as measured from 0° C. to 300° C.

According to a twenty-eighth aspect of the present disclosure, the article according to any one of aspects 15-27, wherein the glass further includes a liquidus viscosity from about 50 kPoise to about 3000 kPoise.

According to a twenty-ninth aspect of the present disclosure, the article according to any one of aspects 15-29, wherein the glass includes dimensional stability for 30 seconds at 260° C.

According to a thirtieth aspect of the present disclosure, an article includes: a glass including: $SiO_2$ from about 60% to about 80%; $Al_2O_3$ from 0% to about 13%; $B_2O_3$ from about 15% to about 28%; from 0% to about 1% of at least one fining agent; and one or more alkaline earth oxides (RO) totaling from 0% to about 15% (by mole of oxide), wherein RO is selected from CaO, MgO, BaO, and SrO, wherein a ratio of $B_2O_3:(Al_2O_3+SiO_2)$ is from about 0.13 to about 0.35, and wherein the glass includes a dielectric constant of about 10 or less and a loss tangent of about 0.01 or less, as measured with signals at 10 GHz, and further wherein the glass includes a liquidus viscosity from about 40 kPoise to about 5,000 kPoise.

According to a thirty-first aspect of the present disclosure, the article according to aspect 30, wherein the fining agent includes one or more of $SnO_2$, $Sb_2O_3$, $As_2O_3$, and a halogen salt.

According to a thirty-second aspect of the present disclosure, the article according to aspect 30, wherein the glass includes a dielectric constant of about 7.5 or less and a loss tangent of about 0.005 or less, as measured with signals at 10 GHz.

According to a thirty-third aspect of the present disclosure, the article according to aspect 30, wherein the glass includes a dielectric constant of about 5 or less and a loss tangent of about 0.005 or less, as measured with signals at 10 GHz.

According to a thirty-fourth aspect of the present disclosure, the article according to any one of aspects 30-33, wherein the glass includes a liquidus viscosity from about 50 kPoise to about 3000 kPoise.

According to a thirty-fifth aspect of the present disclosure, the article according to any one of aspects 30-34, wherein the glass further includes a 35,000 Poise Temperature from about 1,110° C. to about 1,325° C.

According to a thirty-sixth aspect of the present disclosure, the article according to any one of aspects 30-35, wherein the glass further includes: $SiO_2$ from about 64% to about 75%; $Al_2O_3$ from about 1% to about 12%; and $B_2O_3$ from about 16% to about 26% (by mole of oxide).

According to a thirty-seventh aspect of the present disclosure, the article according to aspect 30, wherein the ratio of $B_2O_3:(Al_2O_3+SiO_2)$ is from about 0.22 to about 0.35.

According to a thirty-eighth aspect of the present disclosure, the article according to aspect 30, wherein a ratio of $RO:(Al_2O_3+(0.5*B_2O_3))$ is from about 0 to about 0.9.

According to a thirty-ninth aspect of the present disclosure, the article according to aspect 38, wherein the ratio of $RO:(Al_2O_3+(0.5*B_2O_3))$ is from about 0.2 to about 0.9.

According to a fortieth aspect of the present disclosure, an article includes: a glass including: $SiO_2$ from about 60% to about 80%; $Al_2O_3$ from 0% to about 13%; $B_2O_3$ from about 15% to about 28%; from 0% to about 1% of at least one fining agent; and MgO and at least one additional alkaline earth oxide (RO), wherein the at least one additional RO is selected from CaO, BaO, and SrO, and wherein a total amount of MgO plus the at least one additional RO ($RO_{Total}$) is from about 3% to about 15% (by mole of oxide), and wherein the glass includes a dielectric constant of about 10 or less and/or a loss tangent of about 0.01 or less, both as measured with signals at 10 GHz.

According to a forty-first aspect of the present disclosure, the article according to aspect 40, further including a loss tangent of about 0.008 or less, as measured with signals at 10 GHz.

According to a forty-second aspect of the present disclosure, the article according to aspect 40, wherein the glass includes a dielectric constant of about 7.5 or less and a loss tangent of about 0.005 or less, both as measured with signals at 10 GHz.

According to a forty-third aspect of the present disclosure, the article according to any one of aspects 40-42, wherein a ratio of $MgO:RO_{Total}$ is at least 0.3.

According to a forty-fourth aspect of the present disclosure, the article according to any one of aspects 40-42, wherein a ratio of $MgO:RO_{Total}$ is at least 0.5.

According to a forty-fifth aspect of the present disclosure, the article according to any one of aspects 40-44, wherein $RO_{Total}$ is from about 4% to about 15 mol % (by mole of oxide).

According to a forty-sixth aspect of the present disclosure, the article according to any one of aspects 40-45, wherein a ratio of $RO_{Total}:Al_2O_3$ is >1.

According to a forty-seventh aspect of the present disclosure, the article according to any one of aspects 40-46, wherein a ratio of $B_2O_3:(Al_2O_3+SiO_2)$ is from about 0.13 to about 0.35.

According to a forty-eighth aspect of the present disclosure, the article according to any one of aspects 40-47, wherein the at least one additional RO is CaO, and further wherein MgO is present from about 1% to about 10% and CaO is present from about 1% to about 10% (by mole of oxide).

According to a forty-ninth aspect of the present disclosure, the article according to any one of aspects 40-47, wherein the at least one additional RO is CaO, and further wherein MgO is present from about 1% to about 7% and CaO is present from about 2% to about 7% (by mole of oxide).

According to a fiftieth aspect of the present disclosure, the article according to any one of aspects 40-47, wherein the at least one additional RO is SrO, and further wherein MgO is present from about 1% to about 10% and SrO is present from about 1% to about 5% (by mole of oxide).

According to a fifty-first aspect of the present disclosure, the article according to any one of aspects 40-50, wherein the fining agent includes one or more of $SnO_2$, $Sb_2O_3$, $As_2O_3$, and a halogen salt.

According to a fifty-second aspect of the present disclosure, the article according to any one of aspects 40-51, wherein a ratio of $RO_{Total}:(Al_2O_3+B_2O_3)$ is from about 0.2 to about 0.6.

According to a fifty-third aspect of the present disclosure, the article according to any one of aspects 40-52, wherein the glass is substantially free of alkali metal oxides.

According to a fifty-fourth aspect of the present disclosure, the article according to any one of aspects 40-53, wherein the glass has a density of from about 2.2 to about 2.5 grams per cubic centimeter, as measured at about 25° C.

According to a fifty-fifth aspect of the present disclosure, the article according to any one of aspects 40-54, wherein the glass further includes a 35,000 Poise Temperature from about 1,110° C. to about 1,325° C.

According to a fifty-sixth aspect of the present disclosure, the article according to any one of aspects 40-55, wherein the glass further includes a 200 Poise Melting Point from about 1600° C. to about 1825° C.

According to a fifty-seventh aspect of the present disclosure, an article for a substrate in an electronic device includes: a glass consisting essentially of: $SiO_2$ from about 60% to about 80%; $Al_2O_3$ from 0% to about 13%; $B_2O_3$ from about 15% to about 28%; from 0% to about 1% of at least one fining agent; and MgO and at least one additional alkaline earth oxide (RO), wherein the at least one additional RO is selected from CaO, BaO, and SrO, and wherein a total amount of MgO plus the at least one additional RO ($RO_{Total}$) is from about 3% to about 15% (by mole of oxide), and wherein the glass includes a dielectric constant of about 10 or less and/or a loss tangent of about 0.01 or less, both as measured with signals at 10 GHz.

According to a fifty-eighth aspect of the present disclosure, the article according to aspect 57, further including a loss tangent of about 0.008 or less, as measured with signals at 10 GHz.

According to a fifty-ninth aspect of the present disclosure, the article according to aspect 57, wherein the glass includes a dielectric constant of about 7.5 or less and a loss tangent of about 0.005 or less, both as measured with signals at 10 GHz.

According to a sixtieth aspect of the present disclosure, the article according to any one of aspects 57-59, wherein a ratio of $MgO:RO_{Total}$ is at least 0.3.

According to a sixty-first aspect of the present disclosure, the article according to any one of aspects 57-59, wherein a ratio of $MgO:RO_{Total}$ is at least 0.5.

According to a sixty-second aspect of the present disclosure, the article according to any one of aspects 57-44, wherein $RO_{Total}$ is from about 4% to about 15 mol % (by mole of oxide).

According to a sixty-third aspect of the present disclosure, the article according to any one of aspects 57-62, wherein a ratio of $RO_{Total}:Al_2O_3$ is >1.

According to a sixty-fourth aspect of the present disclosure, the article according to any one of aspects 57-63, wherein a ratio of $B_2O_3:(Al_2O_3+SiO_2)$ is from about 0.13 to about 0.35.

According to a sixty-fifth aspect of the present disclosure, the article according to any one of aspects 57-64, wherein the at least one additional RO is CaO, and further wherein MgO is present from about 1% to about 10% and CaO is present from about 1% to about 10% (by mole of oxide).

According to a sixty-sixth aspect of the present disclosure, the article according to any one of aspects 57-64, wherein the at least one additional RO is CaO, and further wherein MgO is present from about 1% to about 7% and CaO is present from about 2% to about 7% (by mole of oxide).

According to a sixty-seventh aspect of the present disclosure, the article according to any one of aspects 57-64, wherein the at least one additional RO is SrO, and further wherein MgO is present from about 1% to about 10% and SrO is present from about 1% to about 5% (by mole of oxide).

According to a sixty-eighth aspect of the present disclosure, the article according to any one of aspects 57-67, wherein the fining agent includes one or more of $SnO_2$, $Sb_2O_3$, $As_2O_3$, and a halogen salt.

According to a sixty-ninth aspect of the present disclosure, the article according to any one of aspects 57-68, wherein a ratio of $RO_{Total}:(Al_2O_3+B_2O_3)$ is from about 0.2 to about 0.6.

According to seventieth aspect of the present disclosure, the article according to any one of aspects 57-69, wherein the glass is substantially free of alkali metal oxides.

According to a seventy-first aspect of the present disclosure, the article according to any one of aspects 57-70, wherein the glass has a density of from about 2.2 to about 2.5 grams per cubic centimeter, as measured at about 25° C.

According to a seventy-second aspect of the present disclosure, the article according to any one of aspects 57-71, wherein the glass further includes a 35,000 Poise Temperature from about 1,110° C. to about 1,325° C.

According to a seventy-third aspect of the present disclosure, the article according to any one of aspects 57-72, wherein the glass further includes a 200 Poise Melting Point from about 1600° C. to about 1825° C.

According to a seventy-fourth aspect of the present disclosure, an article includes: a glass including: $SiO_2$, $Al_2O_3$, and $B_2O_3$; and at least one of $Li_2O$, $Na_2O$, $K_2O$, MgO, CaO, SrO, BaO, $SnO_2$, ZnO, $La_2O_3$, F, and $Fe_2O_3$, wherein a first sum ($X_{sum}$) of $SiO_2$, $Al_2O_3$, and $B_2O_3$, a second sum ($Y_{sum}$) of $Li_2O$, $Na_2O$, $K_2O$, MgO, CaO, SrO, and BaO, and a third sum ($Z_{sum}$) of $SnO_2$, ZnO, $La_2O_3$, F, and $Fe_2O_3$, ($X_{sum}$, $Y_{sum}$, and $Z_{sum}$ in percent by mole of oxide), lies within a convex hull of $X_{sum}$, $Y_{sum}$, and $Z_{sum}$, as further defined by the following boundary points:

| $X_{sum}$ | $Y_{sum}$ | $Z_{sum}$ |
|---|---|---|
| 88.53 | 11.39 | 0.08 |
| 78.42 | 21.13 | 0.45 |
| 73.72 | 20.66 | 5.62 |
| 88.63 | 3.78 | 7.58 |
| 100.00 | 0 | 0 | wherein the glass is further defined by at least one of Equation 1 and Equation 2 (in percent by mole of oxide):

$$-42.8440902+0.463763055*[SO_2]+0.520077325*[Al_2O_3]+0.468168738*[B_2O_3]+0.47253232*[Li_2O]+2.11958583*[K_2O]+0.499421381*[MgO]+0.558094225*[CaO]+0.805792958*[SrO]+0.637349469*[BaO]-0.17232118*[SnO_2]+0.525853343*[ZnO]+0.261394654*[La_2O_3]+0.469279089*[F] \leq 10 \quad \text{Equation 1}$$

and $$0.756212572817506+[K_2O]+0.209148876828416*[La_2O_3]+0.0884393206156657*[BaO]+0.0384462744417211*[CaO]+(5.95212630529679-[F])/[B_2O_3]+(254.196472343803-2.1615185467817*[B_2O_3])/[SiO_2] \leq 10 \quad \text{Equation 2}$$

and further wherein the glass includes a dielectric constant of about 10 or less, as measured with signals at 10 GHz.

According to a seventy-fifth aspect of the present disclosure, the article of aspect 74, wherein the glass further includes a loss tangent of about 0.008 or less, as measured with signals at 10 GHz, and wherein the glass is further defined by at least one of Equation 3 and Equation 4 (in percent by mole of oxide):

$$0.429780863-0.00424207*[SiO_2]-0.004096119*[Al_2O_3]-0.004396116*[B_2O_3]-0.002791817*[Li_2O]-0.012890989*[K_2O]-0.004226519*[MgO]-0.004108234*[CaO]-0.003587217*[SrO]-0.004083111*[BaO]-0.028056812*[SnO_2]-0.004220402*[ZnO]+0.000195707*[La_2O_3]-0.004466313*[F] \leq 0.008 \quad \text{Equation 3}$$

and $$0.00454540427936441+0.00452303537205577*[K_2O]+0.00026538565533632*[B_2O_3]+2.211176044138 \times 10^{-5}*[Al_2O_3]*[BaO]+6.27439041968789 \times 10^{-6}*2^{[CaO]}-0.000215116681577554*[F]-6.01991751010702 \times 10^{-6}*[SiO_2]*[B_2O_3] \leq 0.008. \quad \text{Equation 4}$$

According to a seventy-sixth aspect of the present disclosure, the article of aspect 74 or aspect 75, wherein the glass further includes a dielectric constant of about 7.5 or less and a loss tangent of about 0.005 or less, as measured with signals at 10 GHz.

According to a seventy-seventh aspect of the present disclosure, the article of aspect 74 or aspect 75, wherein the glass further includes a dielectric constant of about 5 or less and a loss tangent of about 0.005 or less, as measured with signals at 10 GHz.

According to a seventy-eighth aspect of the present disclosure, the article of any one of aspects 74-77, wherein the first sum $X_{sum}$, the second sum $Y_{sum}$, and the third sum $Z_{sum}$ present in the glass, in percent by mole of oxide, is equal to 100.

According to an seventy-ninth aspect of the present disclosure, the article of any one of aspects 74-78, wherein the glass further includes MgO and ZnO.

According to an eightieth aspect of the present disclosure, the article of any one of aspects 74-79, wherein the glass further include $SnO_2$ and at least one of CaO and BaO.

According to an eighty-first aspect of the present disclosure, the article of any one of aspects 74-80, wherein the glass includes no more than trace amounts of alkali metal oxides.

According to an eighty-second aspect of the present disclosure, the article of any one of aspects 74-81, wherein the glass is substantially free of at least one of F, $La_2O_3$, and ZnO.

According to an eighty-third aspect of the present disclosure, the article of any one of aspects 74-81, wherein the glass further includes at least one of F, $La_2O_3$, and ZnO.

According to an eighty-fourth aspect of the present disclosure, an article includes: a glass including: $SiO_2$, $Al_2O_3$, and $B_2O_3$; and at least one of $Li_2O$, $Na_2O$, $K_2O$, MgO, CaO, SrO, BaO, $SnO_2$, ZnO, $La_2O_3$, F, and $Fe_2O_3$, wherein a first sum ($X_{sum}$) of $SiO_2$, $Al_2O_3$, and $B_2O_3$, a second sum ($Y_{sum}$) of $Li_2O$, $Na_2O$, $K_2O$, MgO, CaO, SrO, and BaO, and a third sum ($Z_{sum}$) of $SnO_2$, ZnO, $La_2O_3$, F, and $Fe_2O_3$, ($X_{sum}$, $Y_{sum}$, and $Z_{sum}$ in percent by mole of oxide), lies within a convex hull of $X_{sum}$, $Y_{sum}$, and $Z_{sum}$, as further defined by the following boundary points:

| $X_{sum}$ | $Y_{sum}$ | $Z_{sum}$ |
|---|---|---|
| 64.57 | 16.83 | 18.61 |
| 68.90 | 11.92 | 19.18 |
| 79.42 | 3.47 | 17.11 |
| 84.82 | 2.43 | 12.75 |
| 99.92 | 0.01 | 0.07 |
| 95.83 | 4.17 | 0 |
| 78.68 | 21.21 | 0.11 |
| 73.02 | 26.22 | 0.76 |
| 64.74 | 31.59 | 3.67 |
| 63.81 | 30.85 | 5.34 |
| 61.93 | 29.14 | 8.93 |
| 60.92 | 23.85 | 15.23 | wherein the glass is further defined by at least one of Equation 1 and Equation 2 (in percent by mole of oxide):

$$-42.8440902+0.463763055*[SO_2]+0.520077325*[Al_2O_3]+0.468168738*[B_2O_3]+0.47253232*[Li_2O]+2.11958583*[K_2O]+0.499421381*[MgO]+0.558094225*[CaO]+0.805792958*[SrO]+0.637349469*[BaO]-0.17232118*[SnO_2]+0.525853343*[ZnO]+0.261394654*[La_2O_3]+0.469279089*[F] \leq 10 \quad \text{Equation 1}$$

and $$0.756212572817506+[K_2O]+0.209148876828416*[La_2O_3]+0.0884393206156657*[BaO]+0.0384462744417211*[CaO]+(5.95212630529679-[F])/[B_2O_3]+(254.196472343803-2.1615185467817*[B_2O_3])/[SiO_2] \leq 10 \quad \text{Equation 2}$$

and wherein the glass further includes a dielectric constant of about 10 or less, as measured with signals at 10 GHz.

According to an eighty-fifth aspect of the present disclosure, the article of aspect 84, wherein the glass further includes a loss tangent of about 0.008 or less, as measured with signals at 10 GHz, and wherein the glass is further defined by at least one of Equation 3 and Equation 4 (in percent by mole of oxide):

$$0.429780863-0.00424207*[SiO_2]-0.004096119*[Al_2O_3]-0.004396116*[B_2O_3]-0.002791817*[Li_2O]-0.012890989*[K_2O]-0.004226519*[MgO]-0.004108234*[CaO]-0.003587217*$$

[SrO]−0.004083111*[BaO]−0.028056812*
[SnO$_2$]−0.004220402*[ZnO]+0.000195707*
[La$_2$O$_3$]−0.004466313*[F]≤0.008    Equation 3 and 0.00454540427936441+0.00452303537205577*
[K$_2$O]+0.00026538565533632*[B$_2$O$_3$]+
2.211176044138×10$^{-5}$*[Al$_2$O$_3$]*[BaO]+
6.27439041968789×10$^{-6}$*2$^{[CaO]}$−
0.00021511681577554*[F]−
6.01991751010702×10$^{-6}$*[SiO$_2$]*[B$_2$O$_3$]≤0.008.    Equation 4

According to an eighty-sixth aspect of the present disclosure, the article of aspect 84 or aspect 85, wherein the glass further includes a dielectric constant of about 7.5 or less and a loss tangent of about 0.005 or less, as measured with signals at 10 GHz.

According to an eighty-seventh aspect of the present disclosure, the article of aspect 84 or aspect 85, wherein the glass further includes a dielectric constant of about 5 or less and a loss tangent of about 0.005 or less, as measured with signals at 10 GHz.

According to an eighty-eighth aspect of the present disclosure, the article of any one of aspects 84-87, wherein the first sum $X_{sum}$, the second sum $Y_{sum}$, and the third sum $Z_{sum}$ present in the glass, in percent by mole of oxide, is equal to 100.

According to an eighty-ninth aspect of the present disclosure, the article of any one of aspects 84-88, wherein the glass further includes MgO and ZnO.

According to an ninetieth aspect of the present disclosure, the article of any one of aspects 84-89, wherein the glass further includes SnO$_2$ and at least one of CaO and BaO.

According to an ninety-first aspect of the present disclosure, the article of any one of aspects 84-90, wherein the glass includes no more than trace amounts of alkali metal oxides.

According to an ninety-second aspect of the present disclosure, the article of any one of aspects 84-91, wherein the glass is substantially free of at least one of F, La$_2$O$_3$, and ZnO.

According to an ninety-third aspect of the present disclosure, the article of any one of aspects 84-92, wherein the glass further includes at least one of F, La$_2$O$_3$, and ZnO.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. An article, comprising:
   an electrically-insulating layer supporting copper, wherein the electrically-insulating layer comprises a glass comprising by mole percent of oxides:
   SiO$_2$ from about 60% to about 80%;
   Al$_2$O$_3$ from 0% to about 13%;
   B$_2$O$_3$ from about 7% to about 20%;
   from 0% to about 1% of at least one fining agent;
   alkaline earth oxides (RO) totaling from 3% to about 15% (by mole of oxide), wherein the RO are selected from the group consisting of CaO, MgO, BaO, and SrO, wherein a ratio of MgO to total RO is at least 0.3, but wherein the RO are mixed RO species such that the ratio of MgO to total RO is no more than 0.9;
   wherein a ratio of B$_2$O$_3$:(Al$_2$O$_3$+SiO$_2$) is from about 0.13 to about 0.35,
   wherein the glass comprises a dielectric constant of about 10 or less and a loss tangent of about 0.01 or less, both as measured with signals at 10 GHz, and
   wherein the glass further comprises a 35,000 Poise Temperature from about 1,110° C. to about 1,325° C.

2. The article of claim 1, wherein the fining agent comprises one or more of SnO$_2$, Sb$_2$O$_3$, As$_2$O$_3$, and a halogen salt.

3. The article of claim 1, wherein the glass further comprises MgO from about 1% to about 13% and CaO from about 0.1% to about 10% (by mole of oxide).

4. The article of claim 1, wherein the glass comprises 0 mol %<RO≤8.5 mol %, and further comprises a dielectric constant of about 6 or less and/or a loss tangent of about 0.004 or less, both as measured with signals at 10 GHz.

5. The article of claim 1, wherein a ratio of RO:(Al$_2$O$_3$+(0.5*B$_2$O$_3$)) is from 0 to about 0.9.

6. The article of claim 1, wherein a ratio of RO:(Al$_2$O$_3$+(0.5*B$_2$O$_3$)) is from about 0.2 to about 0.9.

7. The article of claim 1, wherein the glass further comprises:
   SiO$_2$ from about 64% to about 75%;
   Al$_2$O$_3$ from about 1% to about 12%; and
   B$_2$O$_3$ from about 7% to about 15% (by mole of oxide).

8. The article of claim 1, wherein the glass comprises a dielectric constant of about 7.5 or less and a loss tangent of about 0.005 or less, as measured with signals at 10 GHz.

9. The article of claim 1, wherein the glass comprises a dielectric constant of about 5 or less and a loss tangent of about 0.005 or less, as measured with signals at 10 GHz.

10. The article of claim 1, wherein the glass comprises no more than trace amounts of alkali metal oxides.

11. The article of claim 10, wherein a ratio of the total RO to Al$_2$O$_3$ is greater than 1.

12. The article of claim 11, wherein the ratio of MgO to total RO is at least 0.38 and no more than 0.86.

13. The article of claim 12, wherein the ratio of MgO to total RO is at least 0.5 and no more than 0.7.

14. The article of claim 13, wherein the MgO>5 mol %, with alkaline earth oxides (RO) totaling up to about 15%.

15. The article of claim 14, wherein the CaO>3 mol %, with alkaline earth oxides (RO) totaling up to about 15%.

16. The article of claim 1, wherein the glass comprises an average coefficient of thermal expansion (CTE) of about 25×10$^{-7}$/° C. to about 65×10$^{-7}$/° C., as measured from 0° C. to 300° C.

17. The article of claim 1, wherein the glass comprises dimensional stability for 30 seconds at 260° C.

18. The article of claim 1, wherein the insulating layer is between 100 to 700 micrometers thick.

19. The article of claim 18, wherein the copper is in the form of copper films, and wherein insulating layer is disposed between the copper films.

20. The article of claim 18, further comprising one or more polymeric substrate layers in combination with the glass.

* * * * *

UNITED STATES PATENT AND TRADEMARK OFFICE
CERTIFICATE OF CORRECTION

PATENT NO. : 11,117,828 B2  
APPLICATION NO. : 16/809102  
DATED : September 14, 2021  
INVENTOR(S) : Boek et al.

It is certified that error appears in the above-identified patent and that said Letters Patent is hereby corrected as shown below:

In the Claims

In Column 54, Line 49, Claim 16, delete "$25 \times 10^{-7\circ}$ C." and insert -- $25 \times 10^{-7}/^{\circ}$ C. --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*